United States Patent
Fujita et al.

(10) Patent No.: US 12,441,435 B2
(45) Date of Patent: Oct. 14, 2025

(54) BRACKET APPARATUS AND BRACKET ASSEMBLY

(71) Applicant: SHIMANO INC., Sakai (JP)

(72) Inventors: Hiroshi Fujita, Sakai (JP); Atsuhiro Emura, Sakai (JP); Shota Suyama, Sakai (JP); Dai Yokozawa, Sakai (JP); Yusuke Oda, Sakai (JP)

(73) Assignee: SHIMANO INC., Sakai (JP)

( * ) Notice: Subject to any disclaimer, the term of this patent is extended or adjusted under 35 U.S.C. 154(b) by 929 days.

(21) Appl. No.: 17/537,379

(22) Filed: Nov. 29, 2021

(65) Prior Publication Data

US 2023/0166813 A1  Jun. 1, 2023

(51) Int. Cl.
*B62M 9/125* (2010.01)
*B62M 9/121* (2010.01)

(52) U.S. Cl.
CPC ............ *B62M 9/125* (2013.01); *B62M 9/121* (2013.01)

(58) Field of Classification Search
CPC ...... B62M 9/125; B62M 9/126; B62M 9/135; B62M 9/136; B62M 9/121; B62M 9/124; B62M 9/1244; B62M 9/131; B62M 9/134; B62M 9/1344; B62K 19/30; B62K 25/02; B62J 43/20; B62J 43/30
See application file for complete search history.

(56) References Cited

U.S. PATENT DOCUMENTS

| | | | | |
|---|---|---|---|---|
| 5,397,273 | A * | 3/1995 | Ando | B62M 9/1248 474/82 |
| 6,162,140 | A * | 12/2000 | Fukuda | B62M 25/08 474/81 |
| 7,090,603 | B2 * | 8/2006 | Shahana | B62M 9/125 474/80 |
| 7,166,048 | B2 * | 1/2007 | Shahana | B62J 23/00 474/82 |
| 7,189,172 | B2 * | 3/2007 | Shahana | B62M 9/125 474/80 |
| 8,899,606 | B2 * | 12/2014 | Cocalis | B62K 19/24 280/281.1 |
| 9,963,197 | B2 * | 5/2018 | Watarai | B62J 43/30 |
| 10,384,743 | B2 | 8/2019 | Shipman et al. | |
| 10,793,222 | B1 * | 10/2020 | Harris | B62M 9/1244 |
| 10,894,574 | B2 * | 1/2021 | Brown | B62M 9/128 |
| 10,981,625 | B2 * | 4/2021 | Brown | B62M 1/36 |
| 11,230,350 | B2 * | 1/2022 | Braedt | B62M 9/121 |
| 11,319,020 | B2 * | 5/2022 | Liao | B62M 9/125 |
| 11,866,127 | B2 * | 1/2024 | Boehm | B62M 9/125 |
| 11,939,029 | B2 * | 3/2024 | Braedt | B62M 9/125 |
| 12,037,080 | B2 * | 7/2024 | Braedt | B62K 25/02 |

(Continued)

FOREIGN PATENT DOCUMENTS

| | | | | |
|---|---|---|---|---|
| CN | 110271636 | | 9/2019 | |
| EP | 2982587 A1 * | 2/2016 | ............. | B62K 19/18 |
| EP | 3556647 A1 * | 10/2019 | ............. | B62J 13/00 |

*Primary Examiner* — Anna M Momper
*Assistant Examiner* — Raveen J Dias
(74) *Attorney, Agent, or Firm* — MORI & WARD, LLP

(57) ABSTRACT

A bracket apparatus for mounting a derailleur to a frame of a human-powered vehicle comprises a frame attachment portion, a derailleur attachment portion spaced apart from the frame attachment portion, and a component attachment portion spaced apart from the frame attachment portion and the derailleur attachment portion.

28 Claims, 37 Drawing Sheets

(56) References Cited

U.S. PATENT DOCUMENTS

| | | | |
|---|---|---|---|
| 2004/0110586 A1* | 6/2004 | Shahana | B62J 23/00 474/80 |
| 2004/0110587 A1* | 6/2004 | Shahana | B62J 23/00 474/82 |
| 2004/0116222 A1* | 6/2004 | Shahana | B62M 9/125 474/82 |
| 2004/0254038 A1* | 12/2004 | Chamberlain | B62M 9/128 474/82 |
| 2006/0172831 A1* | 8/2006 | Wen | B62M 9/128 474/82 |
| 2007/0021246 A1* | 1/2007 | Shahana | B62M 9/126 474/82 |
| 2007/0021248 A1* | 1/2007 | Shahana | B62M 9/16 474/83 |
| 2007/0026985 A1* | 2/2007 | Yamaguchi | B62M 9/127 474/82 |
| 2008/0064544 A1* | 3/2008 | Yamaguchi | B62M 9/125 474/82 |
| 2008/0081716 A1* | 4/2008 | Watarai | B62M 9/125 474/80 |
| 2008/0125259 A1* | 5/2008 | Kunisawa | B62M 9/126 474/82 |
| 2008/0272253 A1* | 11/2008 | Tseng | B62K 19/16 248/200 |
| 2010/0137082 A1* | 6/2010 | Gratz | B60B 5/02 474/78 |
| 2010/0201097 A1* | 8/2010 | Schaffer | B62M 9/125 280/283 |
| 2014/0155204 A1* | 6/2014 | Emura | B62M 9/135 474/80 |
| 2014/0155205 A1* | 6/2014 | Kuwayama | B62M 9/135 474/80 |
| 2014/0306512 A1* | 10/2014 | Nakajima | B60B 35/004 301/132 |
| 2015/0061257 A1* | 3/2015 | Beutner | B62K 25/02 280/287 |
| 2017/0113759 A1* | 4/2017 | Watarai | B62J 43/30 |
| 2017/0120983 A1* | 5/2017 | Komatsu | B62K 25/30 |
| 2018/0050758 A1* | 2/2018 | Pfeiffer | B62K 3/10 |
| 2018/0065704 A1* | 3/2018 | Choi | B60B 27/026 |
| 2019/0100279 A1* | 4/2019 | Brown | B62M 9/127 |
| 2019/0100280 A1* | 4/2019 | Brown | B62M 1/36 |
| 2019/0300112 A1* | 10/2019 | Liao | B62M 9/1242 |
| 2019/0322333 A1* | 10/2019 | Braedt | B62M 9/121 |
| 2020/0198728 A1* | 6/2020 | Braedt | B62M 9/125 |
| 2020/0298933 A1* | 9/2020 | Braedt | B62M 9/1242 |
| 2020/0339220 A1* | 10/2020 | Boehm | B62M 9/122 |
| 2021/0188396 A1* | 6/2021 | Braedt | B62M 9/125 |
| 2023/0166812 A1* | 6/2023 | Fujita | B62M 9/125 403/343 |
| 2023/0166814 A1* | 6/2023 | Fujita | B62M 9/125 280/276 |
| 2024/0034433 A1* | 2/2024 | Braedt | B62M 9/125 |
| 2024/0092457 A1* | 3/2024 | Boehm | B62M 9/122 |

* cited by examiner

BRACKET APPARATUS AND BRACKET ASSEMBLY

BACKGROUND

Technical Field

The present invention relates to a bracket apparatus and a bracket assembly.

Background Information

A human-powered vehicle includes a frame, a bracket, and a derailleur. The derailleur is mounted to the frame via the bracket. It is preferable that the derailleur and another component can be mounted to the frame with a simplified structure.

SUMMARY

In accordance with a first aspect of the present invention, a bracket apparatus for mounting a derailleur to a frame of a human-powered vehicle comprises a frame attachment portion, a derailleur attachment portion spaced apart from the frame attachment portion, and a component attachment portion spaced apart from the frame attachment portion and the derailleur attachment portion.

With the bracket apparatus according to the first aspect, it is possible to fasten a derailleur and a component to the frame via the frame attachment portion, the derailleur attachment portion, and the component attachment portion. For example, it is possible to fasten the derailleur and the component to the frame via the frame attachment portion, the derailleur attachment portion, and the component attachment portion while design changes in the derailleur and/or the component are reduced or minimized.

In accordance with a second aspect of the present invention, the bracket apparatus according to the first aspect is configured so that the frame attachment portion has a frame attachment opening configured to be coaxial with a hub axle of a hub assembly in a bracket mounting state where the bracket apparatus is mounted to the frame of the human-powered vehicle.

With the bracket apparatus according to the second aspect, it is possible to fasten the bracket apparat to the frame via the frame attachment portion. For example, since the frame attachment opening is coaxial with the hub axle of the hub assembly, it is possible to fasten the bracket apparat to the frame via the frame attachment portion while a design change in the frame is reduced or minimized.

In accordance with a third aspect of the present invention, the bracket apparatus according to the first or second aspect is configured so that the derailleur attachment portion has a derailleur attachment opening configured to be coaxial with a derailleur fastener in a derailleur mounting state where the derailleur is mounted to the bracket apparatus.

With the bracket apparatus according to the third aspect, it is possible to fasten the derailleur to the frame using the derailleur attachment opening and the derailleur fastener.

In accordance with a fourth aspect of the present invention, the bracket apparatus according to any one of the first to third aspects is configured so that the component attachment portion has a component attachment opening configured to be coaxial with a component fastener in a component mounting state where a component is mounted to the bracket apparatus.

With the bracket apparatus according to the fourth aspect, it is possible to fasten the component to the frame using the component attachment opening and the component fastener.

In accordance with a fifth aspect of the present invention, the bracket apparatus according to any one of the first to fourth aspects is configured so that the component attachment portion is configured to be attached to an electric device.

With the bracket apparatus according to the fifth aspect, it is possible to attach the electric device to the frame via the component attachment portion.

In accordance with a sixth aspect of the present invention, the bracket apparatus according to any one of the first to fifth aspects is configured so that the frame attachment portion is configured to be at least partly disposed between the frame of the human-powered vehicle and a hub axle of a hub assembly in an axial direction with respect to a center axis of the hub axle.

With the bracket apparatus according to the sixth aspect, it is possible to attach the hub axle of the hub assembly to the frame via the frame attachment portion.

In accordance with a seventh aspect of the present invention, the bracket apparatus according to any one of the first to sixth aspects is configured so that the component attachment portion is configured to form a space between the component attachment portion and the frame of the human-powered vehicle in a bracket mounting state where the bracket apparatus is mounted to the frame of the human-powered vehicle. At least one of a component bracket configured to mount a component to the component attachment portion and the component configured to be mounted to the component attachment portion is at least partly disposed in the space in a component mounting state where the component is mounted to the bracket apparatus.

With the bracket apparatus according to the seventh aspect, it is possible to reliably attach the at least one of the component bracket and the component to the frame via the component attachment portion.

In accordance with an eighth aspect of the present invention, the bracket apparatus according to any one of the first to seventh aspects is configured so that one of the derailleur attachment portion and the component attachment portion is disposed on an opposite side of the other of the derailleur attachment portion and the component attachment portion with respect to the frame attachment portion.

With the bracket apparatus according to the eighth aspect, it is possible to take balance of the bracket apparatus about the frame attachment portion.

In accordance with a ninth aspect of the present invention, the bracket apparatus according to any one of the first to eighth aspects further comprises a bracket body and a bracket fastener configured to fasten the bracket body to the frame of the human-powered vehicle.

With the bracket apparatus according to the ninth aspect, it is possible to fasten the bracket body to the frame with the bracket fastener.

In accordance with a tenth aspect of the present invention, the bracket apparatus according to the ninth aspect is configured so that the bracket fastener is configured to fasten the frame attachment portion to the frame of the human-powered vehicle.

With the bracket apparatus according to the tenth aspect, it is possible to reliably fasten the bracket body to the frame via the frame attachment portion.

In accordance with a eleventh aspect of the present invention, the bracket apparatus according to the ninth or tenth aspect is configured so that the frame attachment portion includes a fastening threaded hole configured to be threadedly engaged with the bracket fastener.

With the bracket apparatus according to the eleventh aspect, it is possible to attach the bracket fastener to the frame attachment portion with a simplified structure.

In accordance with a twelfth aspect of the present invention, the bracket apparatus according to the eleventh aspect is configured so that the bracket fastener includes a receiving threaded hole configured to be threadedly engaged with a fastening rod of a hub fastening device configured to fasten a hub assembly to the frame of the human-powered vehicle.

With the bracket apparatus according to the twelfth aspect, it is possible to support the fastening rod of the hub fastening device using the bracket fastener.

In accordance with a thirteenth aspect of the present invention, the bracket apparatus according to the ninth or tenth aspect is configured so that the frame attachment portion includes a fastening threaded hole configured to be threadedly engaged with the bracket fastener.

With the bracket apparatus according to the thirteenth aspect, it is possible to attach the bracket fastener to the frame attachment portion with a simplified structure.

In accordance with a fourteenth aspect of the present invention, the bracket apparatus according to the thirteenth aspect is configured so that the frame attachment portion includes a receiving threaded hole configured to be threadedly engaged with a fastening rod of a hub fastening device configured to fasten a hub assembly to the frame of the human-powered vehicle.

With the bracket apparatus according to the fourteenth aspect, it is possible to support the fastening rod of the hub fastening device using the frame attachment portion.

In accordance with a fifteenth aspect of the present invention, the bracket apparatus according to the ninth or tenth aspect is configured so that the bracket fastener includes a fastening threaded hole configured to be threadedly engaged with the frame attachment portion. The bracket fastener is configured to be at least partly provided outside a through-hole of the frame in a bracket mounting state where the bracket apparatus is mounted to the frame of the human-powered vehicle. The frame attachment portion extends through the through-hole of the frame.

With the bracket apparatus according to the fifteenth aspect, it is possible to easily attach the bracket fastener to the frame attachment portion.

In accordance with a sixteenth aspect of the present invention, the bracket apparatus according to the fifteenth aspect is configured so that the frame attachment portion includes a receiving threaded hole configured to be threadedly engaged with a fastening rod of a hub fastening device configured to fasten a hub assembly to the frame of the human-powered vehicle.

With the bracket apparatus according to the sixteenth aspect, it is possible to support the fastening rod of the hub fastening device using the frame attachment portion.

In accordance with a seventeenth aspect of the present invention, the bracket apparatus according to any one of the ninth to sixteenth aspects is configured so that the bracket body includes at least one of the frame attachment portion, the derailleur attachment portion, and the component attachment portion.

With the bracket apparatus according to the seventeenth aspect, it is possible to utilize the bracket body as a member for providing the at least one of the frame attachment portion, the derailleur attachment portion, and the component attachment portion.

In accordance with an eighteenth aspect of the present invention, the bracket apparatus according to any one of the ninth to seventeenth aspects is configured so that the bracket body includes a restriction opening in which a restriction member is configured to be at least partly provided to restrict a rotation of the bracket body relative to the frame of the human-powered vehicle in a bracket mounting state where the bracket apparatus is mounted to the frame of the human-powered vehicle.

With the bracket apparatus according to the eighteenth aspect, it is possible to restrict the rotation of the bracket body relative to the frame with a simplified structure.

In accordance with a nineteenth aspect of the present invention, the bracket apparatus according to the eighteenth aspect is configured so that the restriction opening has a receiving center axis. The frame attachment portion has a frame attachment opening having a frame attachment center axis. The component attachment portion has a component attachment opening having a component attachment center axis. The receiving center axis is provided between the frame attachment center axis and the component attachment center axis.

With the bracket apparatus according to the nineteenth aspect, it is possible to utilize, as an area for providing the restriction opening, an area provided between the frame attachment center axis and the component attachment center axis.

In accordance with a twentieth aspect of the present invention, the bracket apparatus according to the eighteenth aspect is configured so that the restriction opening has a receiving center axis. The derailleur attachment portion has a derailleur attachment opening having a derailleur attachment center axis. The component attachment portion has a component attachment opening having a component attachment center axis. The receiving center axis is provided between the derailleur attachment center axis and the component attachment center axis.

With the bracket apparatus according to the twentieth aspect, it is possible to utilize, as an area for providing the restriction opening, an area provided between the derailleur attachment center axis and the component attachment center axis.

In accordance with a twenty-first aspect of the present invention, the bracket apparatus according to the eighteenth aspect is configured so that the restriction opening has a receiving center axis. The frame attachment portion has a frame attachment opening having a frame attachment center axis. The derailleur attachment portion has a derailleur attachment opening having a derailleur attachment center axis. The receiving center axis is provided between the frame attachment center axis and the derailleur attachment center axis.

With the bracket apparatus according to the twenty-first aspect, it is possible to utilize, as an area for providing the restriction opening, an area provided between the frame attachment center axis and the derailleur attachment center axis.

In accordance with a twenty-second aspect of the present invention, the bracket apparatus according to any one of the first to twenty-first aspects is configured so that the frame attachment portion is integrally provided with at least one of the derailleur attachment portion and the component attachment portion as a one-piece unitary member.

With the bracket apparatus according to the twenty-second aspect, it is possible to simplify the structure of the bracket apparatus.

In accordance with a twenty-third aspect of the present invention, the bracket apparatus according to any one of the first to twenty-second aspects is configured so that the frame attachment portion has a frame attachment opening having a frame attachment center axis. The derailleur attachment portion has a derailleur attachment opening having a derailleur attachment center axis. The component attachment portion has a component attachment opening having a component attachment center axis. The frame attachment center axis, the derailleur attachment center axis, and the component attachment center axis are offset from each other.

With the bracket apparatus according to the twenty-third aspect, it is possible to improve flexibility of design of at least one of the frame attachment portion, the derailleur attachment portion, the component attachment portion.

In accordance with a twenty-fourth aspect of the present invention, the bracket apparatus according to the twenty-third aspect is configured so that the frame attachment center axis, the derailleur attachment center axis, and the component attachment center axis extend along each other.

With the bracket apparatus according to the twenty-fourth aspect, it is possible to improve case of assembly of the bracket apparatus since directions of the frame attachment center axis, the derailleur attachment center axis, and the component attachment center axis are similar to each other.

In accordance with a twenty-fifth aspect of the present invention, the bracket apparatus according to any one of the ninth to twenty-fourth aspects is configured so that the bracket body includes a first bracket body and a second bracket body. The second bracket body is a separate member from the first bracket body. The frame attachment portion is provided to at least one of the first bracket body and the second bracket body. The derailleur attachment portion is provided to at least one of the first bracket body and the second bracket body.

With the bracket apparatus according to the twenty-fifth aspect, it is possible to improve flexibility of arrangement of the bracket body.

In accordance with a twenty-sixth aspect of the present invention, the bracket apparatus according to any one of the ninth to twenty-fifth aspects is configured so that the bracket fastener includes a plurality of fasteners configured to fasten the bracket body to the frame of the human-powered vehicle.

With the bracket apparatus according to the twenty-sixth aspect, it is possible to improve flexibility of arrangement of the bracket fastener.

In accordance with a twenty-seventh aspect of the present invention, a bracket assembly comprises the bracket apparatus according to any one of the first to twenty-sixth aspects and a component bracket configured to mount a component to the bracket apparatus.

With the bracket assembly according to the twenty-seventh aspect, it is possible to mount the component to the frame via the bracket apparatus.

In accordance with a twenty-eighth aspect of the present invention, the bracket assembly according to the twenty-seventh aspect further comprises the component configured to be mounted to the bracket apparatus via the component bracket, the component including an electric device.

With the bracket assembly according to the twenty-eighth aspect, it is possible to attach the component including the electric device to the frame via the component bracket and the bracket apparatus.

In accordance with a twenty-ninth aspect of the present invention, the bracket assembly according to the twenty-eighth aspect is configured so that the component is configured to be adjustably attached to the bracket apparatus.

With the bracket assembly according to the twenty-ninth aspect, it is possible to change a position of the component relative to the bracket apparatus.

In accordance with a thirtieth aspect of the present invention, the bracket assembly according to any one of the twenty-seventh to twenty-ninth aspects further comprises a component fastener configured to fasten the component bracket to the bracket apparatus.

With the bracket assembly according to the thirtieth aspect, it is possible to reliably fasten the component to the component bracket using the component fastener.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
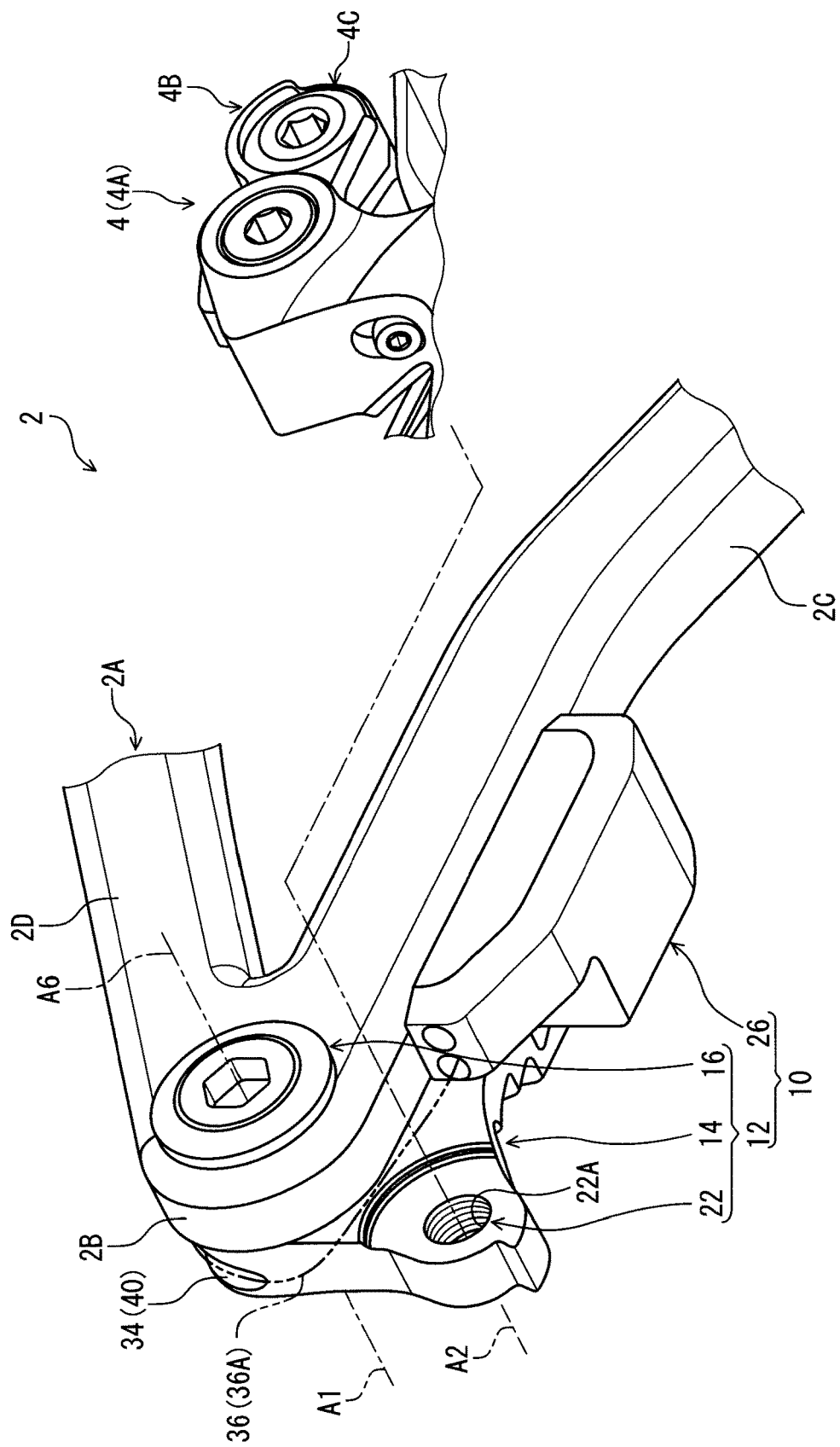
FIG. 1 is a perspective view of a bracket assembly in accordance with a first embodiment.

The embodiment(s) will now be described with reference to the accompanying drawings, wherein like reference numerals designate corresponding or identical elements throughout the various drawings.

First Embodiment

As seen in FIG. 1, a bracket assembly 10 is configured to be coupled to a frame 2A of a human-powered vehicle 2. The bracket assembly 10 is configured to mount a derailleur 4 to the frame 2A of the human-powered vehicle 2. The derailleur 4 is configured to be attached to the bracket assembly 10. In the present embodiment, the bracket assembly 10 is configured to be coupled to a coupling portion 2B between a chain stay 2C and a seat stay 2D. The derailleur 4 includes a rear derailleur 4A. However, the bracket assembly 10 can be coupled to other parts of the frame 2A if needed and/or desired. The derailleur 4 can include front or other derailleurs if needed and/or desired.

In the present application, a human-powered vehicle is a vehicle to travel with a motive power including at least a human power of a user who rides the human-powered vehicle (i.e., rider). The human-powered vehicle includes a various kind of bicycles such as a mountain bike, a road bike, a city bike, a cargo bike, a hand bike, and a recumbent bike. Furthermore, the human-powered vehicle includes an electric bike (E-bike). The electric bike includes an electrically assisted bicycle configured to assist propulsion of a vehicle with an electric motor. However, a total number of wheels of the human-powered vehicle is not limited to two. For example, the human-powered vehicle includes a vehicle having one wheel or three or more wheels. Especially, the human-powered vehicle does not include a vehicle that uses only an internal-combustion engine as motive power. Generally, a light road vehicle, which includes a vehicle that does not require a driver's license for a public road, is assumed as the human-powered vehicle.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on a saddle or a seat) in the human-powered vehicle 2 with facing a handlebar or a steering. Accordingly, these terms, as utilized to describe the bracket assembly 10, the bracket apparatus 12, or other components, should be interpreted relative to the human-powered vehicle 2 equipped with the bracket assembly 10, the bracket apparatus 12, or other components as used in an upright riding position on a horizontal surface.

The bracket assembly 10 comprises a bracket apparatus 12. The bracket apparatus 12 for mounting the derailleur 4 to the frame 2A of the human-powered vehicle 2 comprises a bracket body 14. The bracket apparatus 12 further comprises a bracket fastener 16. The bracket fastener 16 is configured to fasten the bracket body 14 to the frame 2A of the human-powered vehicle 2. The derailleur 4 is configured to be attached to the bracket body 14. The derailleur 4 includes a derailleur body 4B and a derailleur fastener 4C. The derailleur body 4B is configured to be coupled to the bracket body 14 with the derailleur fastener 4C.

Figure 2:
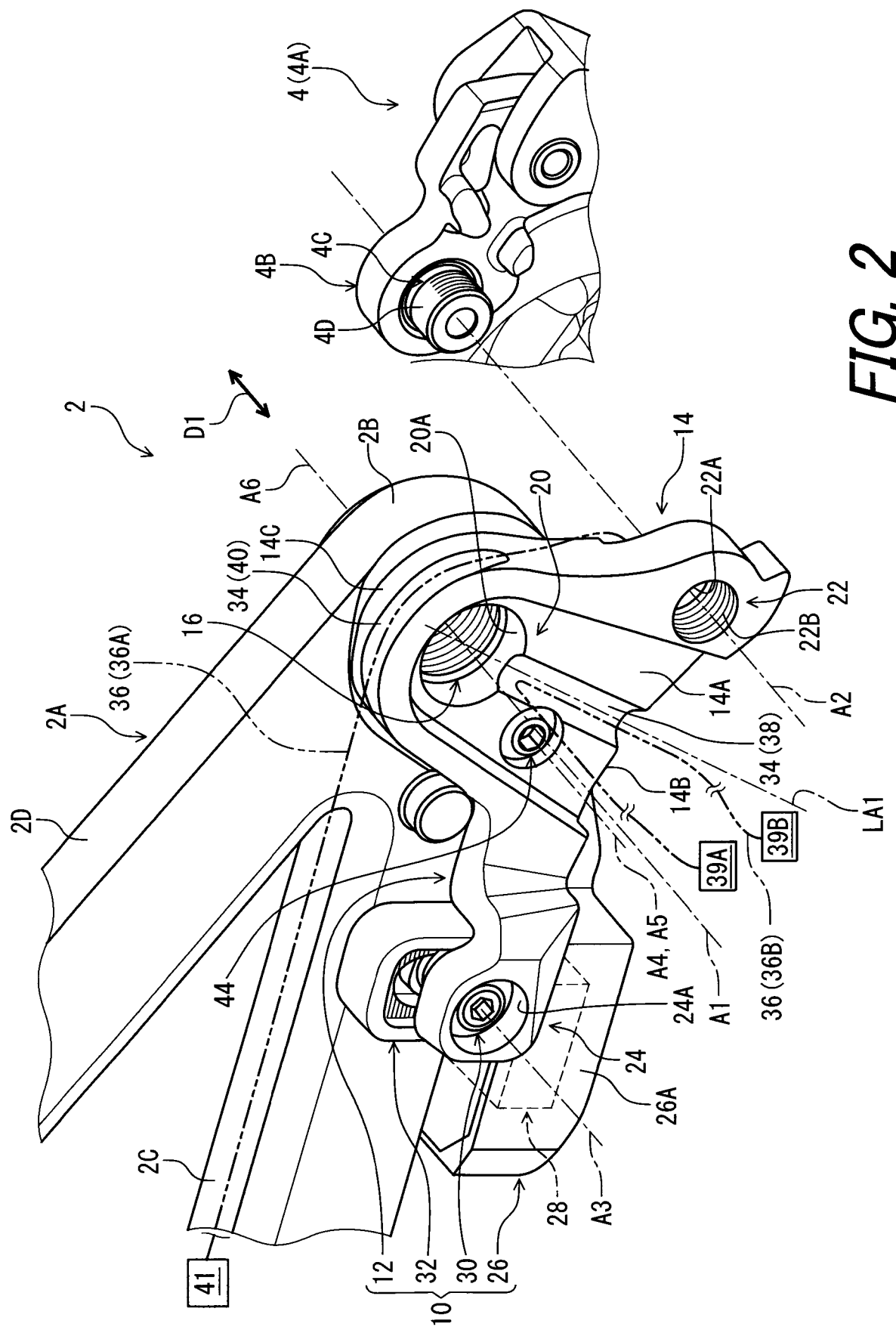
FIG. 2 is a perspective view of the bracket assembly illustrated in FIG. 1.

As seen in FIG. 2, the bracket body 14 includes at least one of a frame attachment portion 20, a derailleur attachment portion 22, and a component attachment portion 24. In the present embodiment, the bracket body 14 includes a frame attachment portion 20. Namely, the bracket apparatus 12 for mounting the derailleur 4 to the frame 2A of the human-powered vehicle 2 comprises the frame attachment portion 20. The frame attachment portion 20 is configured to be attached to the frame 2A of the human-powered vehicle 2. However, the frame attachment portion 20 can be omitted from the bracket body 14 if needed and/or desired.

The frame attachment portion 20 has a frame attachment opening 20A. The frame attachment opening 20A has a frame attachment center axis A1. The frame attachment opening 20A extends along the frame attachment center axis A1. The bracket fastener 16 is configured to fasten the frame attachment portion 20 to the frame 2A of the human-powered vehicle 2. The bracket fastener 16 is configured to be at least partly provided in the frame attachment opening 20A.

The bracket body 14 includes a derailleur attachment portion 22 to which the derailleur 4 is to be attached. Namely, the bracket apparatus 12 for mounting the derailleur 4 to the frame 2A of the human-powered vehicle 2 comprises the derailleur attachment portion 22. However, the derailleur attachment portion 22 can be omitted from the bracket body 14 if needed and/or desired.

The derailleur attachment portion 22 has a derailleur attachment opening 22A. The derailleur attachment opening 22A has a derailleur attachment center axis A2. The derailleur attachment opening 22A extends along the derailleur attachment center axis A2. The derailleur fastener 4C is at least partly provided in the derailleur attachment opening 22A. The derailleur attachment opening 22A includes a threaded hole 22B. The derailleur fastener 4C includes an external thread 4D configured to be threadedly engaged with the threaded hole 22B of the derailleur attachment opening 22A.

The bracket body 14 includes a component attachment portion 24 to which a component 26 is to be attached. Namely, the bracket apparatus 12 for mounting the derailleur 4 to the frame 2A of the human-powered vehicle 2 comprises the component attachment portion 24. The bracket assembly 10 further comprises the component 26. The component 26 includes an electric device 28. The component attachment portion 24 is configured to be attached to the electric device 28. However, the component attachment portion 24 can be omitted from the bracket body 14 if needed and/or desired.

In the present embodiment, the electric device 28 includes at least one of a battery, a generator, a sensor, a communicator, an actuator, an informing unit, a display (e.g., a light emitting diode, a liquid crystal display), a user interface (e.g., an operating switch, an on-off switch), and a connector for an electric cable. However, the electric device 28 is not limited to the above examples.

The bracket assembly 10 further comprises a component fastener 30. The component fastener 30 is configured to fasten the component 26 to the bracket body 14. The component attachment portion 24 has a component attachment opening 24A. The component attachment opening 24A has a component attachment center axis A3. The component attachment opening 24A extends along the component attachment center axis A3. The component fastener 30 is at least partly provided in the component attachment opening 24A.

The bracket assembly 10 comprises a component bracket 32. The component fastener 30 is configured to fasten the component bracket 32 to the bracket apparatus 12. The component bracket 32 is configured to mount the component 26 to the bracket apparatus 12. The component bracket 32 is configured to mount the component 26 to the bracket body 14. The component bracket 32 is configured to mount the component 26 to the component attachment portion 24 of the bracket body 14.

The component 26 is configured to be mounted to the bracket apparatus 12 via the component bracket 32. The component 26 is configured to be mounted to the bracket body 14 via the component bracket 32. The component 26 is configured to be attached to the component attachment portion 24 of the bracket body 14 via the component bracket 32.

The component 26 includes a component housing 26A. The component bracket 32 is configured to mount the component housing 26A to the bracket body 14 of the bracket apparatus 12. In the present embodiment, the component bracket 32 is at least partly provided integrally with the component housing 26A as a one-piece unitary member. However, the component bracket 32 can be a separate member from the component housing 26A if needed and/or desired.

As seen in FIG. 2, the bracket body 14 includes a cable groove 34 in which a cable 36 is to be at least partly provided. In the present embodiment, the bracket body 14 includes the cable groove 34 in which the cable 36 is partly provided. However, at least one of the bracket body 14 and the bracket fastener 16 can include the cable groove 34 if needed and/or desired. The cable groove 34 can be configured such that the cable 36 is entirely provided in the cable groove 34 if needed and/or desired.

The cable groove 34 includes a first cable groove 38 in which a first cable 36A is to be at least partly provided. An additional component 39A is electrically connected to an additional component 39B via the first cable 36A. Examples of the additional component 39A include the component 26, an electric power source, and a hub assembly including a power generator. Examples of the additional component 39B include the component 26, an electric derailleur, an electric power source, and other electric components such as a control unit. In a case where the additional component 39A includes a hub assembly including a power generator and where the additional component 39B includes an electric derailleur, the power generator of the hub assembly is electrically connected to the electric derailleur via the first cable 36A. Electricity generated by the power generator is supplied to a motor and/or a controller of the electric derailleur via the first cable 36A. In a case where the additional component 39A includes an electric power source and where the additional component 39B includes an electric derailleur, the electric power source is electrically connected to the electric derailleur via the first cable 36A. Electricity is supplied from the electric power source to the motor and/or the controller of the electric derailleur via the first cable 36A. In a case where the additional component 39A includes the component 26 and where the additional component 39B includes an electric derailleur, the component 26 is electrically connected to the electric derailleur via the first cable 36A. Electricity is supplied from the electric power source to the motor and/or the controller of the electric derailleur via the first cable 36A. The first cable groove 38 includes a curved bottom surface. The first cable 36A is at least partly provided in the first cable groove 38 (see e.g., FIG. 8). The first cable 36A is provided between the curved bottom surface of the first cable groove 38 and a hub axle 8A of a hub assembly 8 (see e.g., FIG. 8).

The first cable groove 38 extends radially outwardly from the frame attachment portion 20 with respect to the frame attachment center axis A1. The first cable groove 38 extends radially outwardly from the frame attachment opening 20A with respect to the frame attachment center axis A1.

The bracket body 14 includes an axial surface 14A configured to face in an axial direction D1 with respect to the frame attachment center axis A1. The first cable groove 38 is provided on the axial surface 14A.

The bracket body 14 includes an end surface 14B spaced apart from the frame attachment opening 20A. The first cable groove 38 extends radially outwardly from the frame attachment opening 20A to the end surface 14B with respect to the frame attachment center axis A1.

The first cable groove 38 has a first longitudinal axis LA1 and extends along the first longitudinal axis LA1. The first longitudinal axis LA1 is non-parallel to the frame attachment center axis A1. The first longitudinal axis LA1 intersects with the frame attachment center axis A1. The first longitudinal axis LA1 is offset from the derailleur attachment center axis A2. However, the first longitudinal axis LA1 can be defined to intersect with the derailleur attachment center axis A2 if needed and/or desired. The first longitudinal axis LA1 can be offset from the frame attachment center axis A1. The first longitudinal axis LA1 can be parallel to the frame attachment center axis A1 if needed and/or desired.

As seen in FIG. 2, the cable groove 34 includes a second cable groove 40 in which a second cable 36B is to be at least partly provided. The electric device 28 of the component 26 is electrically connected to an additional component 41 via the second cable 36B. Examples of the additional component 41 include an electric derailleur, an electric power source, and other electric components such as a control unit. In a case where the additional component 41 include an electric derailleur, the electric device 28 of the component 26 is electrically connected to the electric derailleur via the second cable 36B at least partially provided in the second cable groove 40.

The second cable groove 40 at least partly extends circumferentially with respect to the frame attachment portion 20 with respect to the frame attachment center axis A1. The second cable groove 40 at least partly extends circumferentially with respect to the frame attachment center axis A1.

In the present embodiment, the second cable groove 40 entirely extends circumferentially with respect to the frame attachment portion 20 with respect to the frame attachment center axis A1. The second cable groove 40 entirely extends circumferentially with respect to the frame attachment center axis A1. However, the second cable groove 40 can partly extend circumferentially with respect to the frame attachment portion 20 with respect to the frame attachment center axis A1 if needed and/or desired. The second cable groove 40 can partly extend circumferentially with respect to the frame attachment center axis A1 if needed and/or desired.

The bracket body 14 includes an outer peripheral surface 14C provided radially outwardly of the frame attachment portion 20 with respect to the frame attachment center axis A1. The second cable groove 40 is provided on the outer peripheral surface 14C. However, the second cable groove 40 can be provided in other positions if needed and/or desired.

Figure 3:
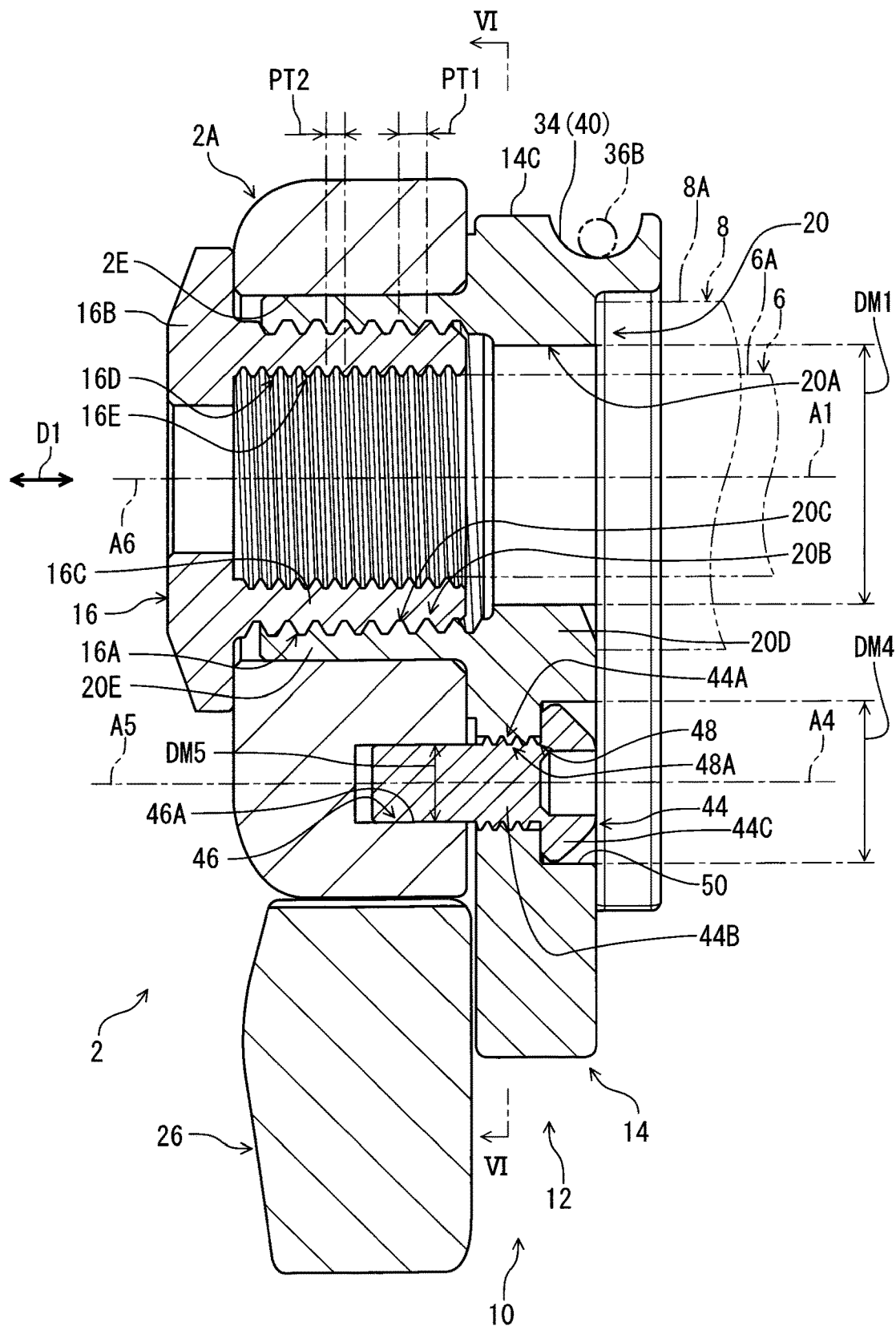
FIG. 3 is a cross-sectional view of the bracket assembly taken along line III-III of FIG. 4.

As seen in FIG. 3, the second cable groove 40 includes a curved bottom surface. The second cable 36B is at least partly provided in the second cable groove 40.

As seen in FIG. 3, the frame attachment portion 20 includes a fastening threaded hole 20B configured to be threadedly engaged with the bracket fastener 16. The frame attachment opening 20A includes the fastening threaded hole 20B. The frame attachment portion 20 includes a fastening internal thread 20C defining the fastening threaded hole 20B. The bracket fastener 16 includes a fastening external thread 16A configured to be threadedly engaged with the fastening threaded hole 20B. The fastening external thread 16A of the bracket fastener 16 is configured to be threadedly engaged with the fastening internal thread 20C of the frame attachment portion 20.

The frame attachment portion 20 includes a base part 20D and a tubular part 20E. The tubular part 20E extends from the base part 20D along the frame attachment center axis A1. The base part 20D and the tubular part 20E include the frame attachment opening 20A. The tubular part 20E includes the fastening threaded hole 20B. The frame 2A of the human-powered vehicle 2 includes a through-hole 2E. The tubular part 20E is configured to be at least partly provided in the through-hole 2E of the frame 2A.

The bracket fastener 16 includes a head part 16B and a fastener body 16C. The fastener body 16C extends from the head part 16B. The fastener body 16C includes the fastening external thread 16A. The fastener body 16C is at least partly provided in the frame attachment opening 20A. The fastener body 16C is at least partly provided in the fastening threaded hole 20B.

In the present embodiment, the bracket fastener 16 includes a receiving threaded hole 16D configured to be threadedly engaged with a fastening rod 6A of a hub fastening device 6 configured to fasten the hub assembly 8 to the frame 2A of the human-powered vehicle 2. The fastener body 16C includes the receiving threaded hole 16D. The fastener body 16C includes a receiving internal thread 16E defining the receiving threaded hole 16D. The fastening rod 6A of the hub fastening device 6 is configured to be threadedly engaged with the receiving internal thread 16E of the fastener body 16C. However, the receiving threaded hole 16D can be omitted from the bracket fastener 16 if needed and/or desired.

The fastening external thread 16A of the bracket fastener 16 has a first thread pitch PT1. The fastening internal thread 20C of the frame attachment portion 20 has the first thread pitch PT1. The receiving internal thread 16E of the fastener body 16C has a second thread pitch PT2. In the present embodiment, the first thread pitch PT1 is different from the second thread pitch PT2. The first thread pitch PT1 is larger than the second thread pitch PT2. However, the first thread pitch PT1 can be equal to or smaller than the second thread pitch PT2 if needed and/or desired.

As seen in FIG. 3, the bracket apparatus 12 for mounting the derailleur 4 to the frame 2A of the human-powered vehicle 2 comprises one of a restriction member 44 and a restriction opening 46. In the present embodiment, the bracket apparatus 12 comprises the restriction member 44. The frame 2A includes the restriction opening 46. However, the bracket apparatus 12 can comprise the restriction opening 46 if needed and/or desired. The frame 2A can include the restriction member 44 if needed and/or desired.

The one of the restriction member 44 and the restriction opening 46 is configured to restrict a rotation of the bracket body 14 relative to the frame 2A of the human-powered vehicle 2 in a bracket mounting state where the bracket apparatus 12 is mounted to the frame 2A of the human-powered vehicle 2. The restriction member 44 is configured to be at least partly provided in the restriction opening 46 to restrict a rotation of the bracket body 14 relative to the frame 2A of the human-powered vehicle 2 in the bracket mounting state where the bracket apparatus 12 is mounted to the frame 2A of the human-powered vehicle 2.

In the present embodiment, the restriction member 44 is configured to be partly provided in the restriction opening 46 to restrict a rotation of the bracket body 14 relative to the frame 2A of the human-powered vehicle 2 in the bracket mounting state. However, the restriction member 44 can be configured to be entirely provided in the restriction opening 46 to restrict a rotation of the bracket body 14 relative to the frame 2A of the human-powered vehicle 2 in the bracket mounting state if needed and/or desired.

In the present embodiment, the bracket apparatus 12 comprises the restriction member 44. However, the bracket apparatus 12 can comprise the restriction opening 46 instead of the restriction member 44 if needed and/or desired. In a case where the bracket apparatus 12 comprises the restriction member 44, the frame 2A includes the restriction opening 46, and the bracket apparatus 12 is free of the restriction opening 46. In a case where the bracket apparatus 12 comprises the restriction opening 46, the frame 2A includes the restriction member 44, and the bracket apparatus 12 is free of the restriction member 44.

In the present embodiment, the restriction opening 46 includes a restriction hole 46A. The restriction hole 46A includes a closed end and does not include a through-hole. However, the restriction opening 46 is not limited to the above structure. The restriction opening 46 can include a through-hole, a groove, a recess, and/or other structures if needed and/or desired.

The restriction opening 46 is provided to the frame 2A of the human-powered vehicle 2. The restriction member 44 protrudes from the bracket body 14 in the bracket mounting state and is configured to be at least partly provided in the restriction opening 46 in the bracket mounting state.

In the present embodiment, the restriction member 44 is a separate member from the bracket body 14. The bracket body 14 includes an additional opening 48. The restriction member 44 is configured to be at least partly provided in the restriction opening 46 and the additional opening 48 in the bracket mounting state. The restriction member 44 is configured to be partly provided in each of the restriction opening 46 and the additional opening 48 in the bracket mounting state. However, the additional opening 48 can be omitted from the bracket body 14 if needed and/or desired. The restriction member 44 can be integrally provided with the bracket body 14 as a one-piece unitary member if needed and/or desired.

The restriction member 44 includes an external thread 44A. At least one of the restriction opening 46 and the additional opening 48 includes a threaded hole configured to be threadedly engaged with the external thread 44A of the restriction member 44. In the present embodiment, the additional opening 48 includes a threaded hole 48A configured to be threadedly engaged with the external thread 44A of the restriction member 44. The restriction opening 46 is free of a threaded hole. The restriction member 44 is partly provided in the restriction opening 46 without being press-fitted in the restriction opening 46. However, the restriction member 44 can be press-fitted in the restriction opening 46 if needed and/or desired. The restriction opening 46 can include a threaded hole if needed and/or desired. The additional opening 48 can be free of the threaded hole 48A if needed and/or desired. Both of the restriction opening 46 and the additional opening 48 can include a threaded hole if needed and/or desired.

The restriction member 44 includes a restriction rod 44B and a large-diameter body 44C. The large-diameter body 44C is provided at an end of the restriction rod 44B. The restriction rod 44B extends from the large-diameter body 44C. An outer diameter of the large-diameter body 44C is larger than an outer diameter of the restriction rod 44B. The outer diameter of the large-diameter body 44C is larger than an inner diameter of the restriction opening 46.

The bracket body 14 includes a recess 50. The large-diameter body 44C is at least partly provided in the recess 50 in the bracket mounting state. In the present embodiment, the large-diameter body 44C is entirely provided in the recess 50 in the bracket mounting state. However, the large-diameter body 44C can be partly provided in the recess 50 in the bracket mounting state if needed and/or desired.

The one of the restriction member 44 and the restriction opening 46 is closer to the frame attachment portion 20 than the derailleur attachment portion 22. The restriction member 44 and the restriction opening 46 are closer to the frame attachment portion 20 than the derailleur attachment portion 22.

The one of the restriction member 44 and the restriction opening 46 has a receiving center axis and extends along the receiving center axis. In the present embodiment, the restriction member 44 has a receiving center axis A4. The restriction member 44 extends along the receiving center axis A4. The restriction opening 46 has a receiving center axis A5. The restriction opening 46 extends along the receiving center axis A5.

In the present embodiment, the receiving center axis A4 of the restriction member 44 is coincident with the receiving center axis A5 of the restriction opening 46 in a state where the restriction member 44 is provided in the restriction opening 46. However, the receiving center axis A4 of the restriction member 44 can be offset from the receiving center axis A5 of the restriction opening 46 in the state where the restriction member 44 is provided in the restriction opening 46.

The frame attachment portion 20 is configured to be at least partly disposed between the frame 2A of the human-powered vehicle 2 and the hub axle 8A of the hub assembly 8 in the axial direction D1 with respect to a center axis A6 of the hub axle 8A. The frame attachment portion 20 is configured to be partly disposed between the frame 2A of the human-powered vehicle 2 and the hub axle 8A of the hub assembly 8 in the axial direction D1 with respect to the center axis A6 of the hub axle 8A. The hub axle 8A of the hub assembly 8 has a structure different from a structure of the fastening rod 6A of the hub fastening device 6. The hub axle 8A of the hub assembly 8 is configured to be supported by the fastening rod 6A of the hub fastening device 6.

The frame attachment opening 20A is configured to be coaxial with the hub axle 8A of the hub assembly 8 in the bracket mounting state where the bracket apparatus 12 is mounted to the frame 2A of the human-powered vehicle 2. The frame attachment center axis A1 is coincident with the center axis A6 of the hub axle 8A of the hub assembly 8 in the bracket mounting state where the bracket apparatus 12 is mounted to the frame 2A of the human-powered vehicle 2.

Figure 4:
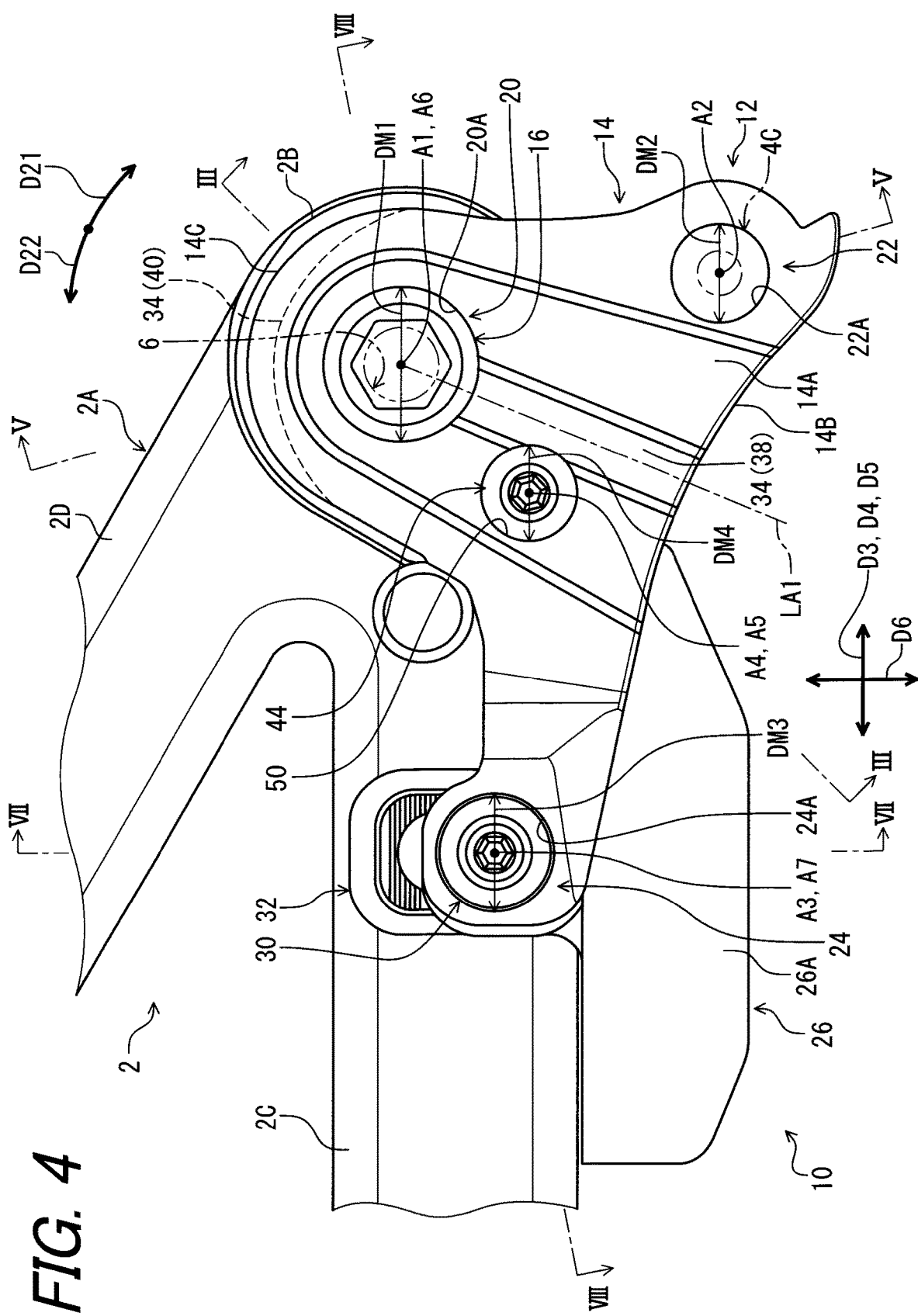
FIG. 4 is a side elevational view of the bracket assembly illustrated in FIG. 1.

As seen in FIG. 4, the one of the restriction member 44 and the restriction opening 46 is configured to restrict a first rotation of the bracket body 14 in a first circumferential direction D21 about the frame attachment center axis A1 relative to the frame 2A of the human-powered vehicle 2 in the bracket mounting state. The one of the restriction member 44 and the restriction opening 46 is configured to restrict a second rotation of the bracket body 14 in a second circumferential direction D22 about the frame attachment center axis A1 relative to the frame 2A of the human-powered vehicle 2 in the bracket mounting state. The second circumferential direction D22 is an opposite direction of the first circumferential direction D21. However, the one of the restriction member 44 and the restriction opening 46 can be configured to restrict only one of the first rotation and the second rotation of the bracket body 14 in the bracket mounting state if needed and/or desired.

The derailleur attachment portion 22 is spaced apart from the frame attachment portion 20. The component attachment portion 24 is spaced apart from the frame attachment portion 20 and the derailleur attachment portion 22. However, the positional relationship among the frame attachment portion 20, the derailleur attachment portion 22, and the component attachment portion 24 is not limited to the above positional relationship.

One of the derailleur attachment portion 22 and the component attachment portion 24 is disposed on an opposite side of the other of the derailleur attachment portion 22 and the component attachment portion 24 with respect to the frame attachment portion 20. The one of the derailleur attachment portion 22 and the component attachment portion 24 is disposed on the opposite side of the other of the derailleur attachment portion 22 and the component attachment portion 24 with respect to the frame attachment portion 20 in an arrangement direction D3. The arrangement direction D3 is defined to be non-parallel to at least one of the frame attachment center axis A1, the derailleur attachment center axis A2, and the component attachment center axis A3.

In the present embodiment, the arrangement direction D3 is defined to be perpendicular to at least one of the frame attachment center axis A1, the derailleur attachment center axis A2, and the component attachment center axis A3. The arrangement direction D3 is defined to be perpendicular to the frame attachment center axis A1, the derailleur attachment center axis A2, and the component attachment center axis A3. However, the arrangement direction D3 can be defined to be non-perpendicular to at least one of the frame attachment center axis A1, the derailleur attachment center axis A2, and the component attachment center axis A3 if needed and/or desired.

The arrangement direction D3 is defined along a horizontal direction D4 of the human-powered vehicle 2. The arrangement direction D3 is defined along a front-back direction D5 of the human-powered vehicle 2. However, the arrangement direction D3 can be defined along a vertical direction D6 if needed and/or desired.

In the present embodiment, the frame attachment portion 20 is integrally provided with the derailleur attachment portion 22 as a one-piece unitary member. The frame attachment portion 20 is integrally provided with at least one of the derailleur attachment portion 22 and the component attachment portion 24 as a one-piece unitary member. However, the frame attachment portion 20 can be a separate member from at least one of the derailleur attachment portion 22 if needed and/or desired. For example, the frame attachment portion 20 can be integrally provided with one of the derailleur attachment portion 22 and the component attachment portion 24 as a one-piece unitary member while the frame attachment portion 20 can be a separate member from the other of the derailleur attachment portion 22 and the component attachment portion 24.

The frame attachment center axis A1, the derailleur attachment center axis A2, and the component attachment center axis A3 are offset from each other. The receiving center axis A4 or A5 of the one of the restriction member 44 and the restriction opening 46, the frame attachment center axis A1, and the derailleur attachment center axis A2 are offset from each other. In the present embodiment, the receiving center axis of the restriction member 44, the frame attachment center axis A1, and the derailleur attachment center axis A2 are offset from each other. The receiving center axis of the restriction opening 46, the frame attachment center axis A1, and the derailleur attachment center axis A2 are offset from each other.

The receiving center axis A4 or A5 is provided between the frame attachment center axis A1 and the component attachment center axis A3. The receiving center axis A4 or A5 is provided between the derailleur attachment center axis A2 and the component attachment center axis A3. The receiving center axis A4 or A5 is provided between the frame attachment center axis A1 and the derailleur attachment center axis A2.

Figure 5:
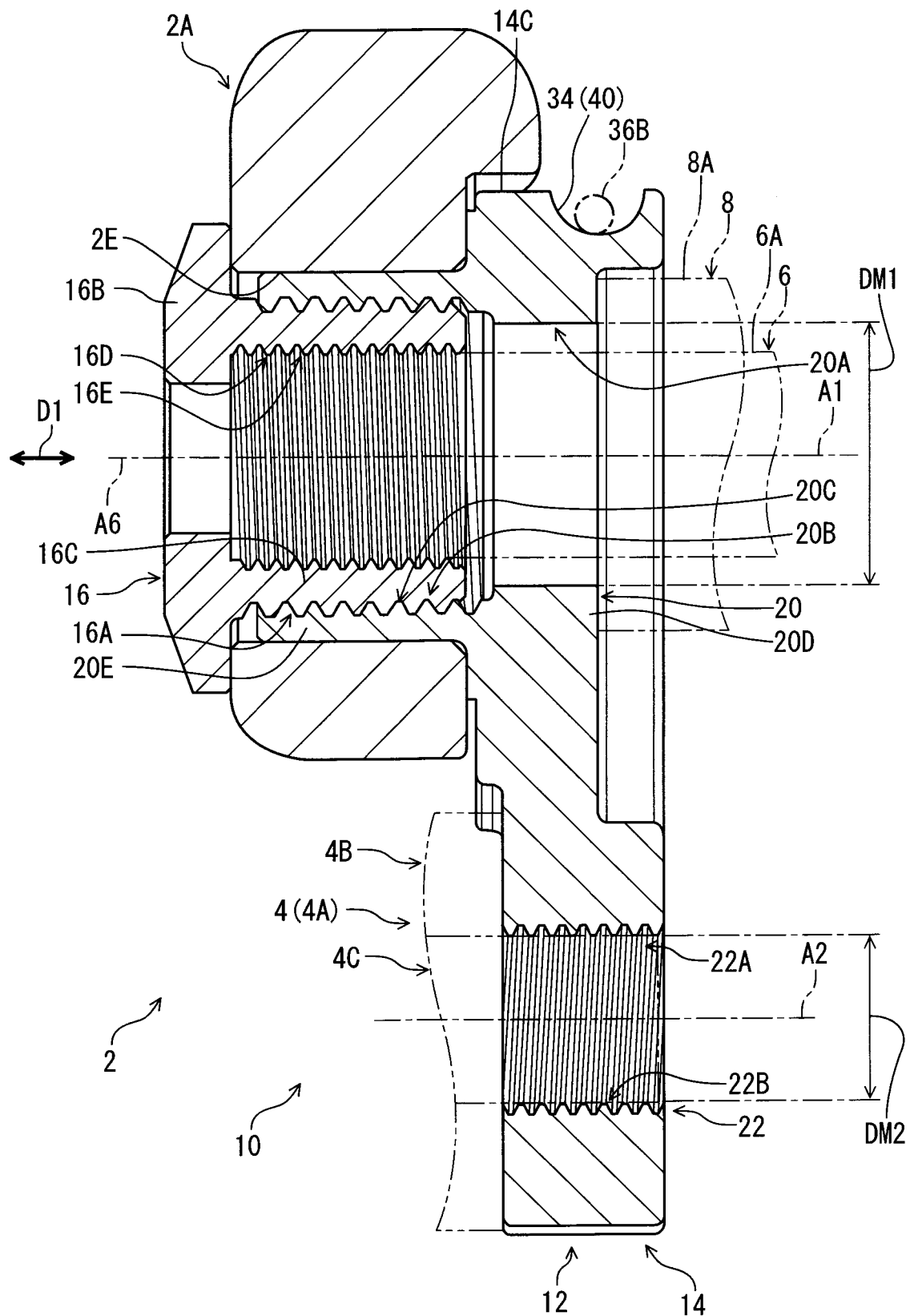
FIG. 5 is a cross-sectional view of the bracket assembly taken along line V-V of FIG. 4.

As seen in FIGS. 3 and 5, the receiving center axis A4 or A5 of the one of the restriction member 44 and the restriction opening 46, the frame attachment center axis A1, and the derailleur attachment center axis A2 extend along each other. In the present embodiment, the receiving center axis A4 or A5 of the restriction member 44, the receiving center axis of the restriction opening 46, the frame attachment center axis A1, and the derailleur attachment center axis A2 are parallel to each other. However, at least one of the receiving center axis A4 of the restriction member 44, the receiving center axis A5 of the restriction opening 46, the frame attachment center axis A1, and the derailleur attachment center axis A2 can be non-parallel to another of the receiving center axis A4 of the restriction member 44, the receiving center axis A5 of the restriction opening 46, the frame attachment center axis A1, and the derailleur attachment center axis A2 if needed and/or desired.

As seen in FIG. 5, the derailleur attachment opening 22A is configured to be coaxial with the derailleur fastener 4C in a derailleur mounting state where the derailleur 4 is mounted to the bracket apparatus 12. The derailleur attachment center axis A2 is coincident with a center axis of the derailleur fastener 4C in the derailleur mounting state where the derailleur 4 is mounted to the bracket apparatus 12.

Figure 6:
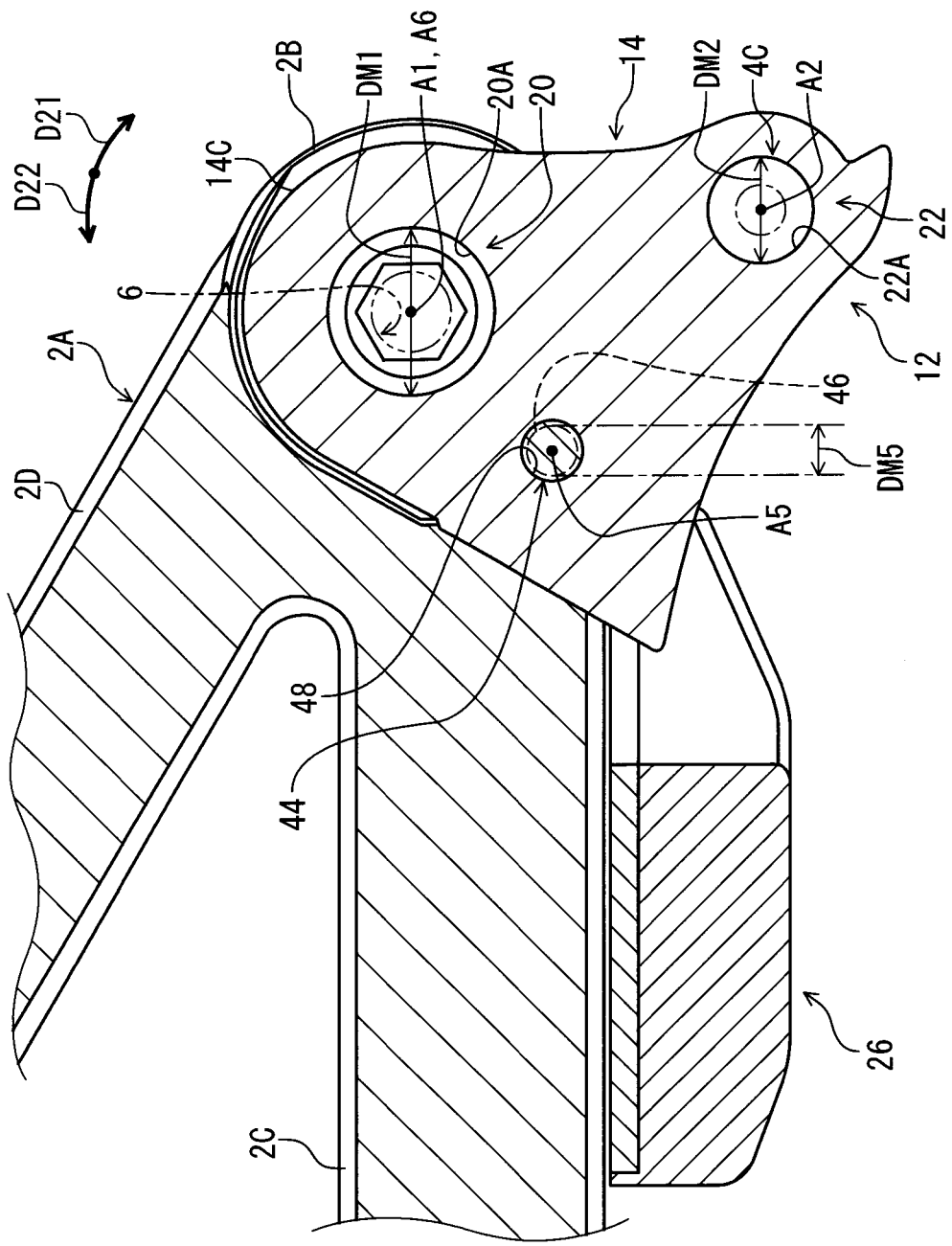
FIG. 6 is a cross-sectional view of the bracket assembly taken along line VI-VI of FIG. 3.

As seen in FIGS. 4 and 6, the frame attachment opening 20A has a first inner diameter DM1. The derailleur attachment opening 22A has a second inner diameter DM2. The component attachment opening 24A has a third inner diameter DM3. The one of the restriction member 44 and the restriction opening 46 has a diameter. The diameter of the one of the restriction member 44 and the restriction opening 46 is smaller than at least one of the first inner diameter DM1 and the second inner diameter DM2. The diameter of the one of the restriction member 44 and the restriction opening 46 is smaller than at least one of the first inner diameter DM1, the second inner diameter DM2, and the third inner diameter DM3.

As seen in FIG. 3, the restriction member 44 has a diameter DM4. The restriction opening 46 has a diameter DM5. The diameter DM5 of the restriction opening 46 is smaller than the diameter DM4 of the restriction member 44. As seen in FIG. 4, the diameter DM4 of the restriction member 44 is smaller than the first inner diameter DM1 and the second inner diameter DM2. As seen in FIG. 5, the diameter DM5 of the restriction opening 46 is smaller than the first inner diameter DM1 and the second inner diameter DM2. However, the diameter DM4 of the restriction member 44 can be equal to or larger than at least one of the first inner diameter DM1 and the second inner diameter DM2 if needed and/or desired. The diameter DM5 of the restriction opening 46 can be equal to or larger than at least one of the first inner diameter DM1 and the second inner diameter DM2 if needed and/or desired. The diameter DM5 of the restriction opening 46 can be equal to or larger than the diameter DM4 of the restriction member 44 if needed and/or desired.

Figure 7:
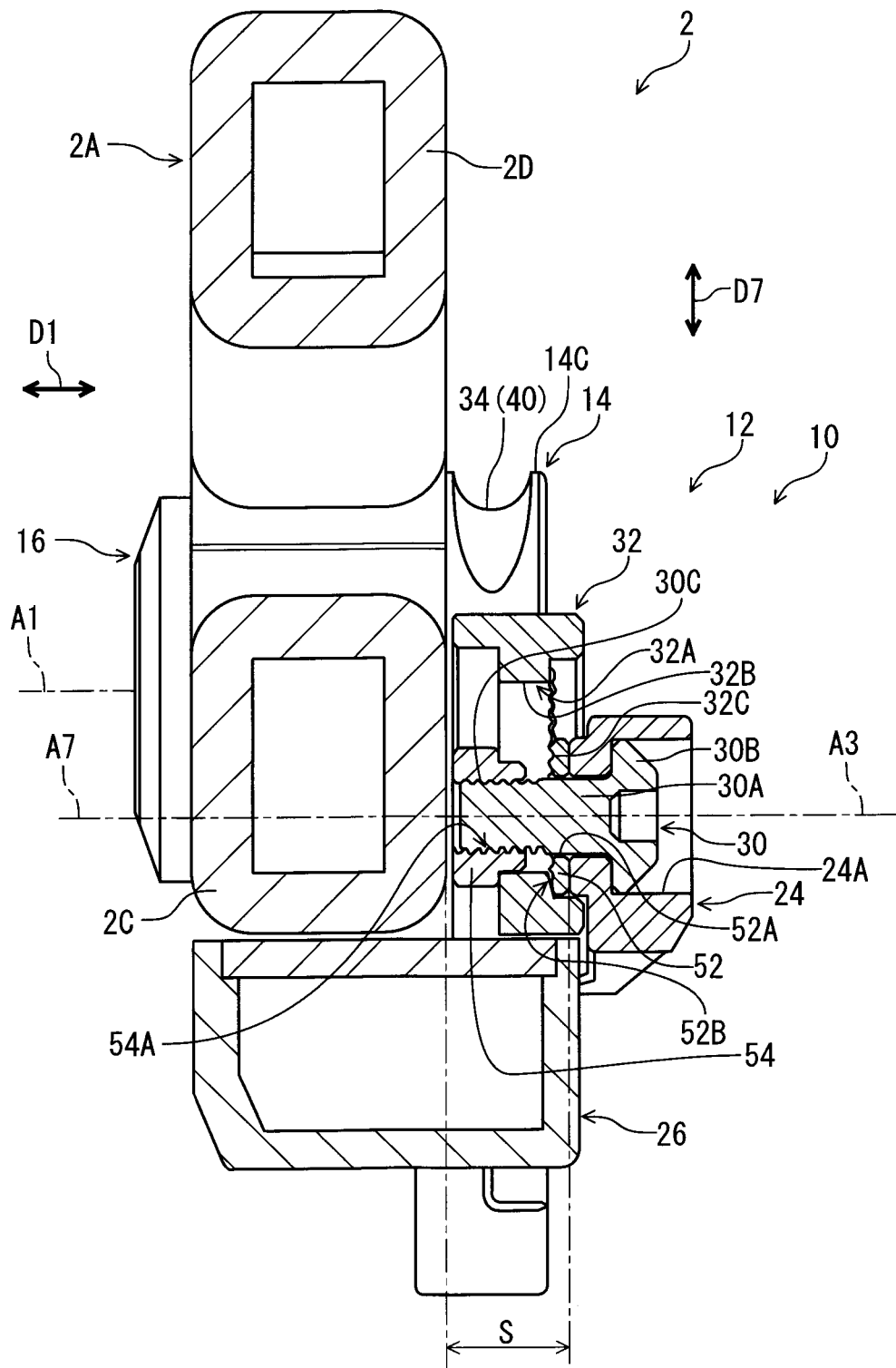
FIG. 7 is a cross-sectional view of the bracket assembly taken along line VII-VII of FIG. 4.

As seen in FIG. 7, the component 26 is configured to be adjustably attached to the bracket apparatus 12. The component 26 is configured to be adjustably attached to the bracket apparatus 12 via the component bracket 32. Positions of the component 26 and the component bracket 32 are adjustable relative to the bracket apparatus 12 in an adjustment direction D7. The component bracket 32 includes a component bracket opening 32A. The component bracket opening 32A includes an elongated hole 32B extending in the adjustment direction D7. The component fastener 30 extends though the component bracket opening 32A. The component fastener 30 extends through the elongated hole 32B. The positions of the component 26 and the component bracket 32 are adjustable relative to the bracket apparatus 12 in the adjustment direction D7 in a state where the component fastener 30 is loosened. The component 26 and the component bracket 32 are positioned relative to the bracket apparatus 12 by the component fastener 30 at a specific position in a state where the component fastener 30 is tightened. However, the elongated hole 32B can be omitted from the component bracket opening 32A if needed and/or desired.

The bracket apparatus 12 includes a washer 52 and a nut 54. The washer 52 is provided between the component attachment portion 24 and the component bracket 32 in the axial direction D1. The washer 52 includes a hole 52A. The component fastener 30 extends through the hole 52A of the washer 52. The nut 54 is threadedly engaged with the component fastener 30. The component bracket 32 is at least partly provided between the washer 52 and the nut 54 in the axial direction D1.

The component fastener 30 includes a head portion 30A, a rod portion 30B, and an external thread 30C. The head portion 30A is provided at an end of the rod portion 30B. The rod portion 30B extends along the center axis A7 of the component fastener 30. The external thread 30C is provided on an outer surface of the rod portion 30B. The nut 54 includes a threaded hole 54A. The external thread 30C of the component fastener 30 is threadedly engaged with the threaded hole 54A of the nut 54. The component attachment portion 24 and the washer 52 are at least partly provided between the head portion 30A of the component fastener 30 and the component bracket 32 in the axial direction D1. The component attachment portion 24, the washer 52, and the component bracket 32 are held between the head portion 30A of the component fastener 30 and the nut 54 when the component fastener 30 is tightened.

The component bracket 32 includes a first positioning structure 32C. The washer 52 includes a second positioning structure 52B. The second positioning structure 52B is configured to be engaged with the first positioning structure 32C to position the component bracket 32 relative to the component attachment portion 24 in the adjustment direction D7. The first positioning structure 32C includes a plurality of protrusions. The second positioning structure 52B includes a plurality of protrusions. The plurality of protrusions of the first positioning structure 32C at least partly meshes with the plurality of protrusions of the second positioning structure 52B.

In the present embodiment, the component attachment opening 24A is configured to be coaxial with the component fastener 30 in a component mounting state where the component 26 is mounted to the bracket apparatus 12. The component attachment center axis A3 is coincident with a center axis A7 of the component fastener 30 in the component mounting state. However, the component attachment center axis A3 can be offset from the center axis A7 of the component fastener 30 in the component mounting state if needed and/or desired.

Figure 8:
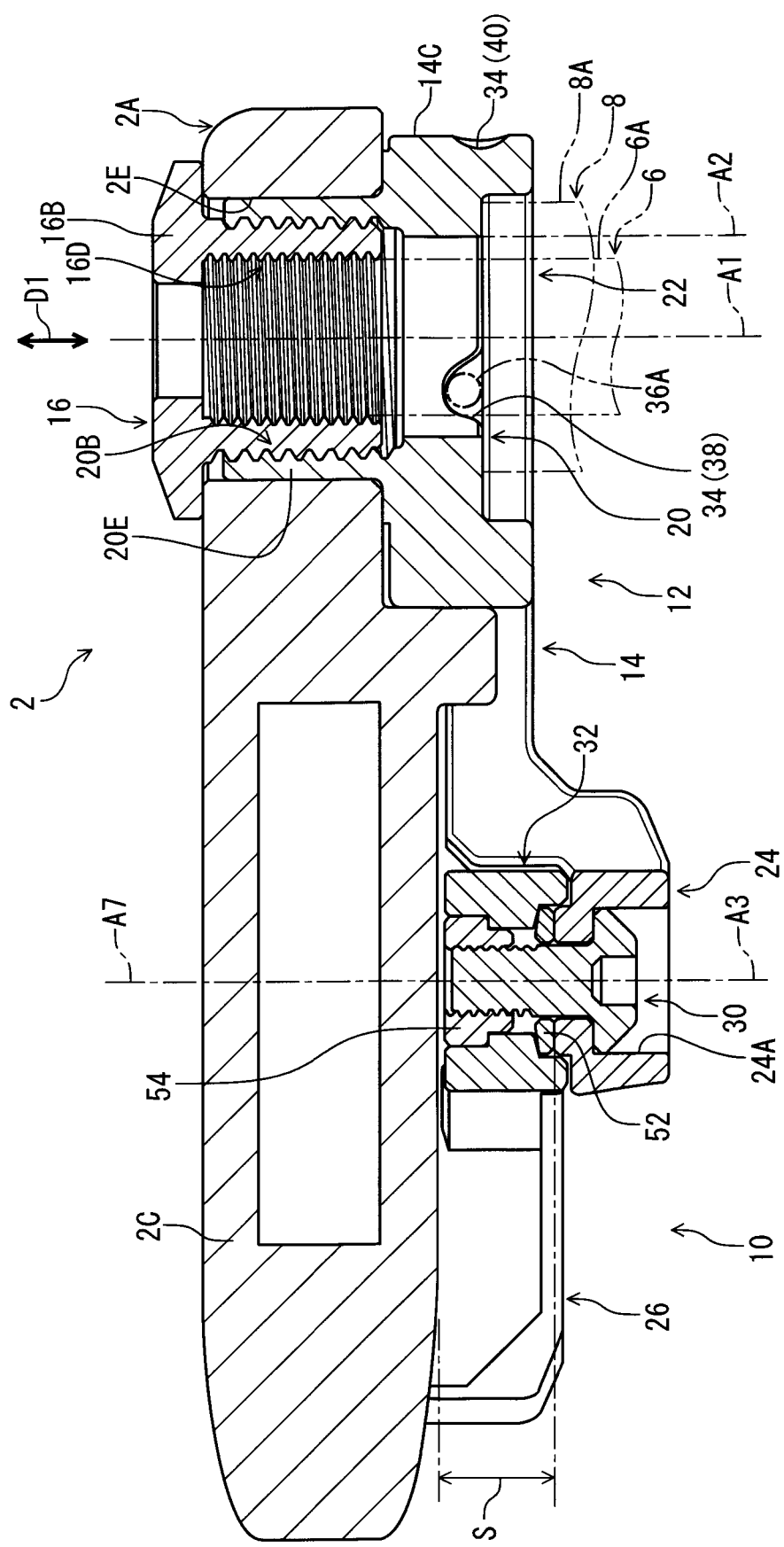
FIG. 8 is a cross-sectional view of the bracket assembly taken along line VIII-VIII of FIG. 4.

As seen in FIGS. 7 and 8, the component attachment portion 24 is configured to form a space S between the component attachment portion 24 and the frame 2A of the human-powered vehicle 2 in the bracket mounting state where the bracket apparatus 12 is mounted to the frame 2A of the human-powered vehicle 2. At least one of the component bracket 32 configured to mount the component 26 to the component attachment portion 24 and the component 26 configured to be mounted to the component attachment portion 24 is at least partly disposed in the space S in the component mounting state where the component 26 is mounted to the bracket apparatus 12. In the present embodiment, the component bracket 32 is partly disposed in the space S in the component mounting state. However, both the component bracket 32 and at least part of the component 26 can be at least partly provided in the space S if needed and/or desired.

As seen in FIGS. 5 and 8, the frame attachment center axis A1, the derailleur attachment center axis A2, and the component attachment center axis A3 extend along each other. At least one of the frame attachment center axis A1, the derailleur attachment center axis A2, and the component attachment center axis A3 is parallel to another of the frame attachment center axis A1, the derailleur attachment center axis A2, and the component attachment center axis A3. The frame attachment center axis A1, the derailleur attachment center axis A2, and the component attachment center axis A3 are parallel to each other. However, at least one of the frame attachment center axis A1, the derailleur attachment center axis A2, and the component attachment center axis A3 can be non-parallel to another of the frame attachment center axis A1, the derailleur attachment center axis A2, and the component attachment center axis A3 if needed and/or desired.

Second Embodiment

A bracket assembly 210 in accordance with a second embodiment will be described below referring to FIGS. 9 to 12. The bracket assembly 210 has the same structure and/or configuration as those of the bracket assembly 10 except for a chain stabilizer. Thus, elements having substantially the same function as those in the first embodiment will be numbered the same here and will not be described and/or illustrated again in detail here for the sake of brevity.

Figure 9:
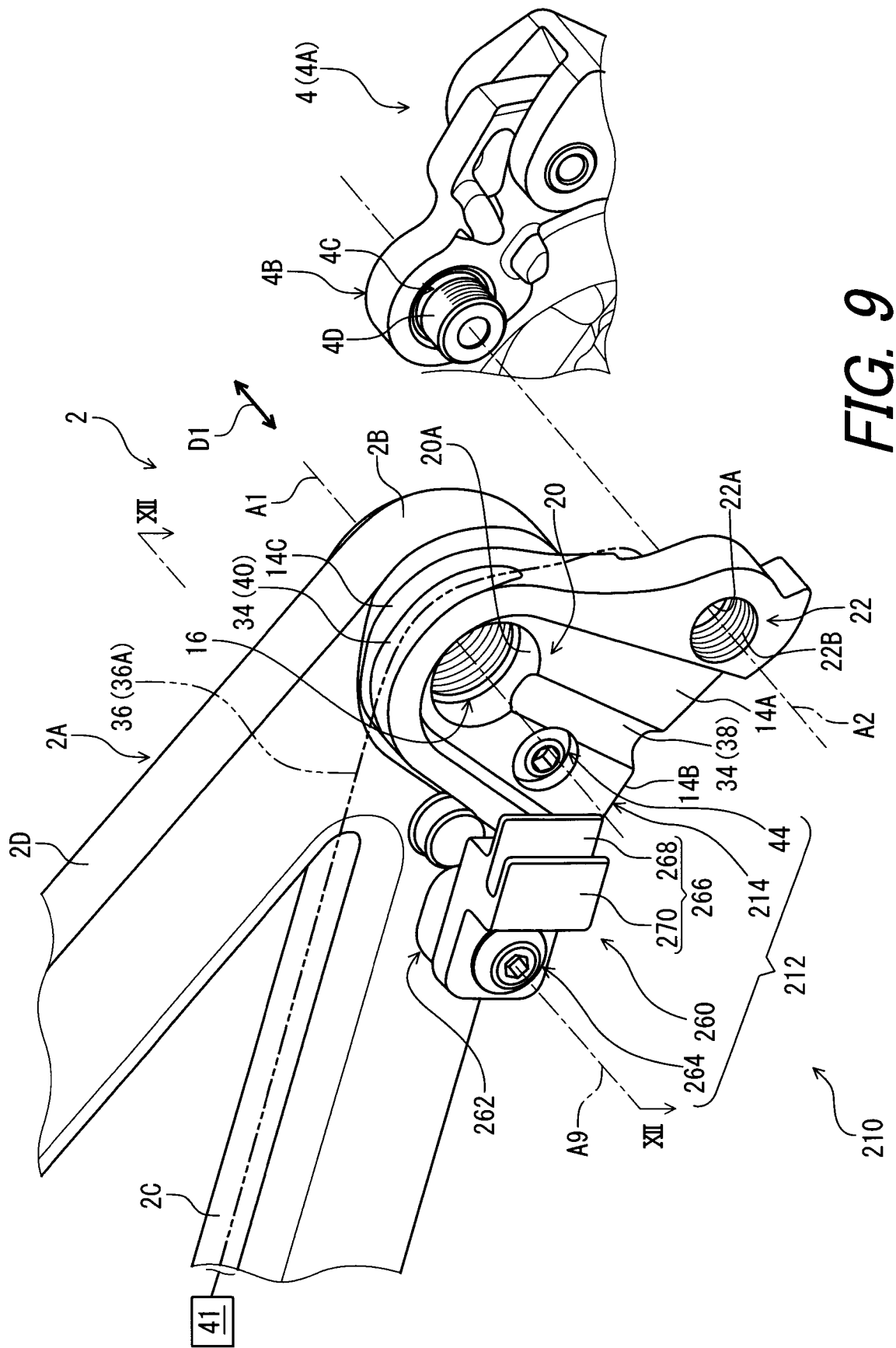
FIG. 9 is a perspective view of a bracket assembly in accordance with a second embodiment.

As seen in FIG. 9, the bracket assembly 210 comprises a bracket apparatus 212. The bracket apparatus 212 comprises a bracket body 214. The bracket body 214 includes the frame attachment portion 20 and the derailleur attachment portion 22 to which the derailleur 4 is to be attached. The bracket body 214 has substantially the same structure as the structure of the bracket body 14 of the bracket apparatus 12 of the first embodiment. In the present embodiment, the component attachment portion 24 is omitted from the bracket body 214. However, the bracket body 214 can include the component attachment portion 24 if needed and/or desired. The derailleur attachment portion 22 can be omitted from the bracket body 214 if needed and/or desired.

The bracket apparatus 212 further comprises a chain stabilizer 260. The bracket body 214 includes a stabilizer attachment portion 262 configured to mount the chain stabilizer 260. The chain stabilizer 260 is configured to be attached to the stabilizer attachment portion 262.

The bracket apparatus 212 further comprises a stabilizer fastener 264. The stabilizer fastener 264 is configured to fasten the chain stabilizer 260 to the stabilizer attachment portion 262 of the bracket body 214.

Figure 10:
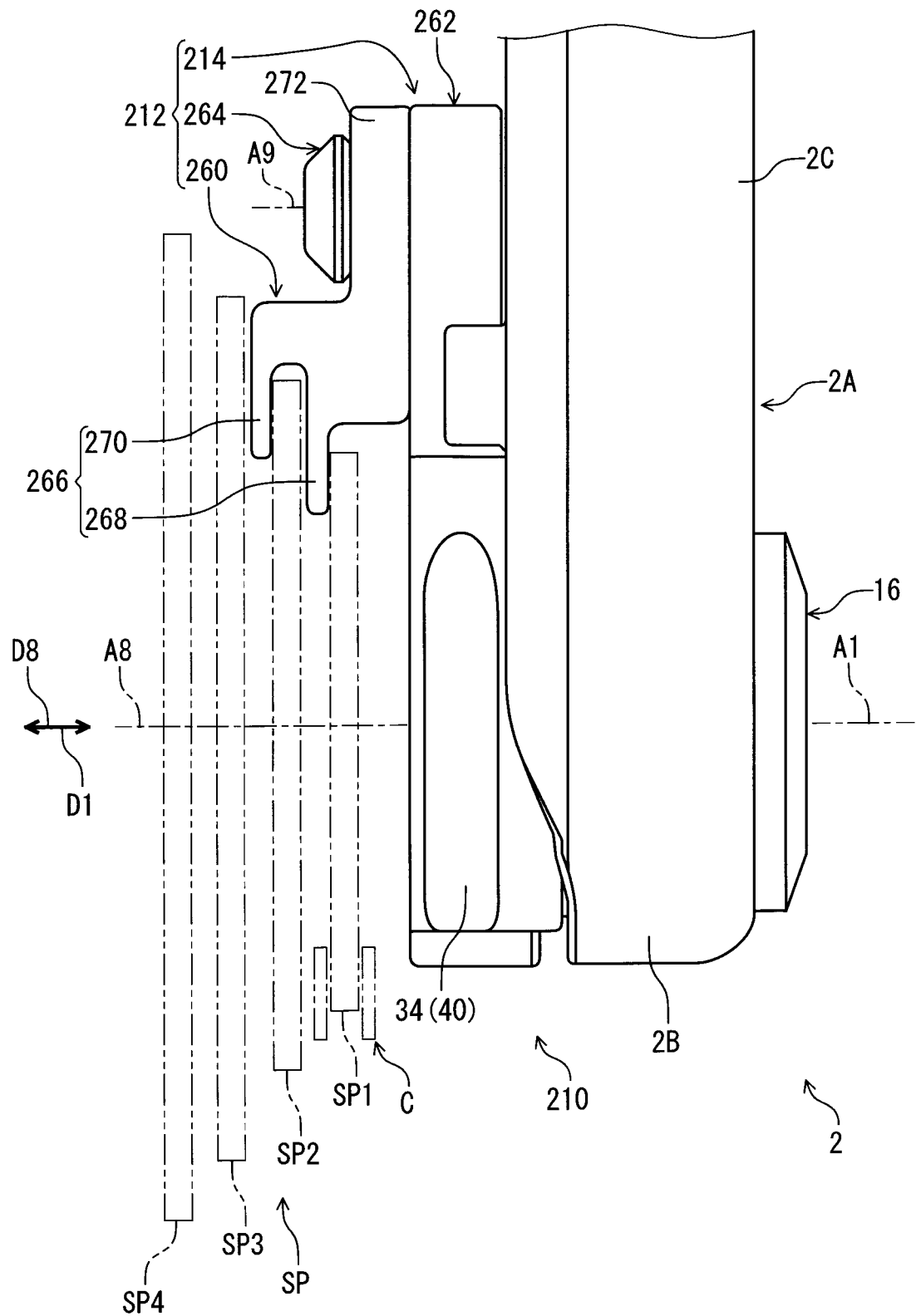
FIG. 10 is a plan elevational view of the bracket assembly illustrated in FIG. 9.

As seen in FIG. 10, the chain stabilizer 260 is configured to be provided radially outwardly of at least one sprocket of a plurality of sprockets SP to stabilize a chain C relative to the plurality of sprockets SP. The chain stabilizer 260 includes a cleaning portion 266 configured to be at least partly provided between adjacent two sprockets of the plurality of sprockets SP to remove a foreign material entering between the adjacent two sprockets in a mounting state where the bracket apparatus 212 is mounted to the frame 2A of the human-powered vehicle 2.

The cleaning portion 266 includes a first cleaner 268 and a second cleaner 270. The first cleaner 268 is configured to be provided between first adjacent two sprockets SP1 and SP2 of the plurality of sprockets SP to remove a foreign material entering between the first adjacent two sprockets SP1 and SP2. The second cleaner 270 is configured to be provided between second adjacent two sprockets SP2 and SP3 of the plurality of sprockets SP to remove a foreign material entering between the second adjacent two sprockets SP2 and SP3.

The first cleaner 268 and the second cleaner 270 are arranged in an axial direction D8 with respect to a rotational center axis A8 of the plurality of sprockets SP in the mounting state. The first cleaner 268 is spaced apart from the second cleaner 270 in the axial direction D1. One of the first cleaner 268 and the second cleaner 270 can be omitted from the cleaning portion 266 if needed and/or desired.

Figure 11:
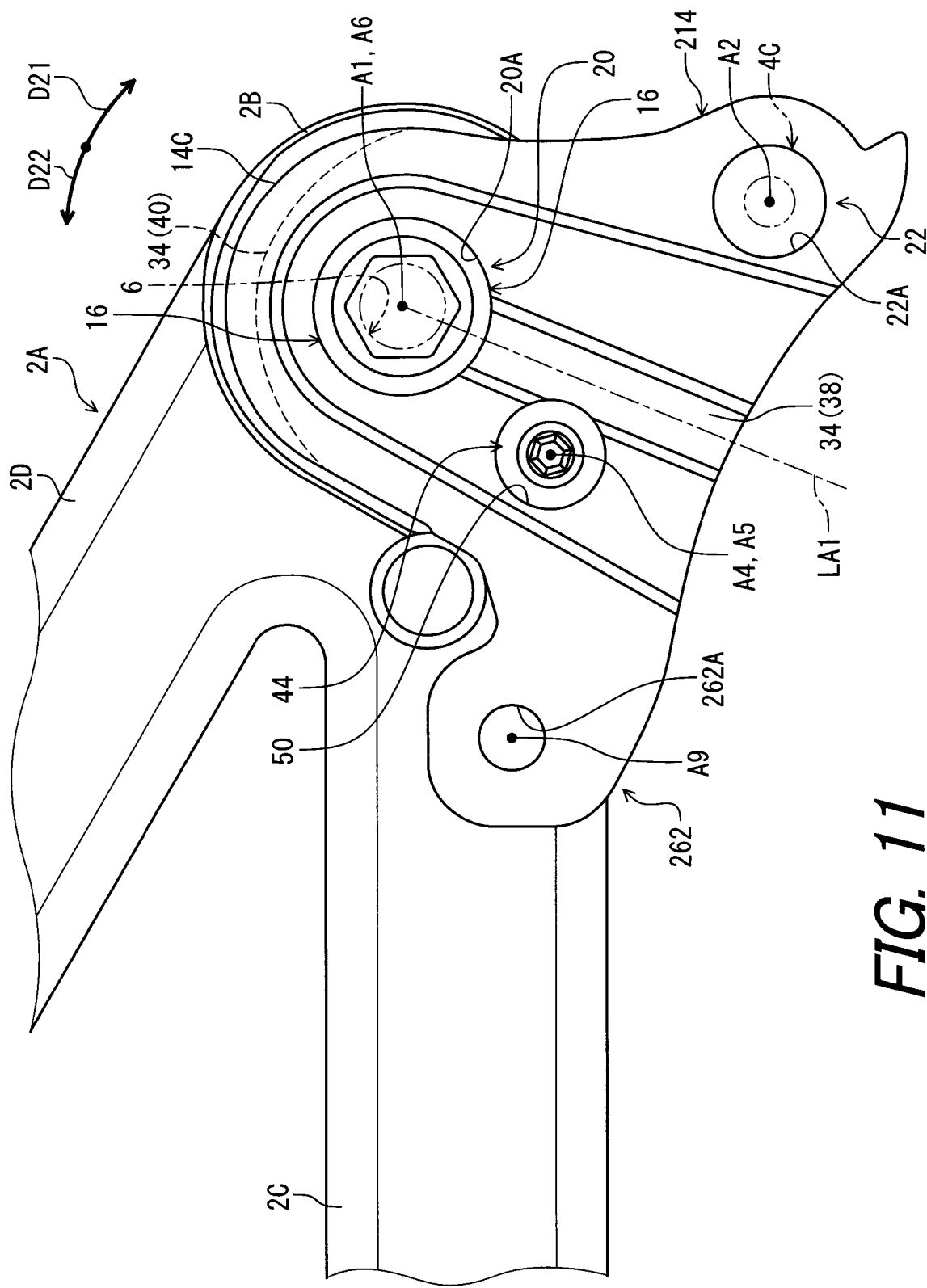
FIG. 11 is a side elevational view of the bracket assembly illustrated in FIG. 9 with a chain stabilizer omitted.

As seen in FIG. 11, the stabilizer attachment portion 262 is spaced apart from the frame attachment portion 20 and the derailleur attachment portion 22. However, the stabilizer attachment portion 262 can be provided in the same position as at least one of the positions of the frame attachment portion 20 and the derailleur attachment portion 22 if needed and/or desired.

The stabilizer attachment portion 262 is integrally provided with at least one of the frame attachment portion 20 and the derailleur attachment portion 22 as a one-piece unitary member. In the present embodiment, the stabilizer attachment portion 262 is integrally provided with the frame attachment portion 20 and the derailleur attachment portion 22 as a one-piece unitary member. However, the stabilizer attachment portion 262 can be a separate member from at least one of the frame attachment portion 20 and the derailleur attachment portion 22 as a one-piece unitary member.

The stabilizer attachment portion 262 includes a stabilizer attachment opening 262A. The stabilizer attachment opening 262A has a stabilizer attachment center axis A9. The stabilizer attachment opening 262A is spaced apart from the frame attachment opening 20A and the derailleur attachment opening 22A. The stabilizer attachment center axis A9 is spaced apart from the frame attachment center axis A1 and the derailleur attachment center axis A2. The stabilizer attachment center axis A9 is offset from the frame attachment center axis A1 and the derailleur attachment center axis A2. The stabilizer attachment center axis A9 is parallel to the frame attachment center axis A1 and the derailleur attachment center axis A2. However, the stabilizer attachment center axis A9 can be non-parallel to at least one of the frame attachment center axis A1 and the derailleur attachment center axis A2 if needed and/or desired.

Figure 12:
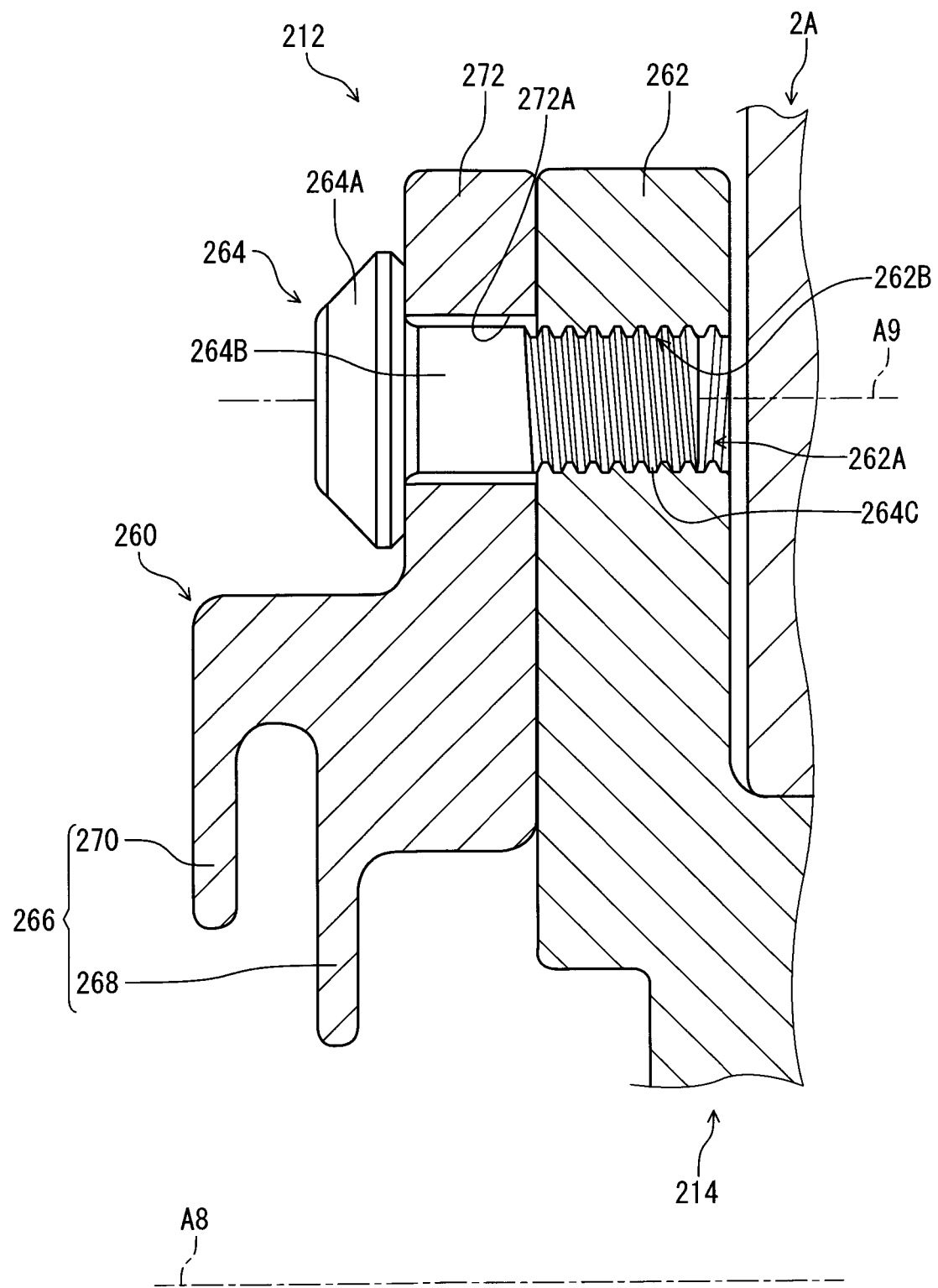
FIG. 12 is a cross-sectional view of the bracket assembly taken along line XII-XII of FIG. 9.

As seen in FIG. 12, the chain stabilizer 260 includes a stabilizer body 272. The stabilizer body 272 is attached to the stabilizer attachment portion 262 with the stabilizer fastener 264. The cleaning portion 266 extends from the stabilizer body 272 away from the stabilizer attachment center axis A9. The first cleaner 268 extends from the stabilizer body 272 away from the stabilizer attachment center axis A9. The second cleaner 270 extends from the stabilizer body 272 away from the stabilizer attachment center axis A9.

As seen in FIG. 10, the cleaning portion 266 extends from the stabilizer body 272 toward the rotational center axis A8 of the plurality of sprockets SP. The first cleaner 268 extends from the stabilizer body 272 toward the rotational center axis A8 of the plurality of sprockets SP. The second cleaner 270 extends from the stabilizer body 272 toward the rotational center axis A8 of the plurality of sprockets SP.

As seen in FIG. 12, the stabilizer body 272 includes a through-hole 272A. The stabilizer fastener 264 extends through the through-hole 272A in a stabilizer attachment state where the chain stabilizer 260 is attached to the stabilizer attachment portion 262. The stabilizer attachment opening 262A includes a threaded hole 262B. The stabilizer fastener 264 includes a head part 264A and a fastener body 264B. The fastener body 264B extends from the head part 264A. The fastener body 264B extends through the through-hole 272A in the stabilizer attachment state. The fastener body 264B includes an external thread 264C. The fastener body 264B is at least partly provided in the stabilizer attachment opening 262A. The fastener body 264B is at least partly provided in the threaded hole 262B. The external thread 264C of the stabilizer fastener 264 is configured to be threadedly engaged with the threaded hole 262B of the stabilizer attachment portion 262.

In the present embodiment, the cleaning portion 266 is integrally provided with the stabilizer body 272 as a one-piece unitary member. The first cleaner 268 is integrally provided with the stabilizer body 272 as a one-piece unitary member. The second cleaner 270 is integrally provided with the stabilizer body 272 as a one-piece unitary member. However, the cleaning portion 266 can be a separate member from the stabilizer body 272 if needed and/or desired. The first cleaner 268 can be a separate member from the stabilizer body 272 if needed and/or desired. The second cleaner 270 can be a separate member from the stabilizer body 272 if needed and/or desired.

In the present embodiment, the chain stabilizer 260 is a separate member from the stabilizer attachment portion 262. However, the chain stabilizer 260 can be integrally provided with the stabilizer attachment portion 262 as a one-piece unitary member if needed and/or desired.

Third Embodiment

A bracket assembly 310 in accordance with a second embodiment will be described below referring to FIGS. 13 to 16. The bracket assembly 310 has the same structure and/or configuration as those of the bracket assembly 10 except for a chain stabilizer. Thus, elements having substantially the same function as those in the first embodiment will be numbered the same here and will not be described and/or illustrated again in detail here for the sake of brevity.

Figure 13:
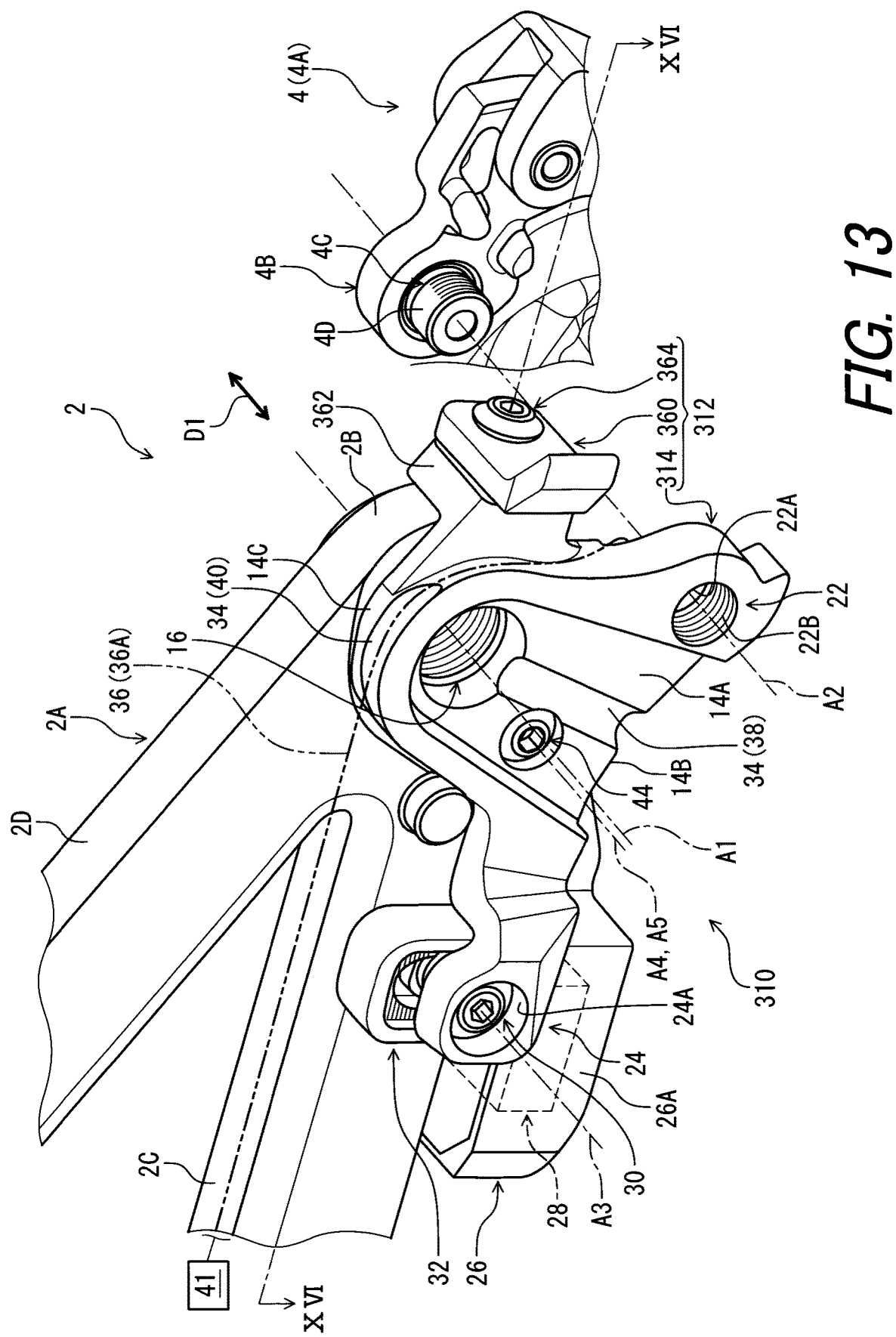
FIG. 13 is a perspective view of a bracket assembly in accordance with a third embodiment.

As seen in FIG. 13, the bracket assembly 310 comprises a bracket apparatus 312. The bracket apparatus 312 comprises a bracket body 314. The bracket body 314 includes the frame attachment portion 20 and the derailleur attachment portion 22 to which the derailleur 4 is to be attached. The bracket body 314 has substantially the same structure as the structure of the bracket body 14 of the bracket apparatus 12 of the first embodiment.

The bracket apparatus 312 further comprises a chain stabilizer 360. The bracket body 314 includes a stabilizer attachment portion 362 configured to mount the chain stabilizer 360. The chain stabilizer 360 is configured to be attached to the stabilizer attachment portion 362.

The bracket apparatus 312 further comprises a stabilizer fastener 364. The stabilizer fastener 364 is configured to fasten the chain stabilizer 360 to the stabilizer attachment portion 362 of the bracket body 314.

Figure 14:
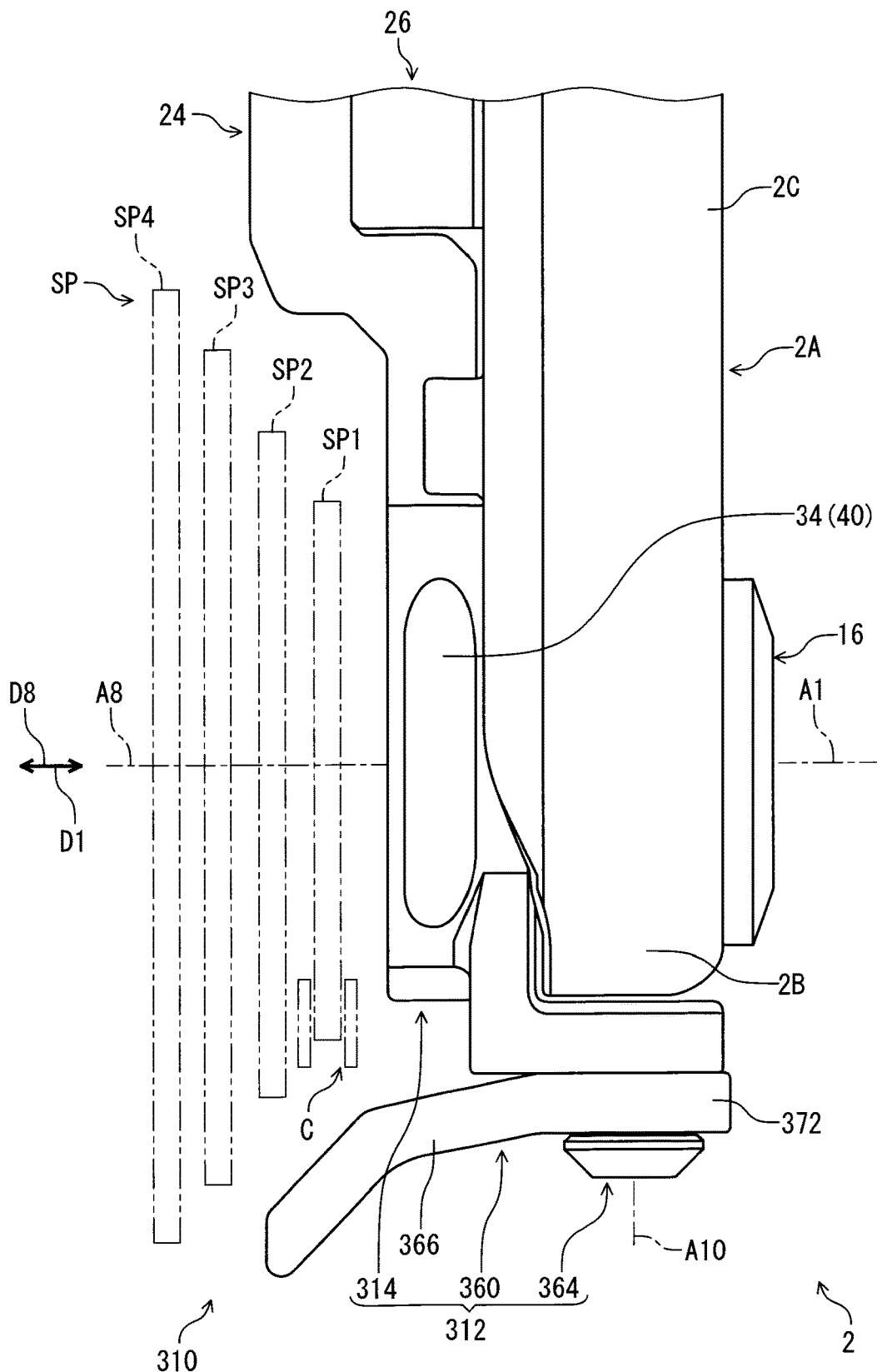
FIG. 14 is a plan elevational view of the bracket assembly illustrated in FIG. 13.

As seen in FIG. 14, the chain stabilizer 360 is configured to be provided radially outwardly of at least one sprocket of the plurality of sprockets SP to stabilize the chain C relative to the plurality of sprockets SP. The chain stabilizer 360 includes a chain restricting portion 366. The chain restricting portion 366 is configured to be provided to the stabilizer attachment portion 362 to be contactable with the chain C. The chain restricting portion 366 is provided radially outwardly of the chain C engaged with one sprocket of the plurality of sprockets SP in a mounting state where the bracket apparatus 312 is mounted to the frame 2A of the human-powered vehicle 2.

The chain restricting portion 366 is at least partly deformable if the chain restricting portion 366 contacts the chain C. In the present embodiment, the chain restricting portion 366 is entirely deformable if the chain restricting portion 366 contacts the chain C. However, the chain restricting portion 366 can be configured to be partly deformable if the chain restricting portion 366 contacts the chain C if needed and/or desired.

Figure 15:
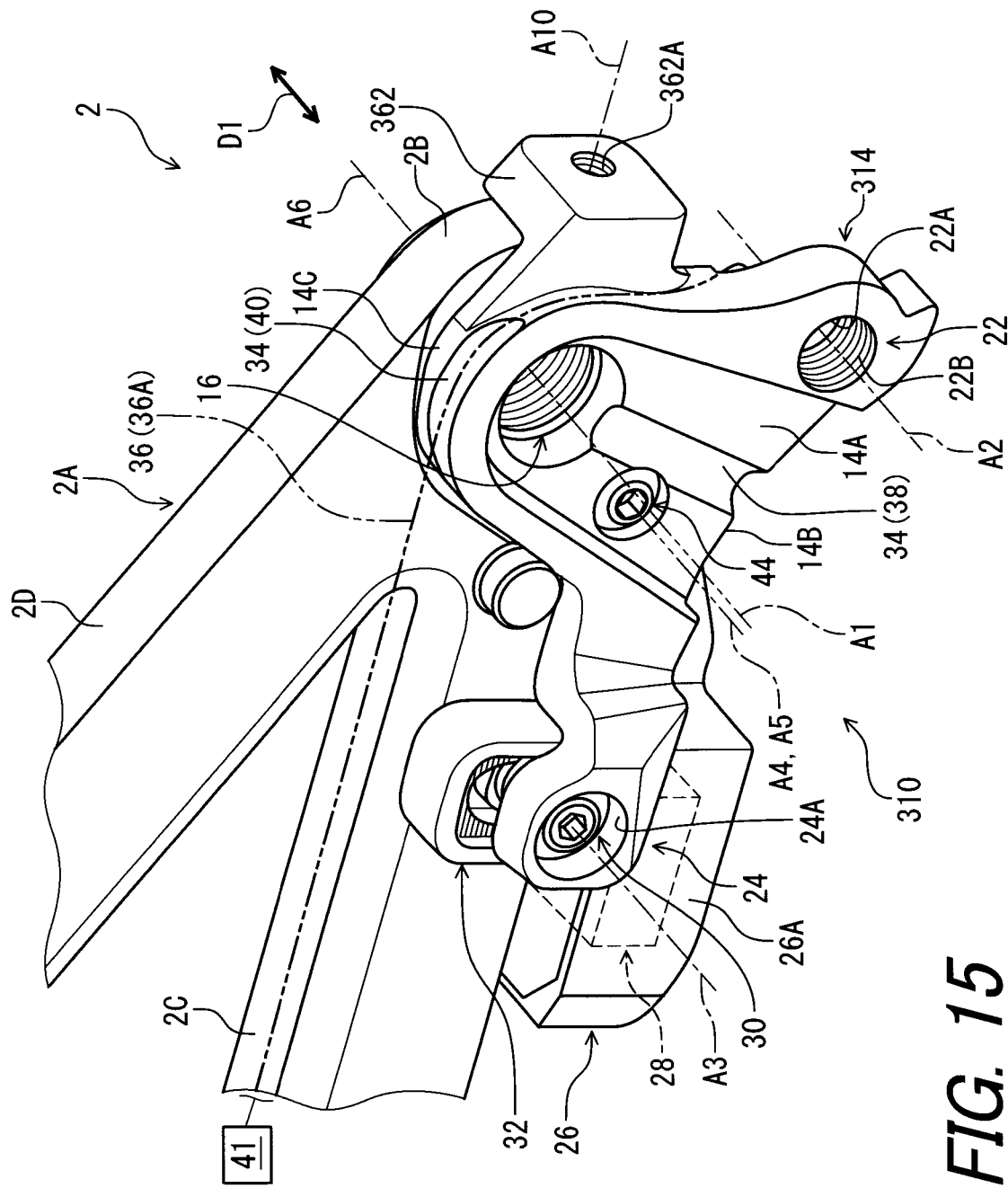
FIG. 15 is a perspective view of the bracket assembly illustrated in FIG. 13 with a chain stabilizer omitted.

As seen in FIG. 15, the stabilizer attachment portion 362 is spaced apart from the frame attachment portion 20 and the derailleur attachment portion 22. However, the stabilizer attachment portion 362 can be provided in the same position as at least one of the positions of the frame attachment portion 20 and the derailleur attachment portion 22 if needed and/or desired.

Figure 16:
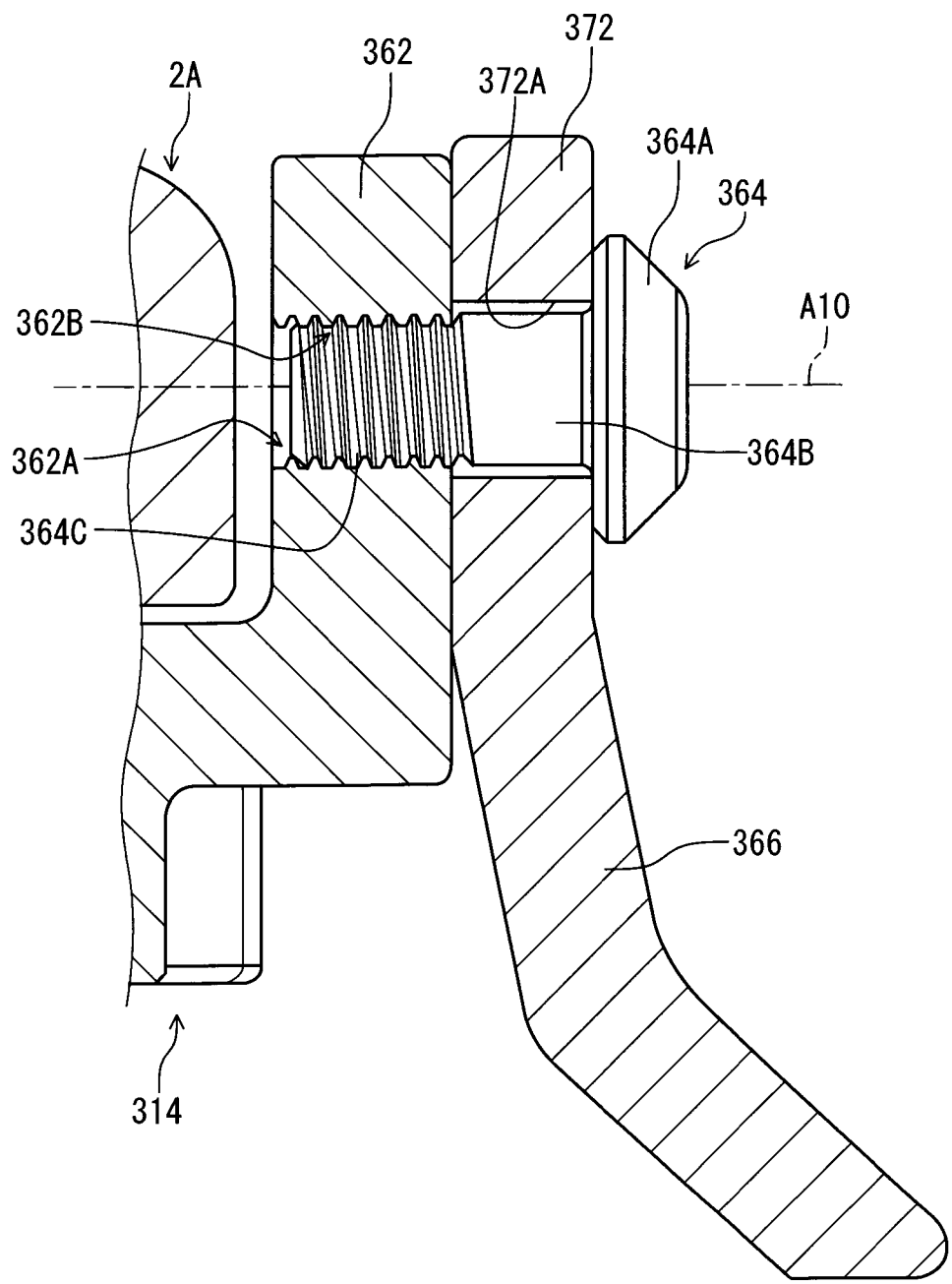
FIG. 16 is a cross-sectional view of the bracket assembly taken along line XVI-XVI of FIG. 13.

As seen in FIG. 16, the stabilizer body 372 includes a through-hole 372A. The stabilizer fastener 364 extends through the through-hole 372A in a stabilizer attachment state where the chain stabilizer 260 is attached to the stabilizer attachment portion 362. The stabilizer attachment opening 362A includes a threaded hole 362B. The stabilizer fastener 364 includes a head part 364A and a fastener body 364B. The fastener body 364B extends from the head part 364A. The fastener body 364B extends through the through-hole 372A in the stabilizer attachment state. The fastener body 364B includes an external thread 364C. The fastener body 364B is at least partly provided in the stabilizer attachment opening 362A. The fastener body 364B is at least partly provided in the threaded hole 362B. The external thread 364C of the stabilizer fastener 364 is configured to be threadedly engaged with the threaded hole 362B of the stabilizer attachment portion 362.

The chain stabilizer 360 includes a stabilizer body 372. The stabilizer body 372 is attached to the stabilizer attachment portion 362 with the stabilizer fastener 364. The chain restricting portion 366 extends from the stabilizer body 372 away from the stabilizer attachment center axis A10.

In the present embodiment, the chain restricting portion 366 is integrally provided with the stabilizer body 372 as a one-piece unitary member. However, the chain restricting portion 366 can be a separate member from the stabilizer body 372 if needed and/or desired.

In the present embodiment, the chain stabilizer 360 is a separate member from the stabilizer attachment portion 362. However, the chain stabilizer 360 can be integrally provided with the stabilizer attachment portion 362 as a one-piece unitary member if needed and/or desired.

As seen in FIG. 15, the stabilizer attachment portion 362 is integrally provided with at least one of the frame attachment portion 20 and the derailleur attachment portion 22 as a one-piece unitary member. In the present embodiment, the stabilizer attachment portion 362 is integrally provided with the frame attachment portion 20 and the derailleur attachment portion 22 as a one-piece unitary member. However, the stabilizer attachment portion 362 can be a separate member from at least one of the frame attachment portion 20 and the derailleur attachment portion 22 as a one-piece unitary member.

The stabilizer attachment portion 362 includes a stabilizer attachment opening 362A. The stabilizer attachment opening 362A has a stabilizer attachment center axis A10. The stabilizer attachment opening 362A is spaced apart from the frame attachment opening 20A and the derailleur attachment opening 22A. The stabilizer attachment center axis A10 is non-parallel to the frame attachment center axis A1 and the derailleur attachment center axis A2. However, the stabilizer attachment center axis A10 can be parallel to at least one of the frame attachment center axis A1 and the derailleur attachment center axis A2 if needed and/or desired.

Modifications

Figure 17:
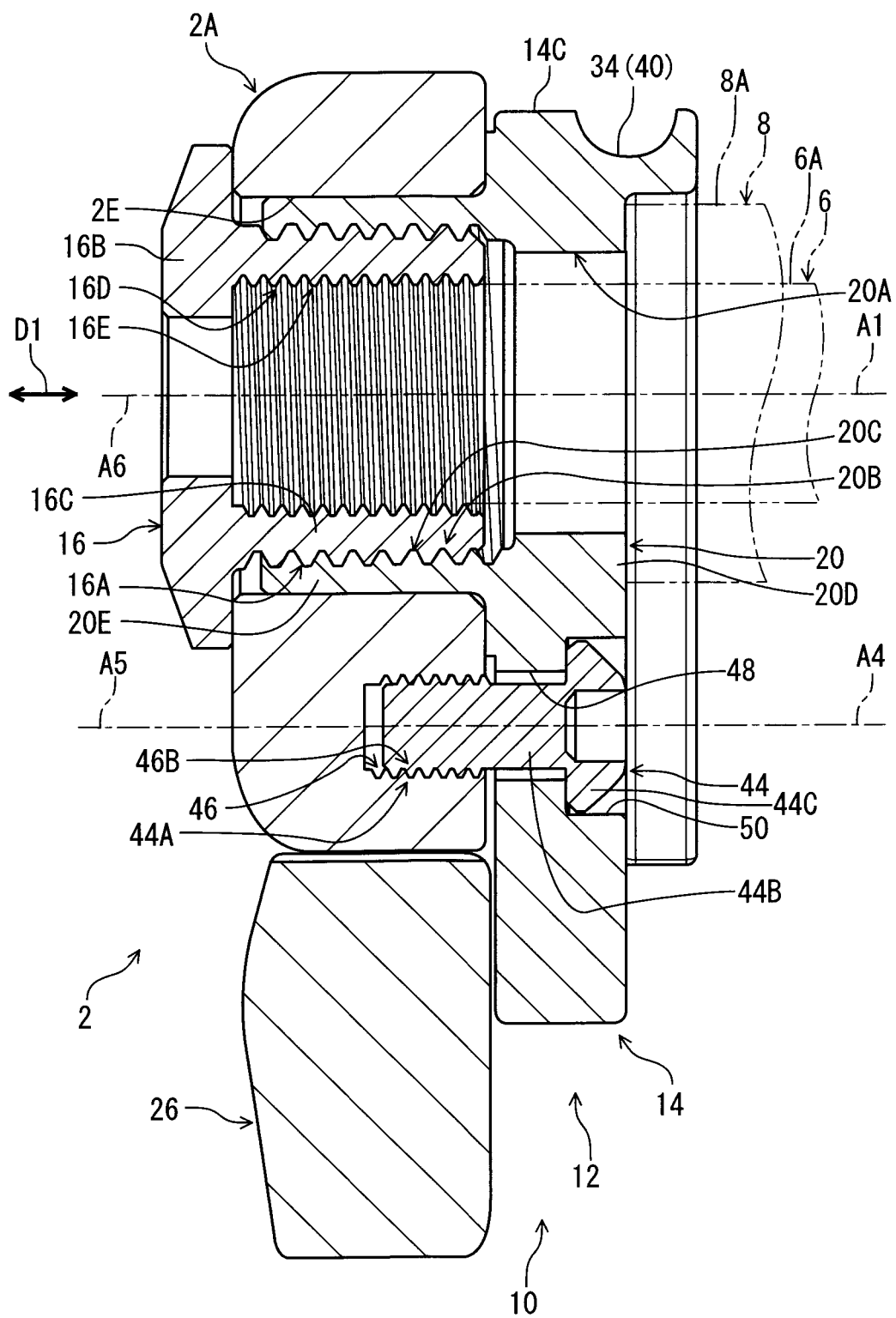
FIGS. 17 to 37 are cross-sectional views of the bracket assemblies in accordance with modifications.
Figure 18:
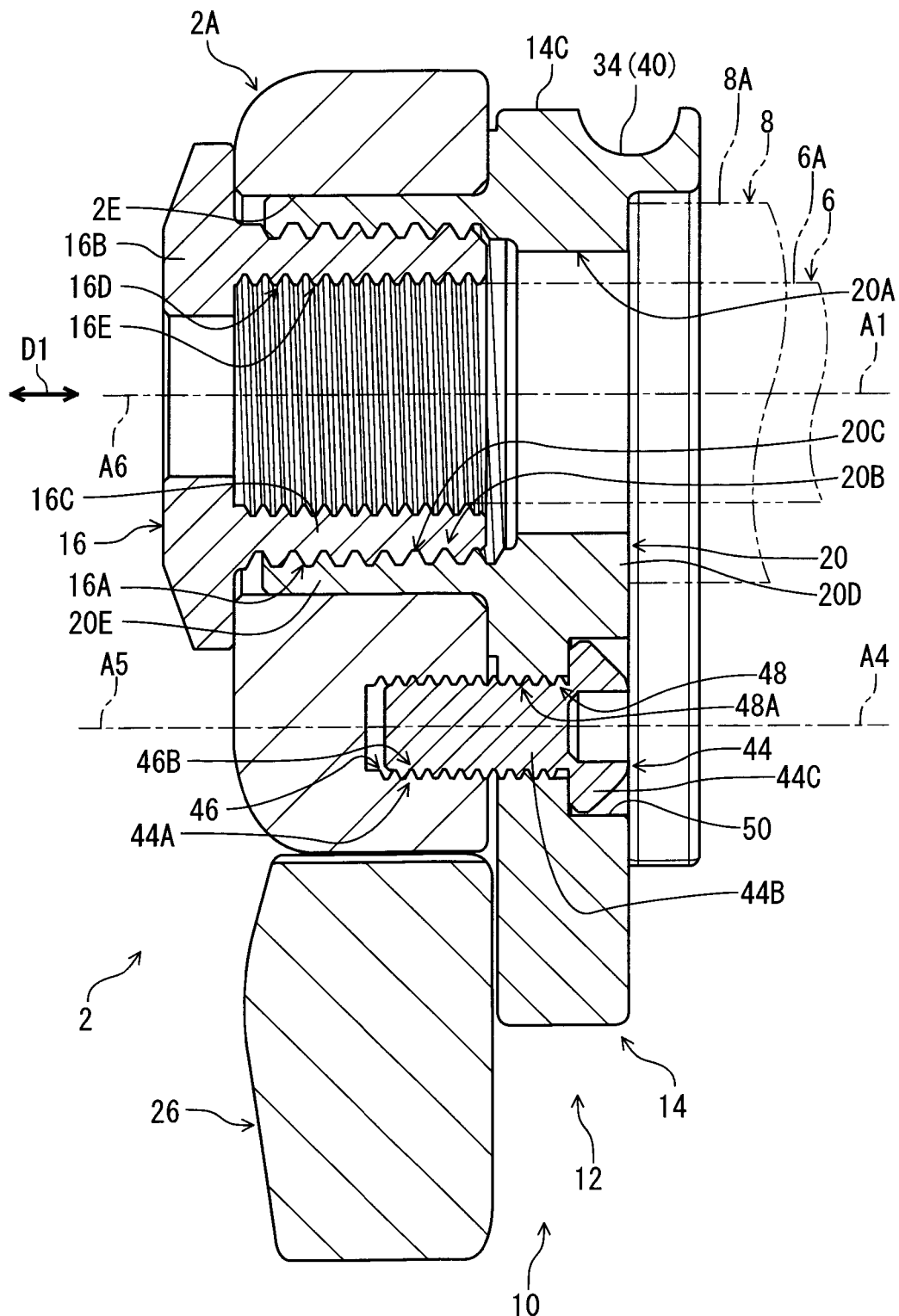

In the first to third embodiments, the additional opening 48 includes the threaded hole 48A. The restriction opening 46 is free of a threaded hole. As seen in FIGS. 17 and 18, however, the bracket body 14 can include the restriction opening 46 in which the restriction member 44 is configured to be at least partly provided to restrict a rotation of the bracket body 14 relative to the frame 2A of the human-powered vehicle 2 in the bracket mounting state where the bracket apparatus 12 is mounted to the frame 2A of the human-powered vehicle 2. In the modifications depicted in FIGS. 17 and 18, the restriction member 44 includes the external thread 44A. At least one of the restriction opening 46 and the additional opening 48 includes a threaded hole configured to be threadedly engaged with the external thread 44A of the restriction member 44. The restriction opening 46 includes a threaded hole 46B configured to be threadedly engaged with the external thread 44A of the restriction member 44. In the modification depicted in FIG. 17, the additional opening 48 is free of a threaded hole. In the modification depicted in FIG. 18, the additional opening 48 includes the threaded hole 48A as with the first embodiment. Each of the modifications depicted in FIGS. 17 and 18 can be applied to the second and third embodiments.

Figure 19:
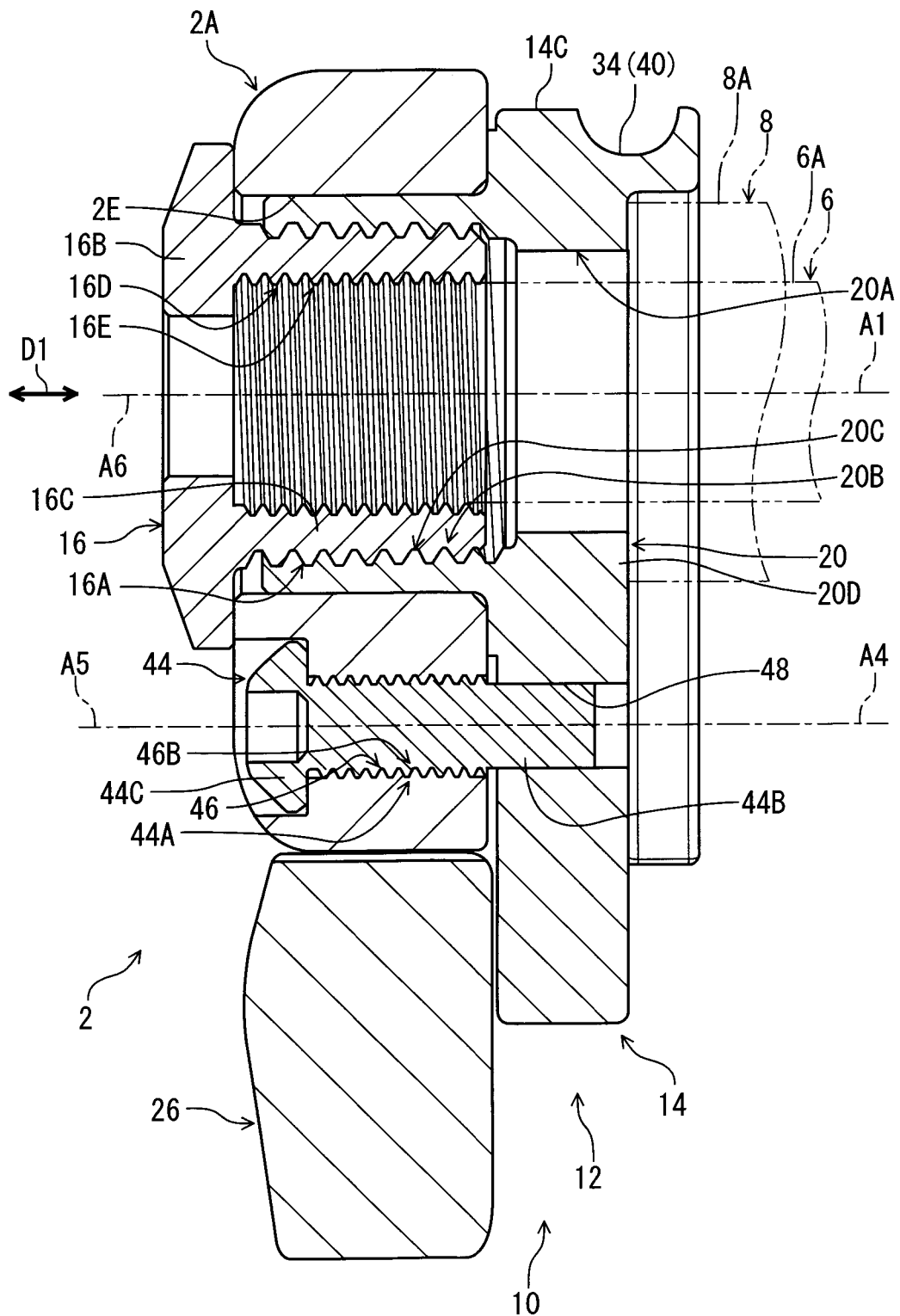
Figure 20:
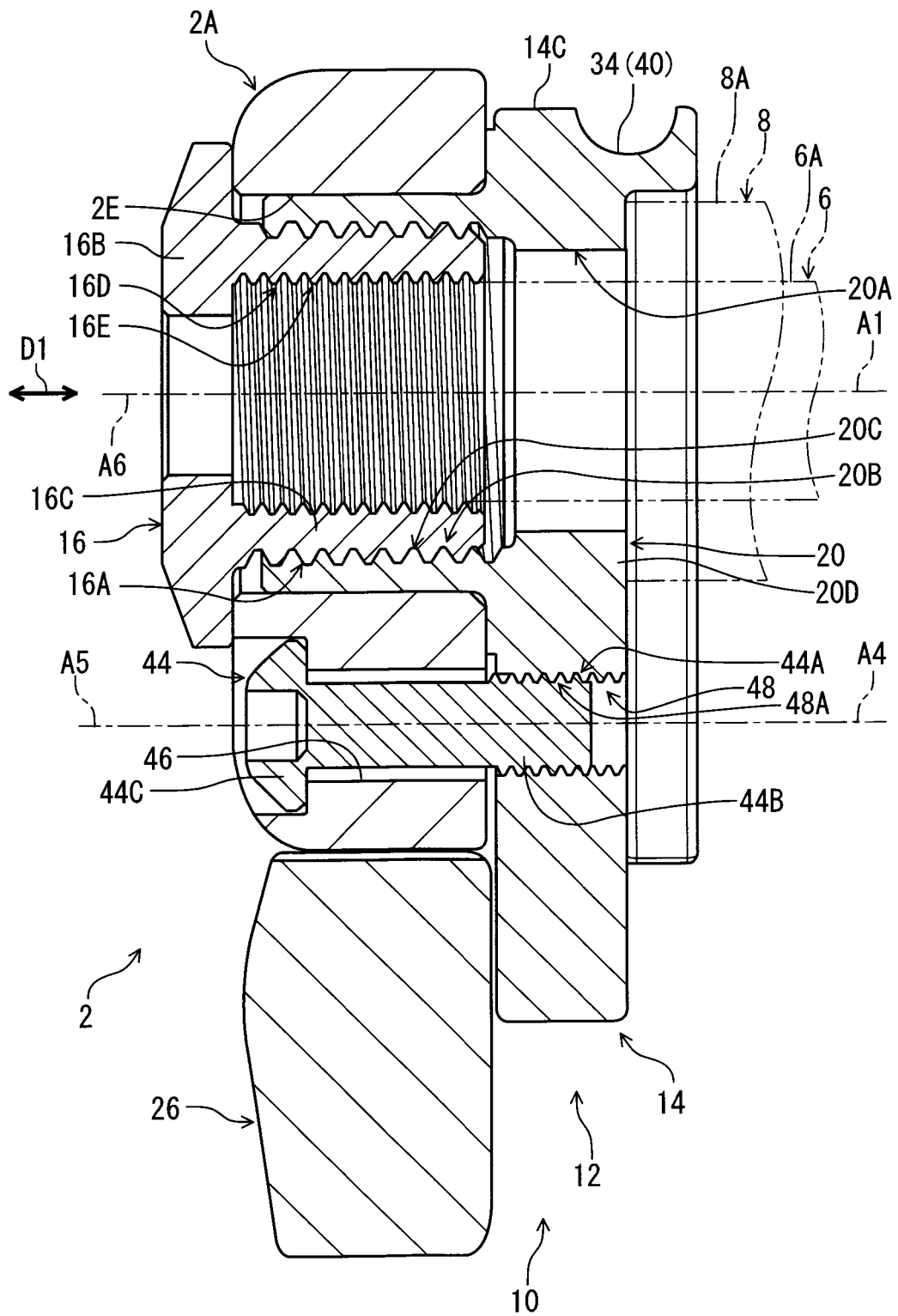
Figure 21:
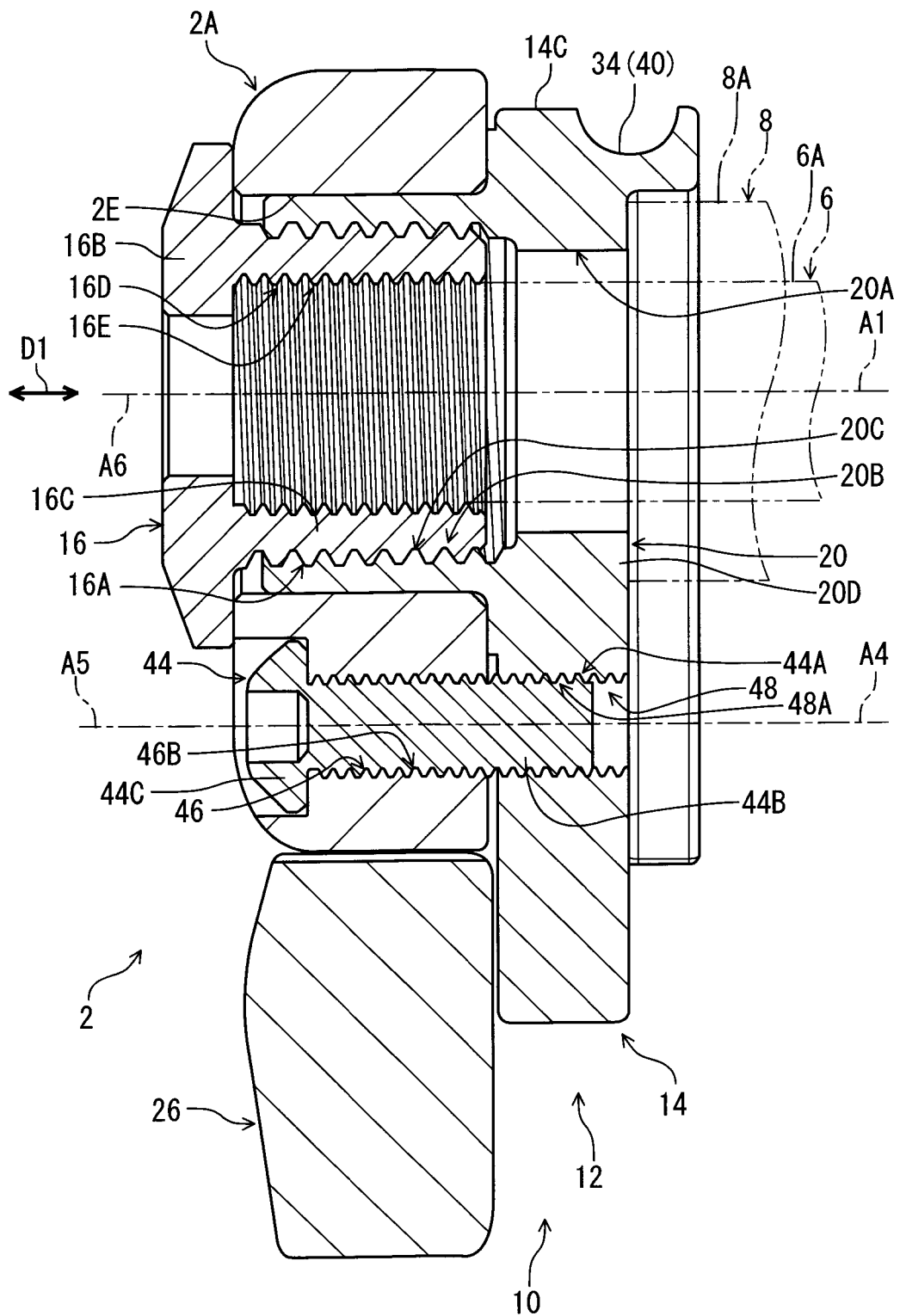

In the first to third embodiments and the modifications depicted in FIGS. 17 and 18, the restriction member 44 is provided to the bracket body 14, and the restriction opening 46 is provided to the frame 2A. As seen in FIGS. 19 to 21, however, the restriction member 44 can be provided to the frame 2A, and the restriction opening 46 can be provided to the bracket body 14. In the modifications depicted in FIGS. 19 to 21, the restriction member 44 protrudes from the frame 2A of the human-powered vehicle 2 in the bracket mounting state and is configured to be at least partly provided in the restriction opening 46 in the bracket mounting state. In the modification depicted in FIG. 19, the additional opening 48 includes the threaded hole 48A configured to be threadedly engaged with the external thread 44A of the restriction member 44. The restriction opening 46 is free of a threaded hole. The restriction member 44 is at least partly provided in the restriction opening 46 without being press-fitted in the restriction opening 46. However, the restriction member 44 can be press-fitted in the restriction opening 46 if needed and/or desired. In the modification depicted in FIG. 20, the restriction opening 46 includes the threaded hole 46B configured to be threadedly engaged with the external thread 44A of the restriction member 44. The additional opening 48 is free of a threaded hole. In the modification depicted in FIG. 21, the restriction opening 46 includes the threaded hole 46B, and the additional opening 48 includes the threaded hole 48A.

In the first to third embodiment and the modifications depicted in FIGS. 17 and 21, the restriction member 44 includes the external thread 44A. As seen in FIGS. 22 to 26, however, the restriction member 44 can be free of an external thread if needed and/or desired.

Figure 22:
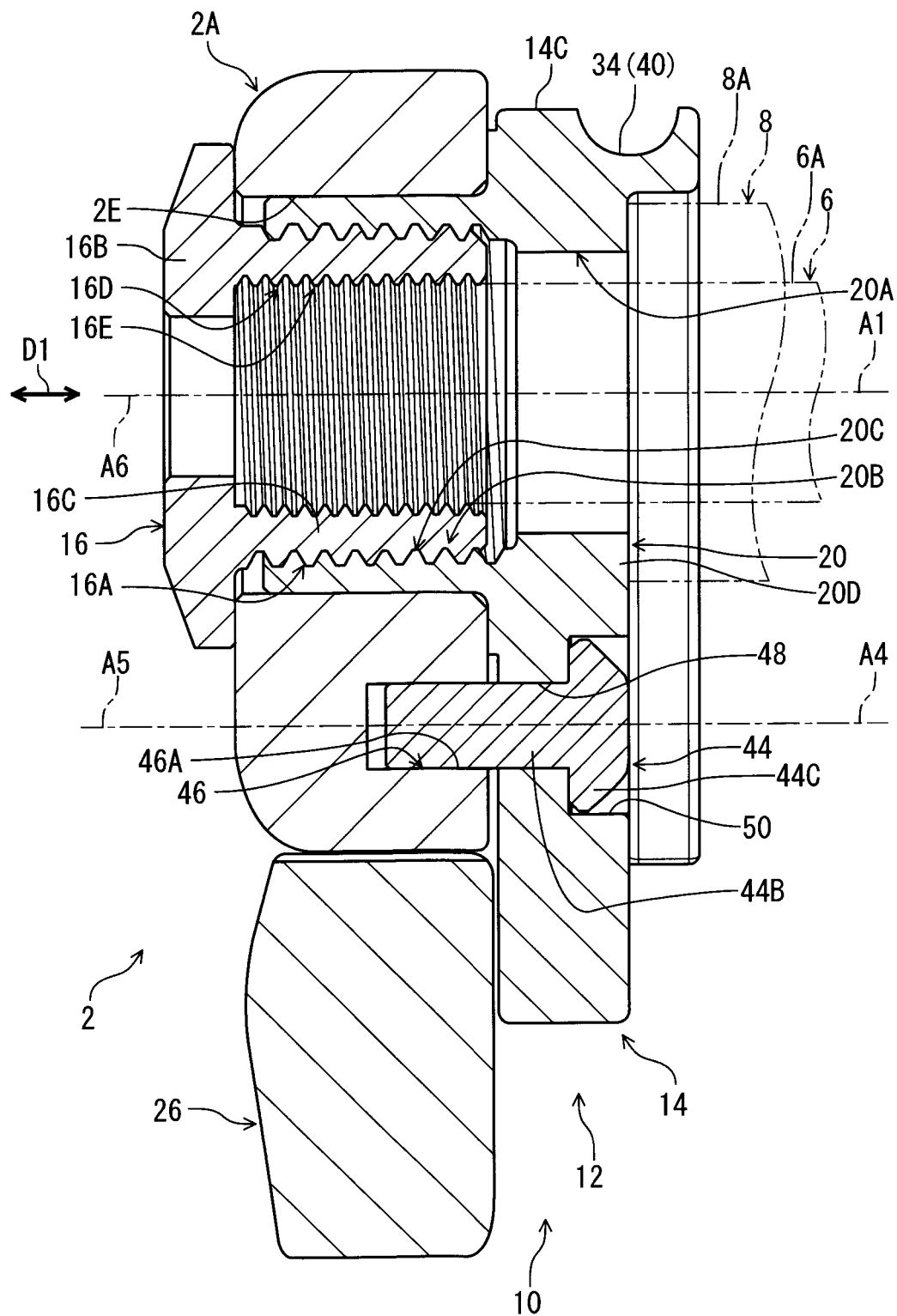

In the modification depicted in FIG. 22, the restriction member 44 can be press-fitted in the additional opening 48 while the restriction member 44 is provided in the restriction opening 46 without being press-fitted in the restriction opening 46. The restriction opening 46 is provided to the frame 2A of the human-powered vehicle 2. The restriction member 44 protrudes from the bracket body 14 in the bracket mounting state and is configured to be at least partly provided in the restriction opening 46 in the bracket mounting state. In the modification depicted in FIG. 22, the restriction member 44 can be press-fitted in the restriction opening 46 while the restriction member 44 is provided in the additional opening 48 without being press-fitted in the additional opening 48. In the modification depicted in FIG. 22, the restriction member 44 can be press-fitted in the restriction opening 46 and the additional opening 48. The modification depicted in FIG. 22 can be applied to the second and third embodiments.

Figure 23:
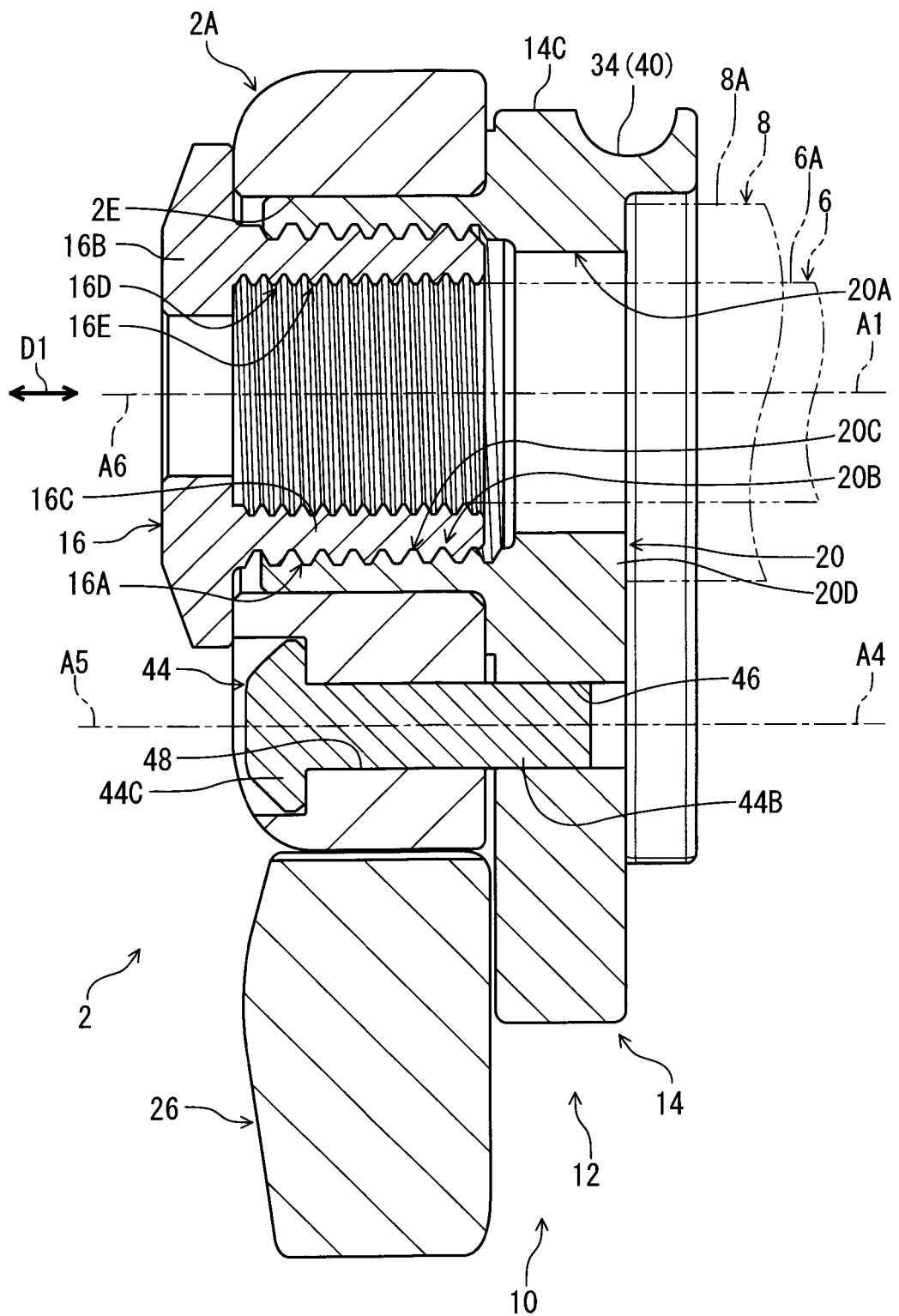

In the modification depicted in FIG. 23, the restriction member 44 can be press-fitted in the additional opening 48 while the restriction member 44 is provided in the restriction opening 46 without being press-fitted in the restriction opening 46. The restriction opening 46 is provided to the bracket body 14. The restriction member 44 protrudes from the frame 2A of the human-powered vehicle 2 in the bracket mounting state and is configured to be at least partly provided in the restriction opening 46 in the bracket mounting state. In the modification depicted in FIG. 23, the restriction member 44 can be press-fitted in the restriction opening 46 while the restriction member 44 is provided in the additional opening 48 without being press-fitted in the additional opening 48. In the modification depicted in FIG. 23, the restriction member 44 can be press-fitted in the restriction opening 46 and the additional opening 48. The modification depicted in FIG. 23 can be applied to the second and third embodiments.

Figure 24:
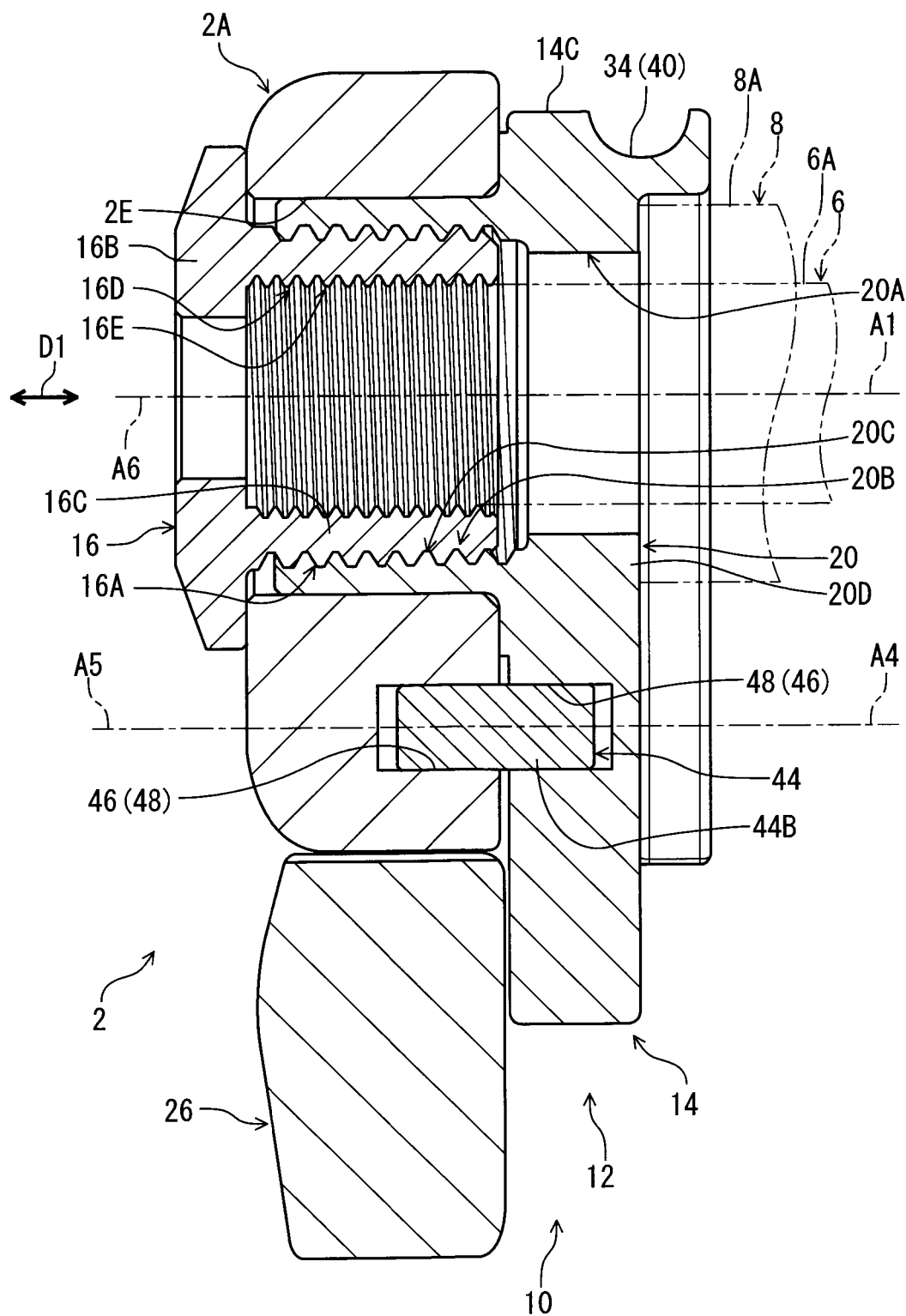

In the modification depicted in FIG. 24, the restriction member 44 is free of an external thread and the large-diameter body 44C. In a case where the restriction member 44 is provided to the bracket body 14 and the restriction opening 46 is provided to the frame 2A, the restriction member 44 is press-fitted in the additional opening 48 of the bracket body 14 while the restriction member 44 is provided in the restriction opening 46 of the frame 2A without being press-fitted in the restriction opening 46. The restriction member 44 protrudes from the bracket body 14 in the bracket mounting state and is configured to be at least partly provided in the restriction opening 46 in the bracket mounting state. In a case where the restriction member 44 is provided to the frame 2A and the restriction opening 46 is provided to the bracket body 14, the restriction member 44 is press-fitted in the additional opening 48 of the frame 2A while the restriction member 44 is provided in the restriction opening 46 of the bracket body 14 without being press-fitted in the restriction opening 46. The restriction member 44 protrudes from the frame 2A of the human-powered vehicle 2 in the bracket mounting state and is configured to be at least partly provided in the restriction opening 46 in the bracket mounting state. The restriction member 44 can be press-fitted in the restriction opening 46 and the additional opening 48. At least one of the restriction opening 46 and the additional opening 48 can include a through-hole if needed and/or desired.

Figure 25:
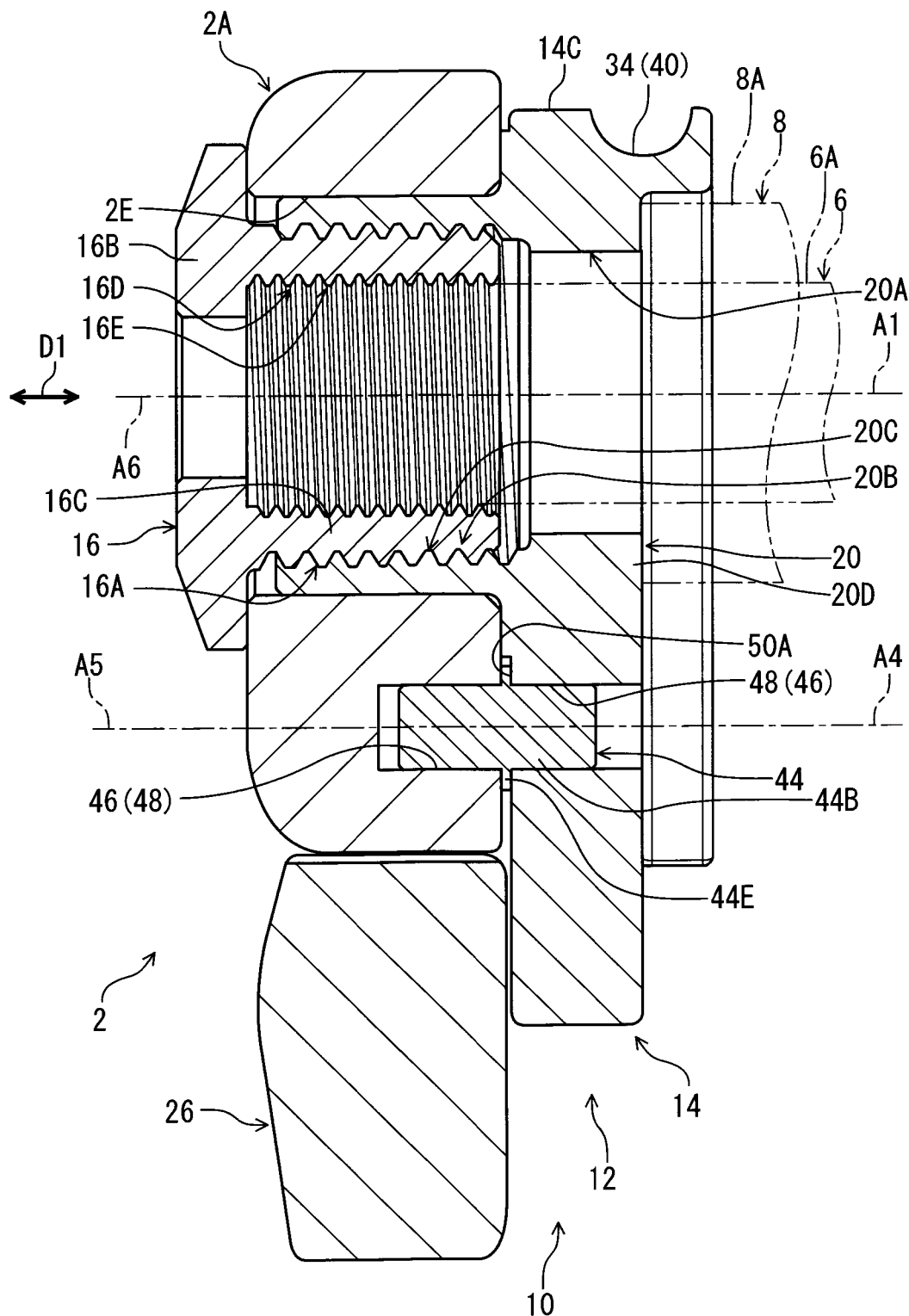
Figure 26:
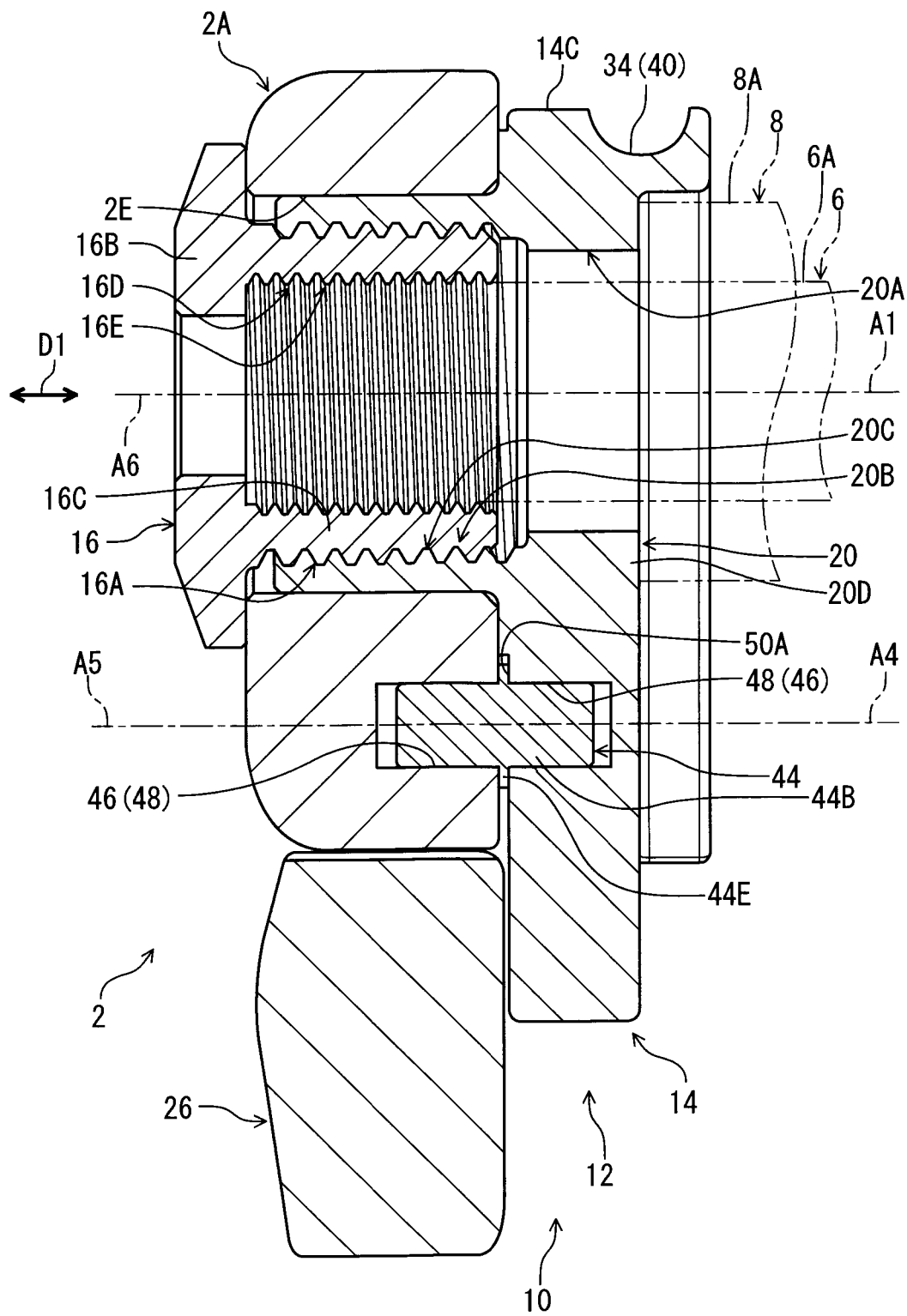

In the modification depicted in FIGS. 25 and 26, the restriction member 44 is provided in the restriction opening 46 and the additional opening 48 without being press-fitted in the restriction opening 46 and the additional opening 48. The restriction member 44 includes the restriction rod 44B and a large-diameter body 44E. The large-diameter body 44F is provided at an end of the restriction rod 44B. The restriction rod 44B extends from the large-diameter body 44E. An outer diameter of the large-diameter body 44E is larger than an outer diameter of the restriction rod 44B. The outer diameter of the large-diameter body 44E is larger than the inner diameter of the restriction opening 46. The large-diameter body 44E is provided between the bracket body 14 and the frame 2A. The bracket body 14 includes a recess 50A. The large-diameter body 44E is at least partly provided in the recess 50A in the bracket mounting state. The large-diameter body 44E is entirely provided in the recess 50A in the bracket mounting state. The large-diameter body 44E can be partly provided in the recess 50A in the bracket mounting state if needed and/or desired. The large-diameter body 44E can have shapes such as a flange and at least one pin. In the modification depicted in FIG. 26, the additional opening 48 has a closed end, and therefore the large-diameter body 44E can be omitted from the restriction member 44 as shown in FIG. 24 if needed and/or desired.

Figure 27:
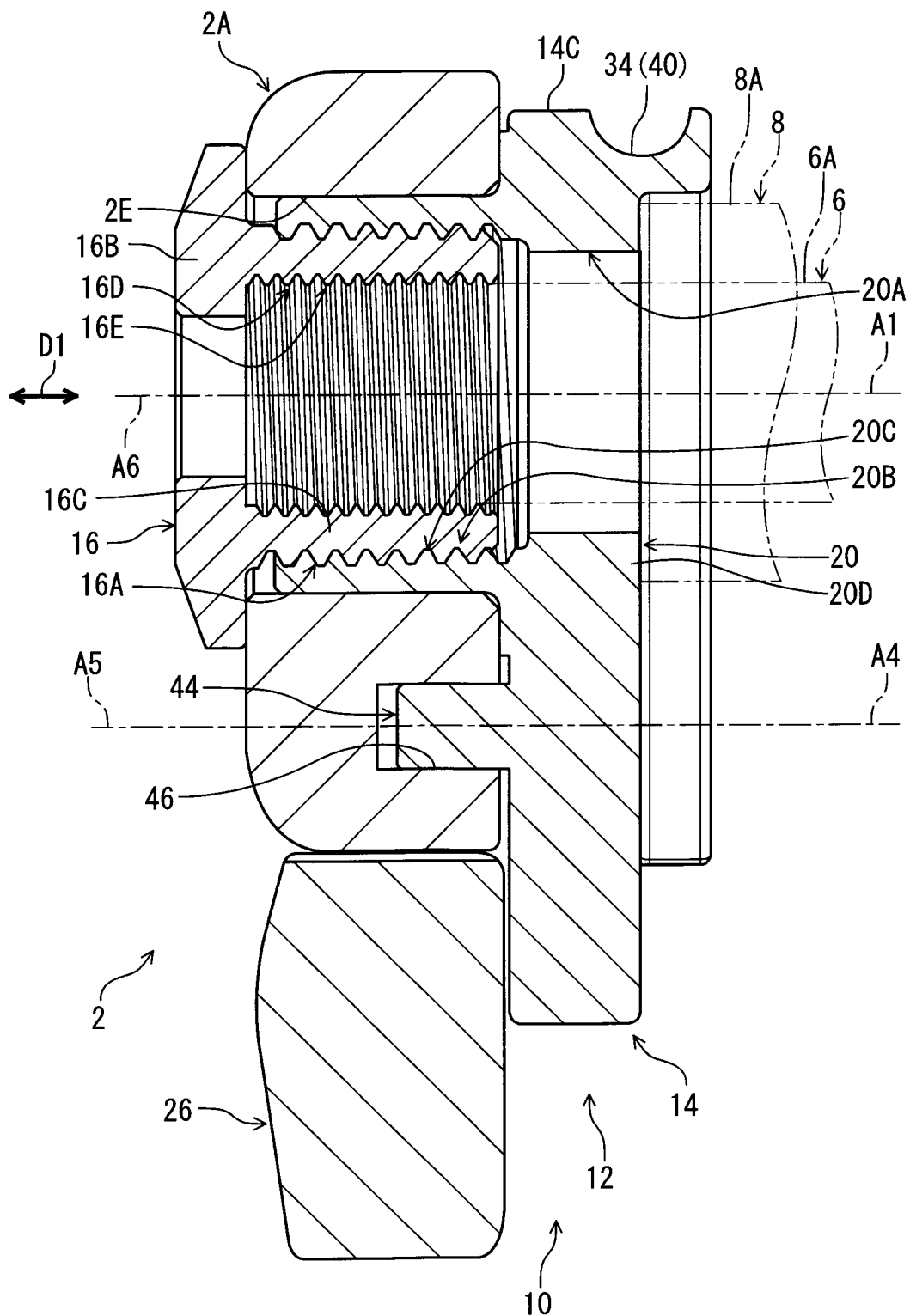
Figure 28:
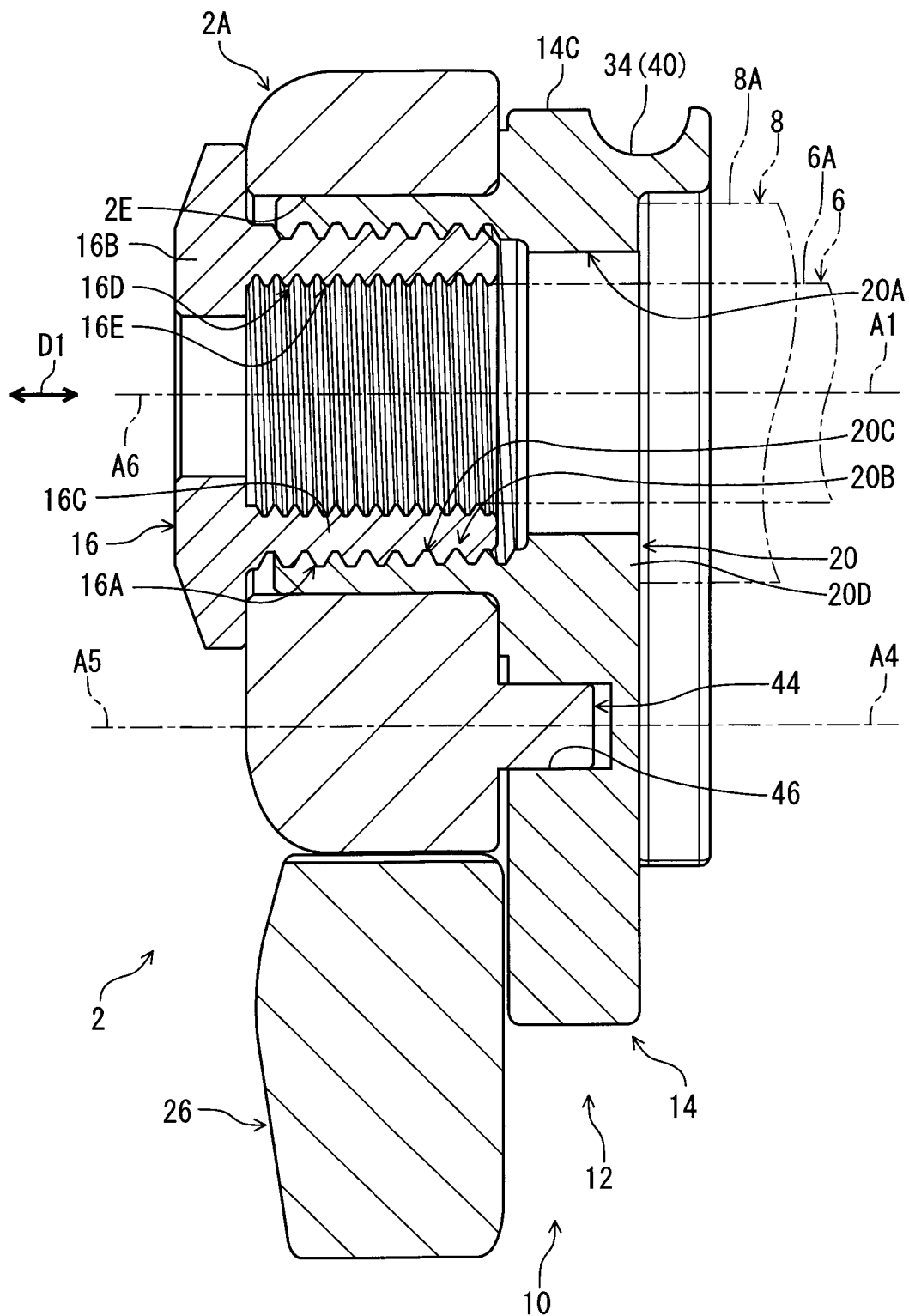

In the first to third embodiments and the modifications depicted in FIGS. 17 to 26, the restriction member 44 is a separate member from the bracket body 14 and the frame 2A. As seen in FIGS. 27 and 28, however, the restriction member 44 can be integrally provided with one of the bracket body 14 and the frame 2A as a one-piece unitary member if needed and/or desired.

In the modification depicted in FIG. 27, the restriction member 44 is integrally provided with the bracket body 14 as a one-piece unitary member. The restriction opening 46 is provided to the frame 2A of the human-powered vehicle 2. The restriction member 44 protrudes from the bracket body 14 in the bracket mounting state and is configured to be at least partly provided in the restriction opening 46 in the bracket mounting state. The additional opening 48 is omitted from the bracket body 14. The restriction member 44 can be provided in the restriction opening 46 without being press-fitted in the restriction opening 46. The restriction member 44 can be press-fitted in the restriction opening 46.

In the modification depicted in FIG. 28, the restriction member 44 is integrally provided with the frame 2A of the human-powered vehicle 2 as a one-piece unitary member. The restriction opening 46 is provided to the bracket body 14. The restriction member 44 protrudes from the frame 2A of the human-powered vehicle 2 in the bracket mounting state and is configured to be at least partly provided in the restriction opening 46 in the bracket mounting state. The additional opening 48 is omitted from the frame 2A. The restriction member 44 can be provided in the restriction opening 46 without being press-fitted in the restriction opening 46. The restriction member 44 can be press-fitted in the restriction opening 46.

In the first to third embodiments and the modifications depicted in FIGS. 17 to 28, the frame attachment portion 20 includes the fastening threaded hole 20B configured to be threadedly engaged with the bracket fastener 16. The bracket fastener 16 includes the receiving threaded hole 16D configured to be threadedly engaged with the fastening rod 6A of the hub fastening device 6 configured to fasten the hub assembly 8 to the frame 2A of the human-powered vehicle 2. In the modification depicted in FIG. 29, as with the first to third embodiments and the modifications depicted in FIGS. 17 to 28, the frame attachment portion 20 includes the fastening threaded hole 20B configured to be threadedly engaged with the bracket fastener 16. However, the frame attachment portion 20 includes a receiving threaded hole 20F configured to be threadedly engaged with the fastening rod 6A of the hub fastening device 6 configured to fasten the hub assembly 8 to the frame 2A of the human-powered vehicle 2. The frame attachment opening 20A includes the fastening threaded hole 20B and the receiving threaded hole 20F. The bracket fastener 16 includes an opening 16F. The opening 16F is free of a threaded hole. The fastening rod 6A of the hub fastening device 6 can be provided in the opening 16F. The modification depicted in FIG. 29 can be applied to the second and third embodiments and the modifications depicted in FIGS. 17 to 28.

Figure 29:
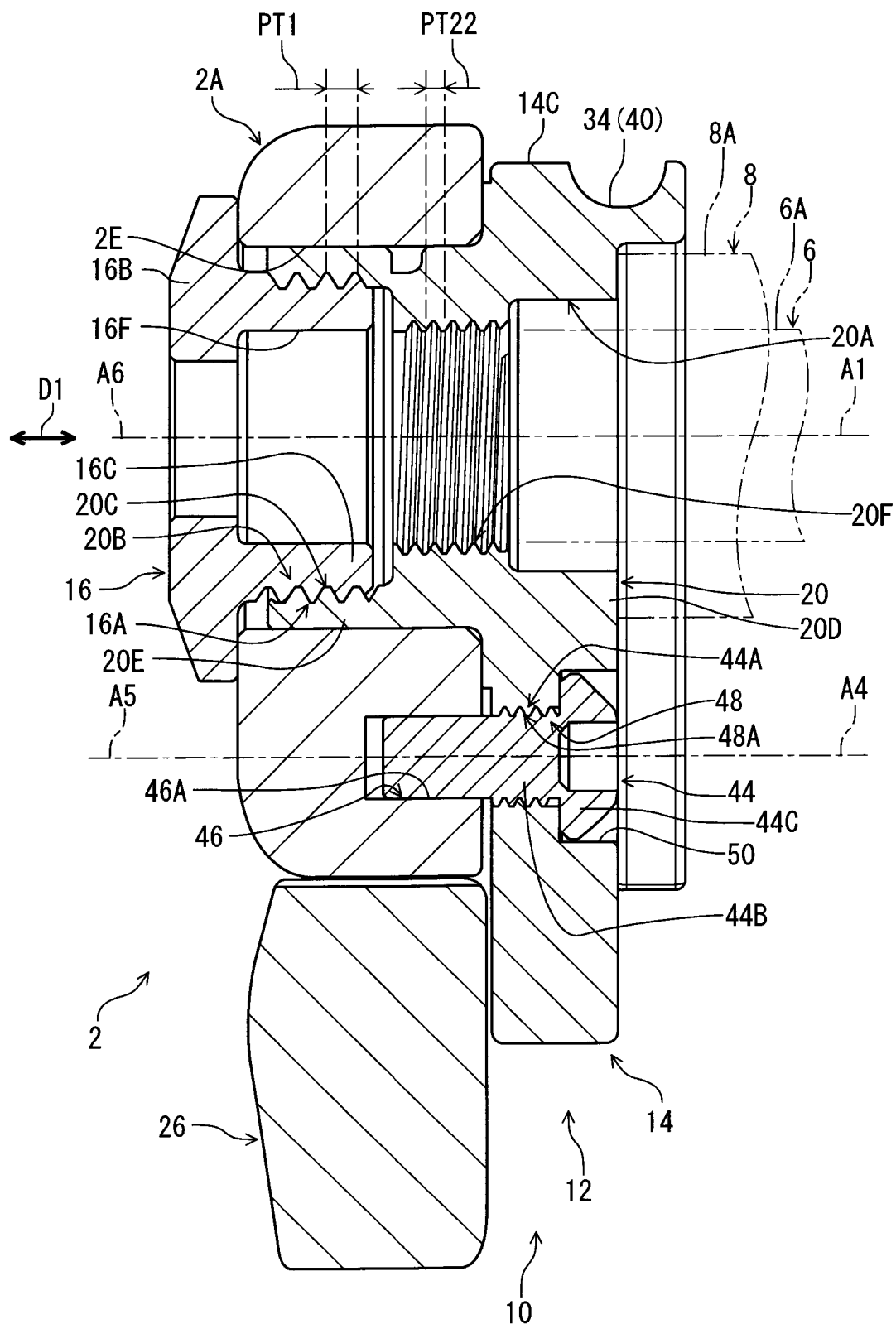

In the modification depicted in FIG. 29, the fastening external thread 16A of the bracket fastener 16 has the first thread pitch PT1. The fastening internal thread 20C of the frame attachment portion 20 has the first thread pitch PT1. The receiving threaded hole 20F of the frame attachment portion 20 has a second thread pitch PT22. The first thread pitch PT1 is different from the second thread pitch PT22. The first thread pitch PT1 is larger than the second thread pitch PT22. However, the first thread pitch PT1 can be equal to or smaller than the second thread pitch PT22 if needed and/or desired.

In the first to third embodiments and the modifications depicted in FIGS. 17 to 28, the frame attachment portion 20 includes the fastening threaded hole 20B configured to be threadedly engaged with the bracket fastener 16. The bracket fastener 16 includes the receiving threaded hole 16D configured to be threadedly engaged with the fastening rod 6A of the hub fastening device 6 configured to fasten the hub assembly 8 to the frame 2A of the human-powered vehicle 2. In the modifications depicted in FIGS. 30 and 31, however, the bracket fastener 16 includes a fastening threaded hole 16G configured to be threadedly engaged with the frame attachment portion 20. The frame attachment portion 20 includes the receiving threaded hole 20F and a fastening external thread 20G. The fastening external thread 20G of the frame attachment portion 20 is threadedly engaged with the fastening threaded hole 16G of the bracket fastener 16. The bracket fastener 16 is configured to be at least partly provided outside the through-hole 2E of the frame 2A to extend in the bracket mounting state where the bracket apparatus 12 is mounted to the frame 2A of the human-powered vehicle 2. The frame attachment portion 20 extends through the through-hole of the frame 2A. The frame attachment portion 20 includes the receiving threaded hole 16D configured to be threadedly engaged with the fastening rod 6A of the hub fastening device 6 configured to fasten the hub assembly 8 to the frame 2A of the human-powered vehicle 2. In the modification depicted in FIG. 30, the bracket fastener 16 is configured to be entirely provided outside the through-hole 2E of the frame 2A to extend in the bracket mounting state. In the modification depicted in FIG. 31, the bracket fastener 16 is configured to be partly provided outside the through-hole 2E of the frame 2A to extend in the bracket mounting state. Each of the modifications depicted in FIGS. 30 and 31 can be applied to the second and third embodiments and the modifications depicted in FIGS. 17 to 28.

Figure 30:
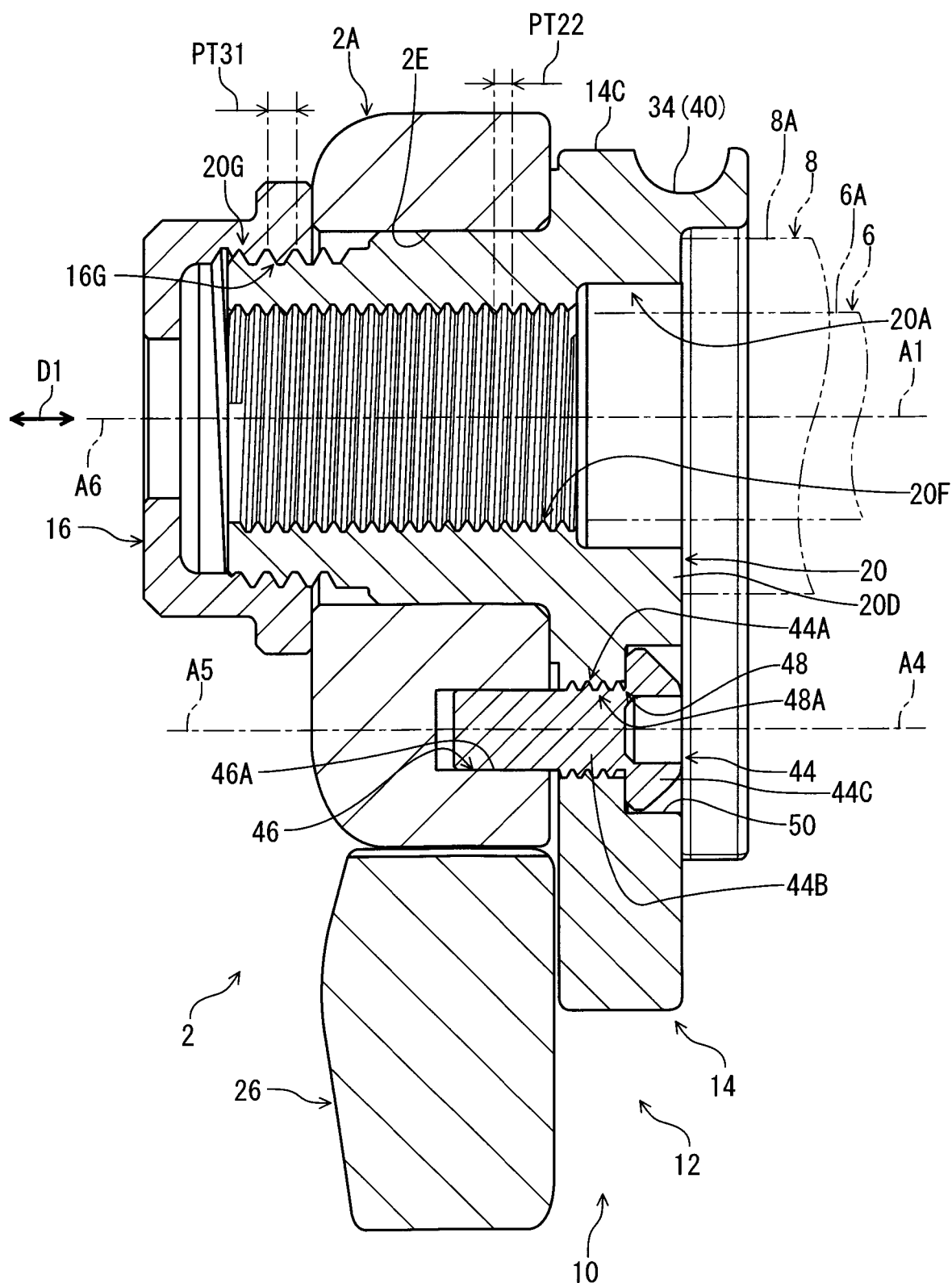
Figure 31:
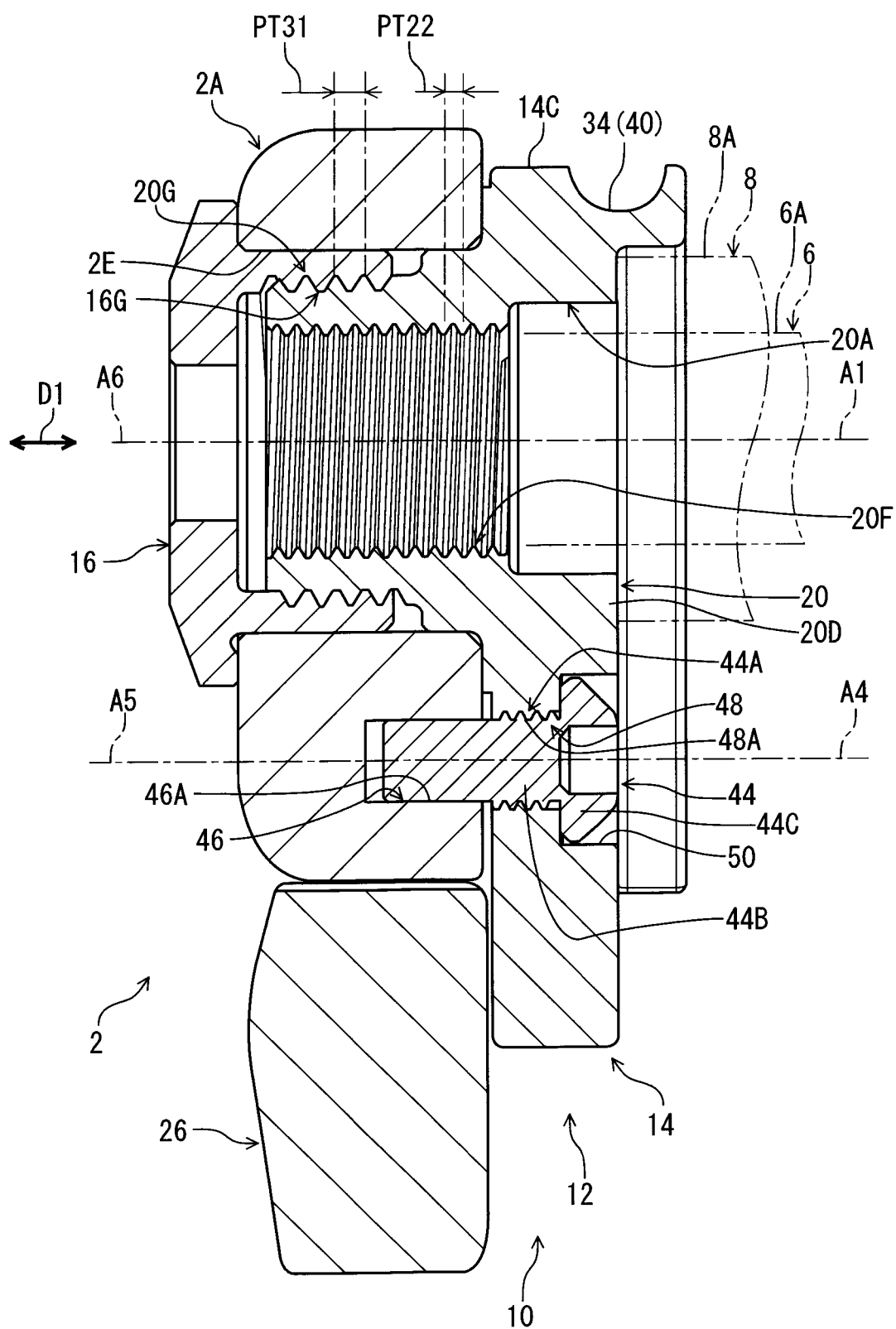

In the modifications depicted in FIGS. 30 and 31, the fastening threaded hole 16G of the bracket fastener 16 has a first thread pitch PT31. The fastening external thread 20G of the frame attachment portion 20 has the first thread pitch PT31. The receiving threaded hole 20F of the frame attachment portion 20 has the second thread pitch PT22. The first thread pitch PT31 is different from the second thread pitch PT22. The first thread pitch PT31 is larger than the second thread pitch PT22. However, the first thread pitch PT31 can be equal to or smaller than the second thread pitch PT22 if needed and/or desired.

Figure 32:
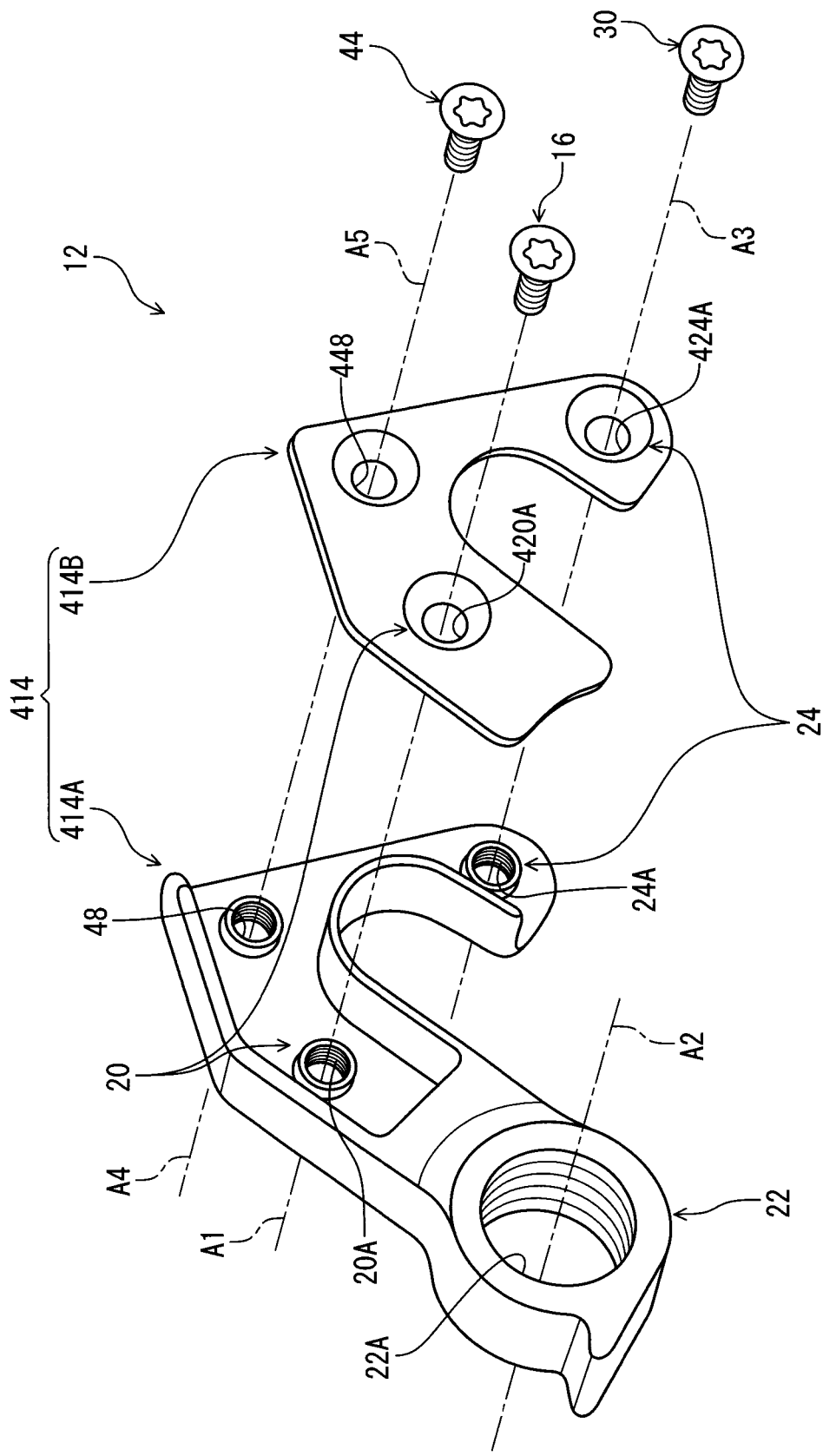

In the first to third embodiments and the modifications depicted in FIGS. 17 to 31, the bracket body 14 is integrally provided as a one-piece unitary member. As seen in FIG. 32, however, the bracket body 14 can include a plurality of separate members if needed and/or desired. In the modification depicted in FIG. 32, the bracket apparatus 12 comprises a bracket body 414 and the restriction member 44. The bracket body 414 includes a first bracket body 414A and a second bracket body 414B. The second bracket body 414B is a separate member from the first bracket body 414A. The frame attachment portion 20 is provided to at least one of the first bracket body 414A and the second bracket body 414B. The derailleur attachment portion 22 is provided to at least one of the first bracket body 414A and the second bracket body 414B. The component attachment portion 24 is provided to at least one of the first bracket body 414A and the second bracket body 414B. The frame attachment portion 20 is provided to the first bracket body 414A and the second bracket body 414B. The derailleur attachment portion 22 is provided to the first bracket body 414A. The component attachment portion 24 is provided to the first bracket body 414A and the second bracket body 414B. The first bracket body 414A and the second bracket body 414B are configured to hold the frame 2A between the first bracket body 414A and the second bracket body 414B in the bracket mounting state. The frame attachment portion 20 has the frame attachment opening 20A. The frame attachment portion 20 has an additional frame attachment opening 420A. The frame attachment opening 20A is provided to the first bracket body 414A. The additional frame attachment opening 420A is provided to the second bracket body 414B. The frame attachment opening 20A is configured to be threadedly engaged with the bracket fastener 16. The bracket fastener 16 extends through the additional frame attachment opening 420A in a state where the bracket fastener 16 is threadedly engaged with the frame attachment opening 20A. The bracket body 414 includes the derailleur attachment portion 22 to which the derailleur 4 is to be attached. The derailleur attachment portion 22 has the derailleur attachment opening 22A. The derailleur attachment opening 22A is provided to the first bracket body 414A. The component attachment portion 24 has the component attachment opening 24A. The component attachment portion 24 has an additional component attachment opening 424A. The component attachment opening 24A is provided to the first bracket body 414A. The additional component attachment opening 424A is provided to the second bracket body 414B. The component attachment opening 24A is configured to be threadedly engaged with the component fastener 30. The component fastener 30 extends through the additional component attachment opening 424A in a state where the component fastener 30 is threadedly engaged with the component attachment opening 24A. The component bracket 32 is held between the first bracket body 414A and the second bracket body 414B in the component mounting state. The bracket body 414 includes the additional opening 48 and an opening 448. The additional opening 48 is provided to the first bracket body 414A. The opening 448 is provided to the second bracket body 414B. The additional opening 48 is configured to be threadedly engaged with the restriction member 44. The restriction member 44 extends through the opening 448 in a state where the restriction member 44 is threadedly engaged with the additional opening 48. The structures described and depicted in the first to third embodiments and the modifications depicted in FIGS. 17 to 31 can be applied to the modification depicted in FIG. 32. The modification depicted in FIG. 32 can be applied to the first to third embodiments and the modifications depicted in FIGS. 17 to 31.

Figure 33:
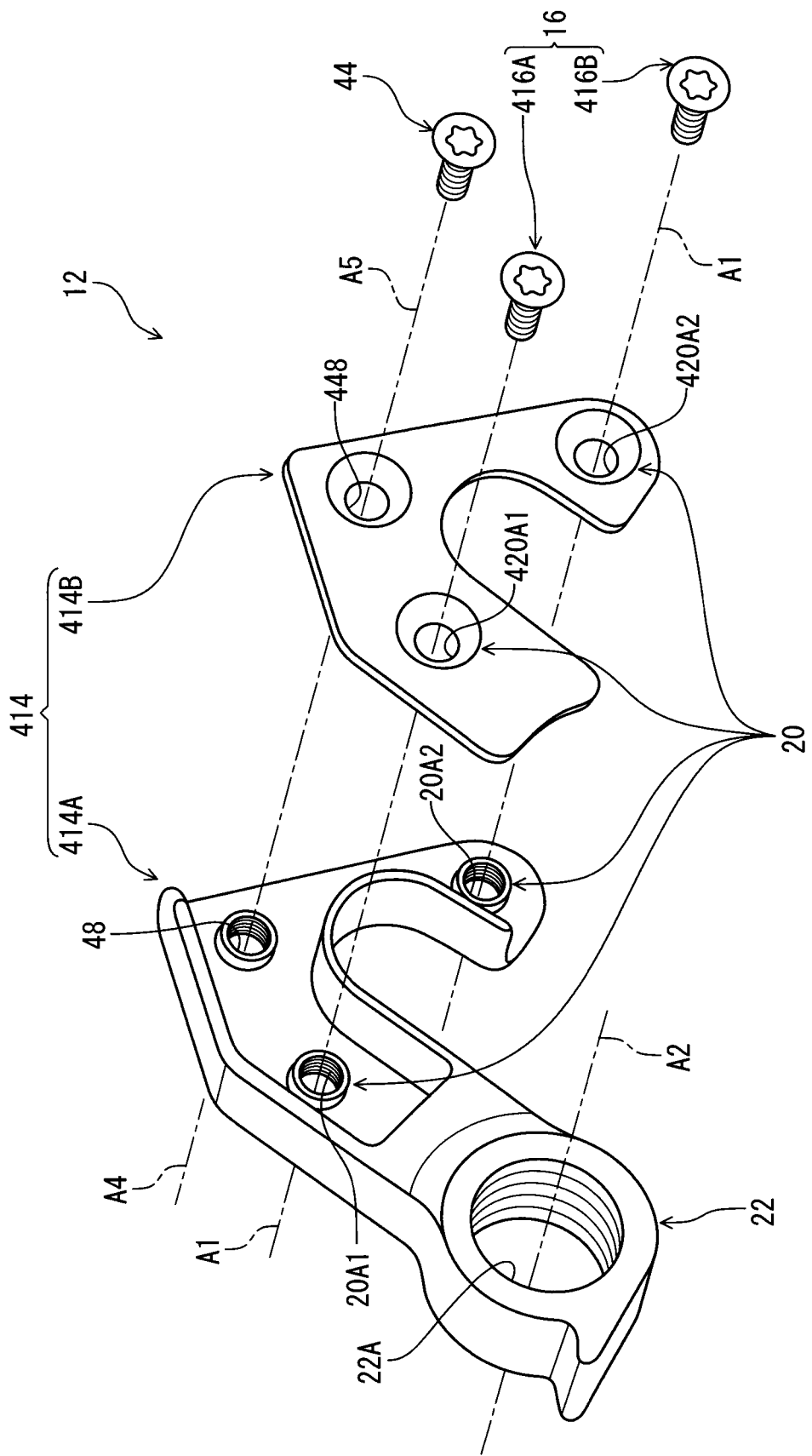

In the modification depicted in FIG. 32, the component attachment portion 24 can be omitted from the bracket body 414 if needed and/or desired. Instead, as seen in FIG. 33, the bracket fastener 16 can include a plurality of fasteners configured to fasten the bracket body 414 to the frame 2A of the human-powered vehicle 2. In the modification depicted in FIG. 33, the bracket fastener 16 includes a plurality of fasteners 416A and 416B configured to fasten the bracket body 414 to the frame 2A of the human-powered vehicle 2. The frame attachment opening 20A of the frame attachment portion 20 includes a first frame attachment opening 20A1 and a second frame attachment opening 20A2. The additional frame attachment opening 420A of the frame attachment portion 20 includes a first additional frame attachment opening 420A1 and a second additional frame attachment opening 420A2. The first frame attachment opening 20A1 and the second frame attachment opening 20A2 are provided to the first bracket body 414A. The first additional frame attachment opening 420A1 and the second additional frame attachment opening 420A2 are provided to the second bracket body 414B. The first frame attachment opening 20A1 is configured to be threadedly engaged with the fastener 416A. The fastener 416A extends through the first additional frame attachment opening 420A1 in a state where the fastener 416A is threadedly engaged with the first frame attachment opening 20A1. The fastener 416B extends through the second additional frame attachment opening 420A2 in a state where the fastener 416B is threadedly engaged with the second frame attachment opening 20A2.

In the first to third embodiments and the modifications depicted in FIGS. 17 to 33, the frame attachment portion 20 includes one of an external thread and an internal thread which are engaged with each other while the bracket fastener 16 includes the other of the external thread and the internal thread. However, the frame attachment portion 20 and the bracket fastener 16 can include other coupling structures such as a snap-fit structure and a bayonet structure.

In the first to third embodiments and the modifications depicted in FIGS. 17 to 33, the restriction member 44 and the restriction opening 46 are spaced apart from the frame attachment portion 20. As seen in FIGS. 34 to 38, however, the restriction member 44 and the restriction opening 46 can be provided to the frame attachment portion 20. In the modifications depicted in FIGS. 34 to 38, the restriction member 44 is provided radially outwardly of the tubular part 20E of the frame attachment portion 20. The restriction member 44 has an outline having a first distance DS1 and a second distance DS2 defined radially outwardly from the frame attachment center axis A1. The first distance DS1 is different from the second distance DS2. The restriction opening 46 has a shape which is complementary with the outline of the restriction member 44.

Figure 34:
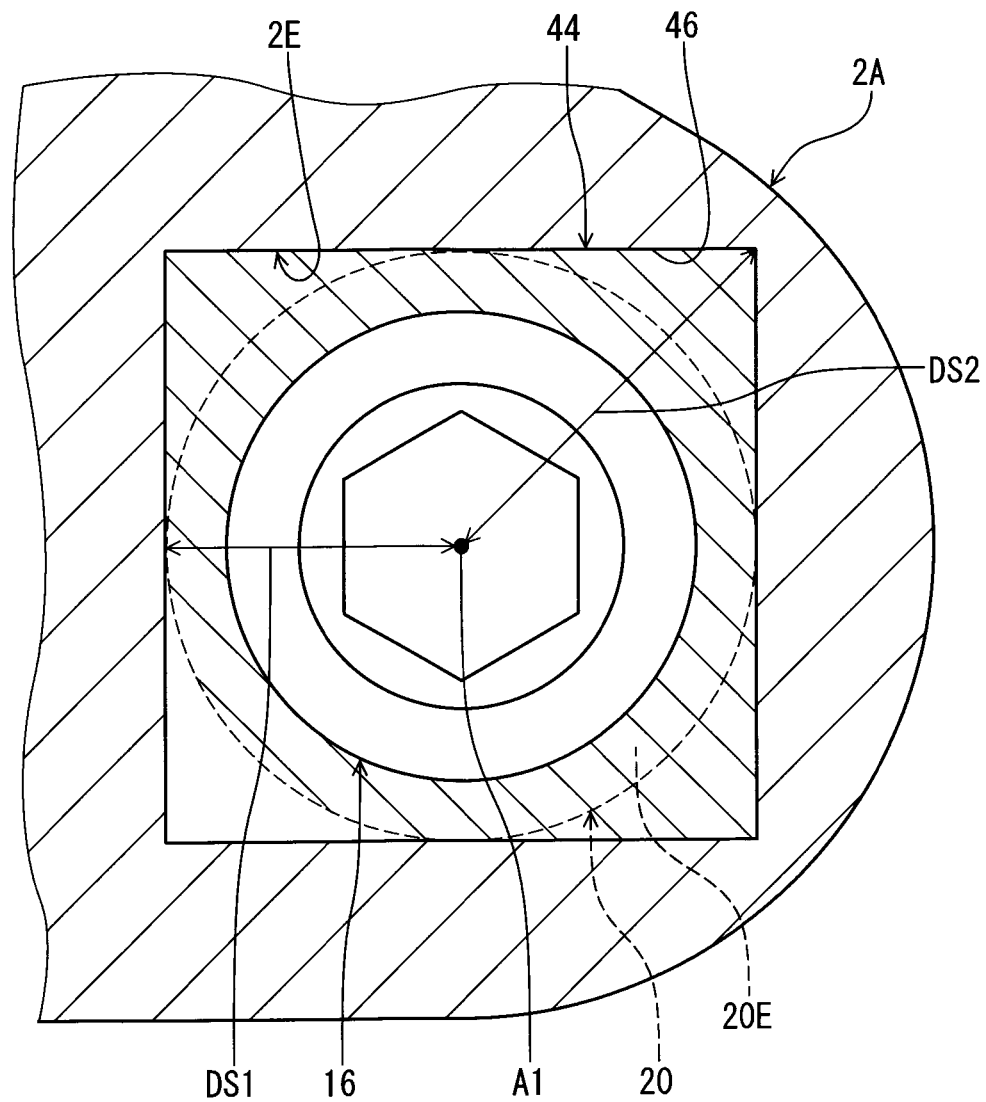

As seen in FIG. 34, the restriction member 44 has a polygonal outline having the first distance DS1 and the second distance DS2. The restriction member 44 has a rectangular outline having the first distance DS1 and the second distance DS2. The restriction member 44 protrudes radially outwardly from the tubular part 20E of the frame attachment portion 20. The restriction member 44 extends circumferentially about the tubular part 20E to surround the tubular part 20E. The restriction opening 46 has a shape which is complementary with the polygonal outline of the restriction member 44. The through-hole 2E of the frame 2A includes the restriction opening 46. The shape of the outline of the restriction member 44 is not limited to the rectangular outline. The restriction member 44 can have a polygonal outline other than the rectangular outline. The shape of the restriction member 44 is not limited to the polygonal outline.

Figure 35:
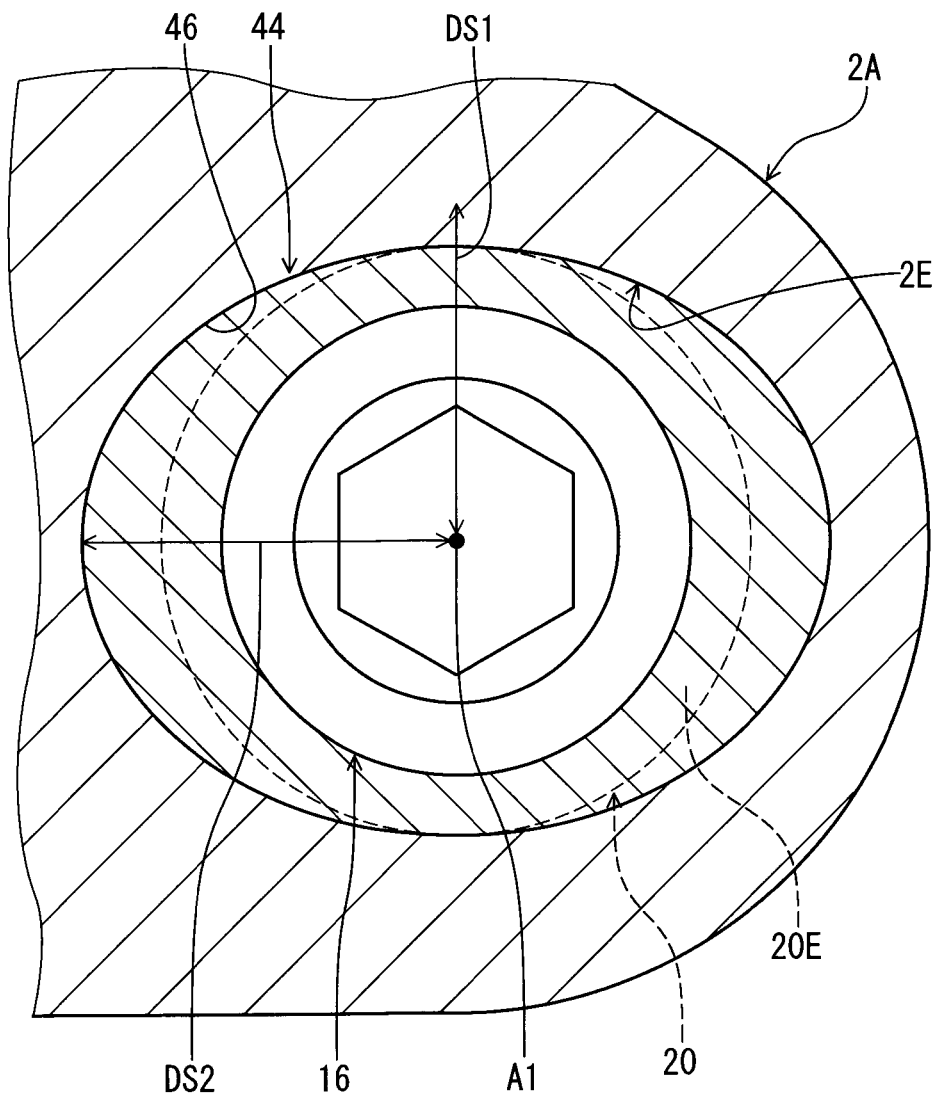

As seen in FIG. 35, the restriction member 44 has an oval outline having the first distance DS1 and the second distance DS2. The restriction member 44 protrudes radially outwardly from the tubular part 20E of the frame attachment portion 20. The restriction member 44 extends circumferentially about the tubular part 20E to surround the tubular part 20E. The restriction opening 46 has a shape which is complementary with the oval outline of the restriction member 44. The through-hole 2E of the frame 2A includes the restriction opening 46. The shape of the outline of the restriction member 44 is not limited to the oval outline.

Figure 36:
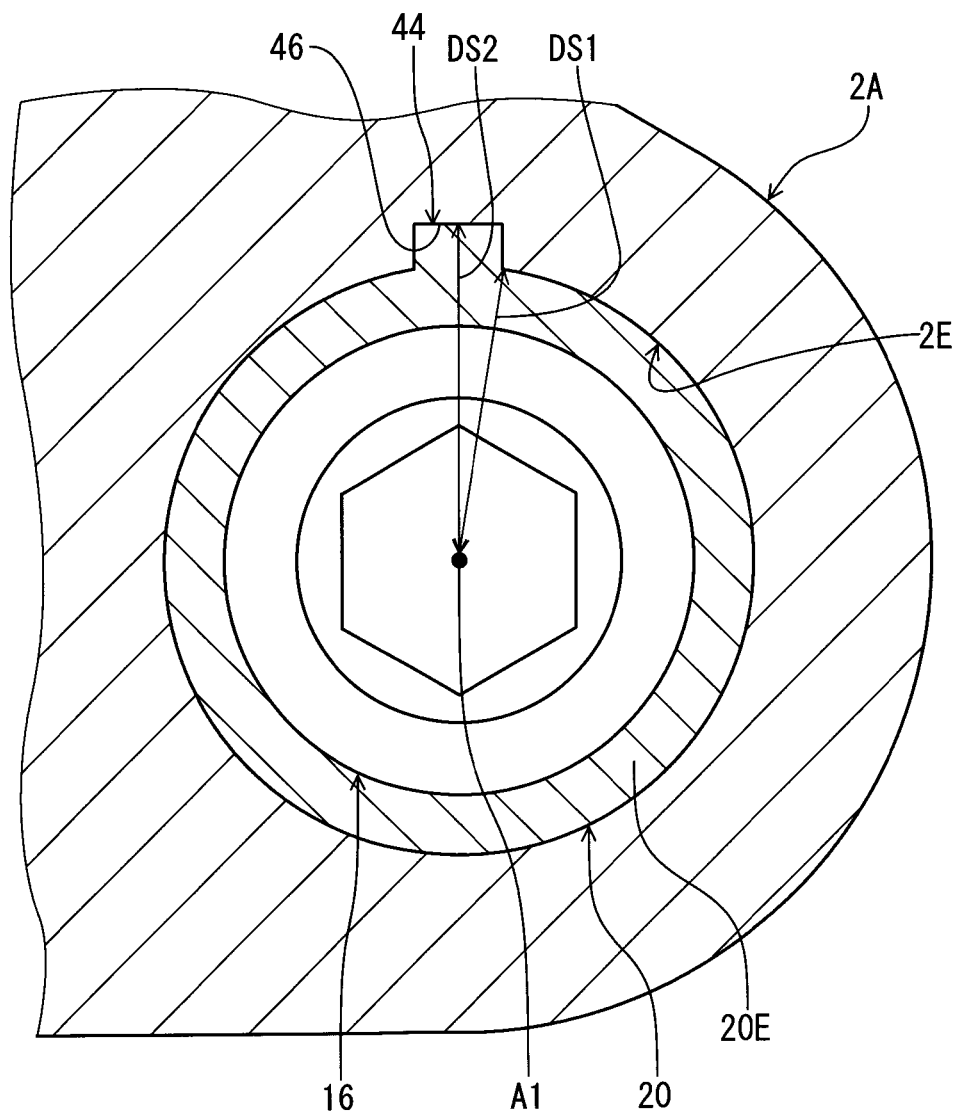

As seen in FIG. 36, the restriction member 44 has a polygonal outline having the first distance DS1 and the second distance DS2. The restriction member 44 has a rectangular outline having the first distance DS1 and the second distance DS2. The restriction member 44 protrudes radially outwardly from the tubular part 20E of the frame attachment portion 20. The restriction opening 46 has a shape which is complementary with the polygonal outline of the restriction member 44. The shape of the outline of the restriction member 44 is not limited to the rectangular outline. The restriction member 44 can have a polygonal outline other than the rectangular outline. The shape of the outline of the restriction member 44 is not limited to the polygonal outline. A total number of the protruding portion of the restriction member 44 is not limited to the illustrated modification. The restriction member 44 can include a plurality of protruding portions if needed and/or desired. The restriction opening 46 can include a plurality of openings in which the plurality of protruding portions is provided if needed and/or desired.

Figure 37:
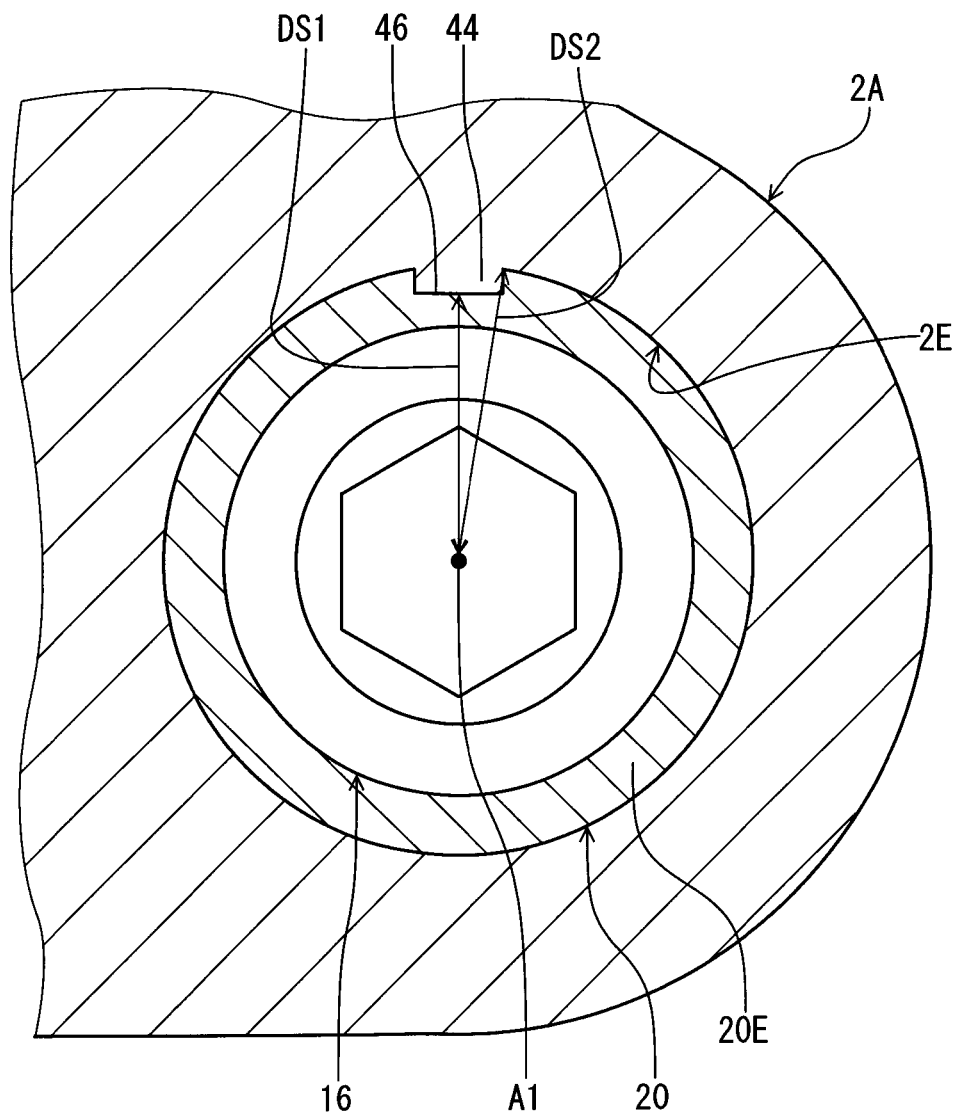

As seen in FIG. 37, the restriction member 44 has a polygonal outline having the first distance DS1 and the second distance DS2. The restriction member 44 has a rectangular outline having the first distance DS1 and the second distance DS2. The restriction member 44 is provided to the frame 2A. The restriction opening 46 is provided to the frame attachment portion 20. The restriction member 44 protrudes radially outwardly from an inner peripheral surface of the through-hole 2E of the frame 2A. The restriction opening 46 has a shape which is complementary with the polygonal outline of the restriction member 44. The shape of the outline of the restriction member 44 is not limited to the polygonal outline. A total number of the protruding portion of the restriction member 44 is not limited to the illustrated modification. The restriction member 44 can include a plurality of protruding portions if needed and/or desired. The restriction opening 46 can include a plurality of openings in which the plurality of protruding portions is provided if needed and/or desired.

In the present application, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. A bracket apparatus for mounting a derailleur to a frame of a human-powered vehicle, the bracket apparatus comprising:
   a frame attachment portion having a frame attachment opening having a frame attachment center axis;
   a derailleur attachment portion spaced apart from the frame attachment portion; and
   a component attachment portion spaced apart from the frame attachment portion and the derailleur attachment portion, wherein
   the component attachment portion is configured to be attached to an electric device,
   the frame attachment portion is integrally provided with the derailleur attachment portion and the component attachment portion as a one-piece unitary member,
   the derailleur attachment portion has a derailleur attachment opening having a derailleur attachment center axis, the derailleur attachment opening being configured to at least partially receive a derailleur fastener, and the derailleur attachment center axis is parallel to the frame attachment center axis.

2. The bracket apparatus according to claim 1, wherein the frame attachment opening is configured to be coaxial with a hub axle of a hub assembly in a bracket mounting state where the bracket apparatus is mounted to the frame of the human-powered vehicle.

3. The bracket apparatus according to claim 1, wherein the derailleur attachment opening is configured to be coaxial with the derailleur fastener in a derailleur mounting state where the derailleur is mounted to the bracket apparatus.

4. The bracket apparatus according to claim 1, wherein the component attachment portion has a component attachment opening configured to be coaxial with a component fastener in a component mounting state where a component is mounted to the bracket apparatus.

5. The bracket apparatus according to claim 1, wherein the frame attachment portion is configured to be at least partly disposed between the frame of the human-powered vehicle and a hub axle of a hub assembly in an axial direction with respect to a center axis of the hub axle.

6. The bracket apparatus according to claim 1, wherein the component attachment portion is configured to form a space between the component attachment portion and the frame of the human-powered vehicle in a bracket mounting state where the bracket apparatus is mounted to the frame of the human-powered vehicle, and at least one of a component bracket configured to mount a component that includes the electric device to the component attachment portion and the component configured to be mounted to the component attachment portion is at least partly disposed in the space in a component mounting state where the component is mounted to the bracket apparatus.

7. The bracket apparatus according to claim 1, wherein one of the derailleur attachment portion and the component attachment portion is disposed on an opposite side of the other of the derailleur attachment portion and the component attachment portion with respect to the frame attachment portion.

8. The bracket apparatus according to claim 1, further comprising a bracket body; and
a bracket fastener configured to fasten the bracket body to the frame of the human-powered vehicle.

9. The bracket apparatus according to claim 8, wherein the bracket fastener is configured to fasten the frame attachment portion to the frame of the human-powered vehicle.

10. The bracket apparatus according to claim 9, wherein the frame attachment portion includes a fastening threaded hole configured to be threadedly engaged with the bracket fastener.

11. The bracket apparatus according to claim 10, wherein the bracket fastener includes a receiving threaded hole configured to be threadedly engaged with a fastening rod of a hub fastening device configured to fasten a hub assembly to the frame of the human-powered vehicle.

12. The bracket apparatus according to claim 8, wherein the frame attachment portion includes a fastening threaded hole configured to be threadedly engaged with the bracket fastener.

13. The bracket apparatus according to claim 8, wherein the bracket body includes at least one of the frame attachment portion, the derailleur attachment portion, and the component attachment portion.

14. The bracket apparatus according to claim 8, wherein the bracket body includes a restriction opening in which a restriction member is configured to be at least partly provided to restrict a rotation of the bracket body relative to the frame of the human-powered vehicle in a bracket mounting state where the bracket apparatus is mounted to the frame of the human-powered vehicle.

15. The bracket apparatus according to claim 14, wherein the restriction opening has a receiving center axis, the component attachment portion has a component attachment opening having a component attachment center axis, and the receiving center axis is provided between the frame attachment center axis and the component attachment center axis.

16. The bracket apparatus according to claim 14, wherein the restriction opening has a receiving center axis, the component attachment portion has a component attachment opening having a component attachment center axis, and the receiving center axis is provided between the derailleur attachment center axis and the component attachment center axis.

17. The bracket apparatus according to claim 14, wherein the restriction opening has a receiving center axis, and the receiving center axis is provided between the frame attachment center axis and the derailleur attachment center axis.

18. The bracket apparatus according to claim 8, wherein the bracket body includes a first bracket body and a second bracket body, the second bracket body is a separate member from the first bracket body, the frame attachment portion is provided to at least one of the first bracket body and the second bracket body, and the derailleur attachment portion is provided to at least one of the first bracket body and the second bracket body.

19. The bracket apparatus according to claim 8, wherein the bracket fastener includes a plurality of fasteners configured to fasten the bracket body to the frame of the human-powered vehicle.

20. The bracket apparatus according to claim 1, wherein the component attachment portion has a component attachment opening having a component attachment center axis, and the frame attachment center axis, the derailleur attachment center axis, and the component attachment center axis are offset from each other.

21. The bracket apparatus according to claim 20, wherein the frame attachment center axis, the derailleur attachment center axis, and the component attachment center axis extend along each other.

22. A bracket assembly comprising:

the bracket apparatus according to claim 1; and
a component bracket configured to mount a component to the bracket apparatus.

23. The bracket assembly according to claim 22, further comprising:

the component configured to be mounted to the bracket apparatus via the component bracket, the component including the electric device.

24. The bracket assembly according to claim 23, wherein the component is configured to be adjustably attached to the bracket apparatus.

25. The bracket assembly according to claim 22, further comprising
a component fastener configured to fasten the component bracket to the bracket apparatus.

26. A bracket apparatus for mounting a derailleur to a frame of a human-powered vehicle, the bracket apparatus comprising:
   a frame attachment portion;
   a derailleur attachment portion spaced apart from the frame attachment portion;
   a component attachment portion spaced apart from the frame attachment portion and the derailleur attachment portion;
   a bracket body; and
   a bracket fastener configured to fasten the bracket body to the frame of the human-powered vehicle, wherein
   the frame attachment portion includes a fastening threaded hole configured to be threadedly engaged with the bracket fastener, and
   the frame attachment portion includes a receiving threaded hole configured to be threadedly engaged with a fastening rod of a hub fastening device configured to fasten a hub assembly to the frame of the human-powered vehicle.

27. A bracket apparatus for mounting a derailleur to a frame of a human-powered vehicle, the bracket apparatus comprising:
   a frame attachment portion;
   a derailleur attachment portion spaced apart from the frame attachment portion;
   a component attachment portion spaced apart from the frame attachment portion and the derailleur attachment portion;
   a bracket body; and
   a bracket fastener configured to fasten the bracket body to the frame of the human-powered vehicle, wherein
   the bracket fastener includes a fastening threaded hole configured to be threadedly engaged with the frame attachment portion,
   the bracket fastener is configured to be at least partly provided outside a through-hole of the frame in a bracket mounting state where the bracket apparatus is mounted to the frame of the human-powered vehicle, and
   the frame attachment portion extends through the through-hole of the frame.

28. The bracket apparatus according to claim 27, wherein the frame attachment portion includes a receiving threaded hole configured to be threadedly engaged with a fastening rod of a hub fastening device configured to fasten a hub assembly to the frame of the human-powered vehicle.

\* \* \* \* \*